United States Patent [19]

Juhasz et al.

[11] 4,307,455
[45] Dec. 22, 1981

[54] POWER SUPPLY FOR COMPUTING MEANS WITH DATA PROTECTED SHUT-DOWN

[75] Inventors: John E. Juhasz, Lake Orion; Pravin J. Shah, Warren, both of Mich.

[73] Assignee: Rockwell International Corporation, Pittsburgh, Pa.

[21] Appl. No.: 20,467

[22] Filed: Mar. 14, 1979

Related U.S. Application Data

[63] Continuation-in-part of Ser. No. 881,222, Feb. 27, 1978, abandoned.

[51] Int. Cl.³ .......................... G06F 11/30; G06F 1/00
[52] U.S. Cl. ................................... 364/900; 364/424; 371/66
[58] Field of Search....364/200 MS File, 900 MS File, 364/424, 707; 235/301; 340/52 R, 52 F; 371/14, 66

[56] References Cited

U.S. PATENT DOCUMENTS

| | | | |
|---|---|---|---|
| 3,624,617 | 11/1971 | Putterman | 364/200 |
| 3,748,452 | 7/1973 | Ruben | 364/200 |
| 3,781,824 | 12/1973 | Caiati | 364/900 |
| 3,878,371 | 4/1975 | Burke . | |
| 3,946,364 | 3/1976 | Codomo . | |
| 3,956,740 | 5/1976 | Jones | 364/900 |
| 3,978,457 | 8/1976 | Check, Jr. | 364/200 |
| 4,020,472 | 4/1977 | Bennett | 364/200 |
| 4,041,470 | 8/1977 | Slane | 364/424 |
| 4,072,850 | 2/1978 | McGlynn | 364/424 |
| 4,162,526 | 7/1979 | Gass | 364/200 |
| 4,204,249 | 5/1980 | Dye | 364/200 |

FOREIGN PATENT DOCUMENTS

| | | |
|---|---|---|
| 1056031 | 1/1967 | United Kingdom . |
| 11786953 | 1/1970 | United Kingdom . |
| 1291909 | 10/1972 | United Kingdom . |
| 1368686 | 10/1974 | United Kingdom . |
| 1424550 | 11/1976 | United Kingdom . |

Primary Examiner—James D. Thomas

[57] ABSTRACT

A device monitoring and recording apparatus comprises sensing means, computing means, memory storage means and power supply means. The sensing means are operative for sensing device operating parameters and generating data signals corresponding thereto. The computing means process the sensed data signals and the memory storage means stores the data signals from the computing means. The power supply means provides power to the device as well as the computing means and memory storage means and comprises means for sensing a power fault condition and for generating a fault status signal in response thereto, means for feeding the fault status signal to the computing means and means for shutting down the computing means as well as the device upon receipt of a shut-down command from the computing means. The computing means initiates a data protect routine prior to generating the shut-down command.

7 Claims, 7 Drawing Figures

POWER SUPPLY FOR COMPUTING MEANS WITH DATA PROTECTED SHUT-DOWN

This application is a C-I-P of Ser. No. 881,222, filed Feb. 27, 1978, now abandoned.

BACKGROUND OF THE INVENTION

1. Field of the Invention

The invention is in the field of data monitoring and recording systems particularly adapted for use on vehicles.

2. Description of the Prior Art

Prior data recording apparatus has been utilized for recording various engine parameters for use as diagnostic and maintenance tools for land vehicles and aircraft. Additionally, recording devices have been utilized in connection with interstate truck travel to keep track of gasoline purchases in various states to take advantage of tax rebates and the like. Representative examples of these prior art devices as shown in U.S. Pat. Nos. 3,099,817; 3,964,302; 4,050,295; 3,864,731; 3,938,092; 3,702,989; and 3,792,445. Typically, these prior art devices utilize either singly or in combination various display means, manual input means, and recording means in the form of either paper or magnetic tape. In some instances only alarm indications are provided or pertinent data is displayed as shown, for example, in U.S. Pat. 4,050,295 and 3,964,302. In other cases entire vehicle performance data is recorded as discussed in U.S. Pat. No. 3,099,817. Attempts have been made to reduce the amount of recording and consequent tape usage by means of hardward and software selective data recording such as disclosed in U.S. Pat. Nos. 3,792,445 and 3,702,989.

A particular disadvantage of these prior art devices is their lack of versatility with regard to usage and recording of data and a reliance upon bulky and expensive magnetic or paper tape as a primary recording medium.

Of particular importance in utilizing data vehicle monitoring recording apparatus is the necessity to keep accurate track of time so that various malfunctioning engine parameters may be exactly correlated with the time of occurrence. Although various clocking techniques have been developed in the prior art, such as, for example, apparatus disclosed in U.S. Pat. Nos. 4,031,363, 4,022,017 and 3,889,461, these systems do not provide the necessary time tracking accuracy and reliability coupled with power conservation needs required in land vehicles. In particular, when a computing means such as a microprocessor is utilized to selectively filter and store data as well as provide a real time clock function there is a need for maintaining a high accuracy in the real time clock function despite inoperability of the microprocessor when the vehicle engine is turned off. In this connection the prior art has not addressed itself to the problem of shutting down the microprocessor in an orderly fashion to protect data being processed in the event of power failure or engine turnoff.

SUMMARY OF THE INVENTION

Accordingly, it is an object of the invention to provide a versatile vehicle monitoring and recording system for providing accurate data parameters useful for record keeping, performance and maintenance applications.

Yet another object of the invention is to provide a vehicle monitoring and recording system utilizing a computing means to read the various input parameters and selectively store pertinent input parameters in a solid state memory.

Yet another object of the invention is to provide an onboard microprocessor controlled vehicle monitoring and recording system for selectively displaying and recording data in a random access memory also located onboard the vehicle.

Yet another object of the invention is to provide both an automatic and operator assisted vehicle monitoring and recording system controlled by microprocessor means for selectively storing sensed data.

A further object of the invention is to provide a power supply circuit for use in a computer controlled vehicle monitoring and recording system wherein the microprocessor effectively controls power shut down operations in an orderly fashion to achieve storage of data presently being processed by the microprocessor.

A further object of the invention is to provide a power supply circuit operatively associated with a computing means which controls a vehicle monitoring and recording system to achieve orderly startup as well as shutdown modes of operation and additionally to achieve anticipatory power failure signals for use by the microprocessor for storing data presently being processed.

There is also provided in accordance with the invention a power supply circuit for use with a computing means having a central processing unit and memory storage means, the power supply circuit comprising: a power supply means adapted for connecting to the computing means for powering same, means for sensing the voltage of the power source, means for generating a power fault status signal in response to the sensing means upon the occurrence of a predetermined low voltage from the power supply means, the central processing unit receiving the power fault status signal from the generating means and initiating a power protect routine in response thereto, the central processing unit generating a shut-down command at the completion of the data protect routine. Means are also provided for receiving the shut-down command and for turning off the power supply to the computing means in response to the shut-down command whereby the computing means controls the shut down of the power supply means to which it is connected.

A method is also disclosed for protecting data being processed by a computing means having a central processing unit and a memory storage means upon the occurrence of a power fault condition of a power supply which provides power to the computing means. The method comprises the steps of sensing a power fault condition of the power supply, generating a power fault status signal, feeding the power fault status signal to the central processing unit, the central processing unit thereby executing a data protect routine to store data being processed by the central processing unit into a memory storage means, and disconnecting the power source from the central processing unit after completion of the data protect routine. The central processing unit initiates the power disconnecting step.

There is further provided a method of protecting data which is being processed by a computing means having a central processing unit and a memory storage means wherein the central processing unit is operable to sense vehicle operating parameters and connected to a vehicle battery for deriving operating power therefrom. The method comprises the steps of sensing at least one vehicle parameter indicative of an engine shut-down condition, executing a data protect routine in response to the sensed shut-down condition to store data being processed by the central processing unit into the memory storage means, and disconnecting the vehicle battery from the central processing unit after completion of the data protect routine. The central processing unit initiates the disconnecting step.

BRIEF DESCRIPTION OF THE DRAWINGS

These and other objects of the invention will become clear in connection with the foregoing description taken in conjunction with the drawings wherein.

DETAILED DESCRIPTION OF THE PREFERRED EMBODIMENT

System Overview

Figure 1:
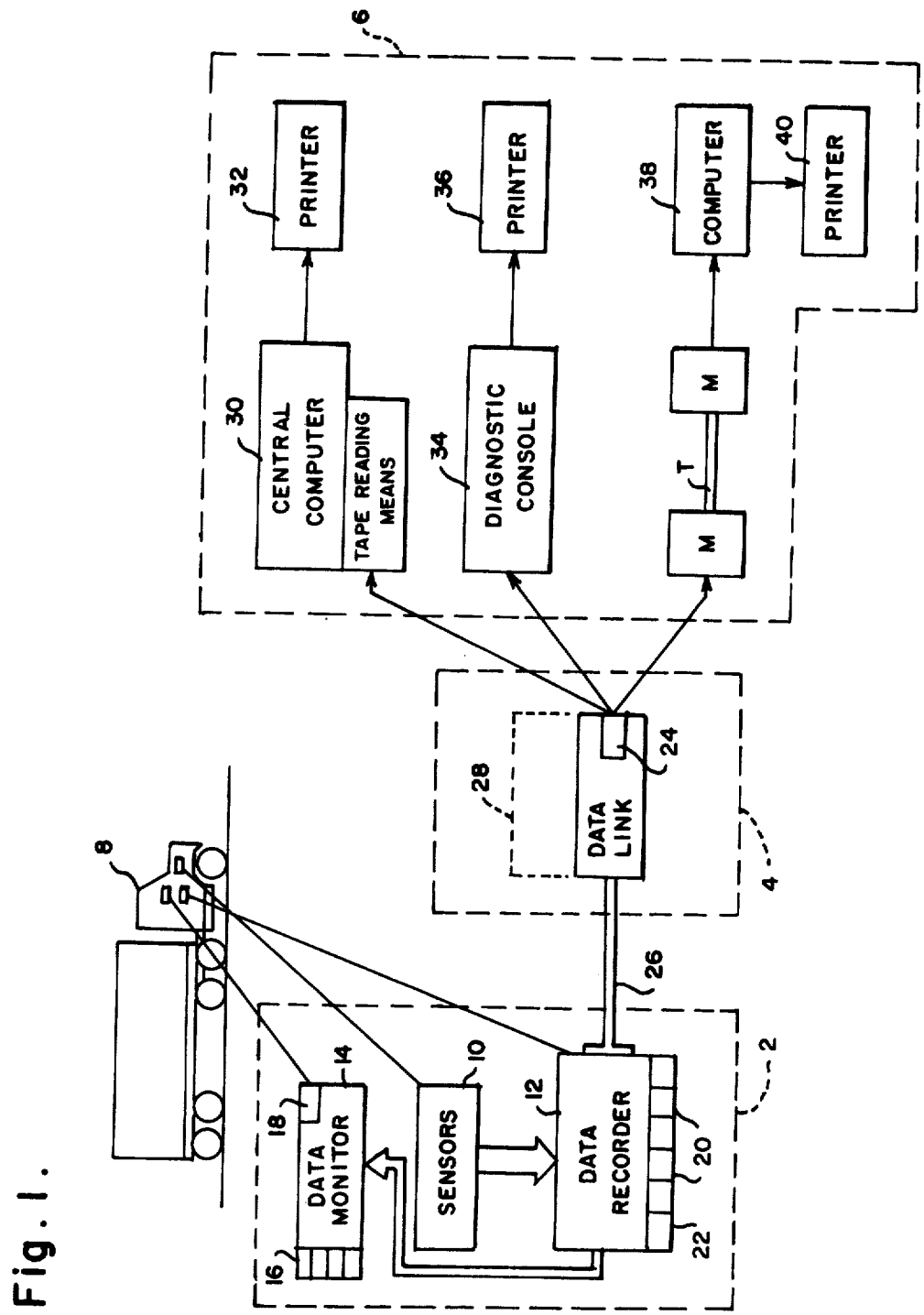
FIG. 1 is an overall block diagram of the vehicle monitoring and recording system.

A block diagram of the vehicle monitoring and recording system 1 in accordance with the invention is illustrated in FIG. 1. The system has three major components, namely, an on-board subsystem 2, a portable data link 4 and a remote data processing subsystem 6. The on-board subsystem 2 is indicated as being housed within a vehicle such as the cab of truck 8 and is seen to comprise a plurality of sensors generally indicated at 10, a data recorder 12 and a data monitor 14. The sensors 10 are positioned in various locations throughout the vehicle and typically provide both analogue and digital signals to the data recorder 12. The data recorder 12 is in turn interconnected to the data monitor 14 so that the operator of the vehicle may have access to the sensor data on a real time basis. An input means such as a plurality of switches 16 are provided on the data monitor to allow the operator to select particular data for display on display means 18. The display means 18 may comprise, for example, a seven segment LED display. The data recorder 12 may also comprise a plurality of switches 20 for manual input of data to be recorded. Switches 20 may in fact comprise an entire keyboard so that digital data or coded data may be fed into the data recorder 12. For example, when the vehicle passes across a state line the operator may enter a code representing the new state entered which will automatically effect recordation of the time of day and odometer reading to form a record for tax rebate purposes. Further, switches 20 may comprise designated input keys such as a "snapshot" key 22 which effectively enables the data recorder to record all sensed data at that particular instant of time. In this manner, the vehicle operator may override automatic data recording at will as, for example, upon the occurrence of an abnormal operating condition. The snapshot key 22 thus permits recording of data at the instant the operator notices an abnormal condition, thus permitting a correlation of the time at which the condition occurred thus allowing for proper reconstruction of the malfunction during off-line processing. The data monitor 14 is not required for operation of the system 1 and indeed, the apparatus may be employed only utilizing the sensors 10 and data recorder 12.

The portable data link 4 is utilized to extract data from the data recorder 12 and store same onto a magnetic tape means 24. A flexible cable 26 is provided with pin connected terminals to allow simple connect/disconnect capabilities of the data link 4 to the data recorder 12. Transmission of data from the data recorder 12 to the data link 4 is achieved by a read command provided by switches 20. The data link 4 may also comprise display means generally indicated at 28 for displaying data stored on the magnetic tape means 24. Typically, the data link 4 operates on its own battery source (not shown).

Vehicle data on tape 24 is transmitted to the remote computing subsystem 6 for detailed processing of the data originally stored in memory means of the data recorder 12. A number of different paths for data processing are illustrated in FIG. 1. For example, the magnetic tape means 24 may be fed to input means of a central computer 30 where data may be sorted and formated for printing on printer 32. Alternately, the data from the magnetic tape means 24 may be fed into input means of a diagnostic console 34 where the data may be sequentially viewed on display means thereof. For example, data associated with a particular day's operation may be scanned without any prior sorting and utilized by mechanics as a diagnostic tool. The diagnostic console 34 may additionally be utilized to provide the tape data to a printer 36 to provide hard copies of the daily operating parameters. Yet additionally, data from the magnetic tape means 24 may be applied to a modem communication link M for transmission over telephone lines T for subsequent feeding to a distantly located computer 38 and printer 40. It is clear that the cable 26 of the data link may alternately serve as a means for reading the data from tape means 24 into any of the processing channels set forth in FIG. 1.

The particular type of data that may be provided as an output from the remote data processing subsystem 6 is illustrated hereinbelow. A particular example of a truck fleet report may comprise three major sections, namely, a vehicle utilization report, a performance exception report and a parameter profile report. The vehicle utilization report may comprise a summary of information which is related to the modes of vehicle use over the reporting period and is typically reported on a daily basis. Such information may be provided, as, for example, vehicle mileage, fuel consumption, engine operating hours, average MGP, average speed etc. The information thus provided at the output of the remote data processing subsystem 6 for this type of report is illustrated in Table I. Thus, it is seen that on Apr. 20, 1977 vehicle No. 1234 consumed 0.1 of a gallon of fuel when the engine was operating at road speeds. The relative inactivity of the vehicle on the day in question is thus easily apparent. In this fashion, a truck fleet manager has easy access of the daily activity of each of a large number of vehicles. Total figures for the period of time in question may also be provided. Vehicle status codes are used to indicate which sensed parameters exceeded their corresponding threshold values and the correspondence of the vehicle status code with the sensed operating parameters are indicated in Table II.

TABLE I

| DATE | | ENG HRS | FUEL GAL | TOTAL MILES | AVE SPD | AVE MPG | VEHICLE STATUS |
|---|---|---|---|---|---|---|---|
| Vehicle No. 1234 Vehicle Trip Report 4/20/77 Thru 4/22/77 | | | | | | | |
| 4/20/77 WED | Idle | .21 | .1 | | | | |
|  | Road | .12 | .3 | .3 | 2.5 | 1.2 | — |
| 4/21/77 | Idle | 6.10 | 1.9 | | | | |
|  | Road | 17.67 | 211.6 | 951.0 | 53.8 | 4.5 | D |
| 4/22/77 | Idle | 3.15 | 1.0 | | | | |
|  | Road | 7.49 | 79.2 | 405.8 | 54.2 | 5.1 | DE |
| Total | | 9.46 | 25.28 | 294.1 | 1357.1 | 53.7 | 4.6 DE |

A representative example of the performance exception report is shown in Table II. In this type of report only abnormal vehicle operating parameters are recorded. For example, on Apr. 21, 1977 the battery voltage was seen to reach a peak value of 13.5 volts which is above the normal or threshold value in this case of 12.7 volts. The number of times the battery exceeded the threshold value is also indicated as well as the duration in hours during which such excess existed. On the same day, oil pressure is seen to have dropped to a peak low value of 2.5 PSI in comparison with a threshold value of 20 PSI. Further, the oil pressure dropped below threshold a total of five times for a total duration of 0.05 hours. (An asterisk next to the parameter measured indicates a below threshold parameter). Table II thus provides valuable data that may be utilized for routine maintenance purposes as well as to anticipate near future maintenance adjustments in addition to diagnostic testing and analysis.

periodic times, as for example, whenever the engine is turned off or, if desired, at twelve midnight of every day. In yet another example the computer modules within the data recorder 12 may store a data snapshot only if a programmed criteria is met, which criteria may involve an interrelationship of a plurality of sensed vehicle parameters. Specifically, a data snapshot could be taken every hour if the vehicle is continually traveling over 30 mph and the engine is revolving at greater than 1200 rpm during the entire hour. This criteria will essentially ensure that the data snapshot corresponds to highway usage. Thus, valuable specific data can be maintained to provide individual dynamic vehicle histories for comparative studies providing a unique source of data for maintenance and diagnostic use.

Further, by utilizing the snapshot key 22, the operator may manually initiate a data snapshot recording whenever desired, as for example, upon detection of some abnormal running condition.

TABLE II

| VEHICLE STATUS | PARAMETER | DATE | DURATION | # OF EVENTS | PEAK VALUE | THRESHOLD |
|---|---|---|---|---|---|---|
| Vehicle No. 1234 Abnormal Vehicle Operation 4/20/77 Thru 4/22/77 | | | | | | |
| D | MPH | 4/21/77 | 6.41 | 81. | 81. | 60. |
| D | MPH | 4/22/77 | 3.74 | 55. | 72. | 60. |
| E | RPM | 4/22/77 | 3.20 | 74. | 2280. | 1950. |
| 0 | Bat Vlt | | | | | 12.7 |
|  |  | 4/21/77 | 16.66 | 1. | 13.5 | 12.7 |
|  |  | 4/22/77 | 6.74 | 2. | 13.5 | 12.7 |
| 1 | Oil Pres* | | | | | 20.0 |
|  |  | 4/21/77 | .05 | 5. | 2.5 | 20.0 |
|  |  | 4/22/77 | .03 | 3. | 8.4 | 20.0 |
| 6 | C. Pres* | | | | | 10.0 |
|  |  | 4/21/77 | 16.20 | 4. | .0 | 10.0 |
|  |  | 4/22/77 | 6.72 | 1. | .0 | 10.0 |
| 7 | Air Pres* | | | | | 70.0 |
|  |  | 4/21/77 | 4.56 | 31. | 18.0 | 70.0 |
|  |  | 4/22/77 | 1.67 | 47. | 46.0 | 70.0 |
|  | IGN ON/OFF | | | | | |
|  |  | 4/20/77 | | 4. | | |
|  |  | 4/22/77 | | 1. | | |

It will also be appreciated that the storage of data within the data recorder 12 is greatly compressed inasmuch as the computer software performs a data threshold function so as to store only the number of times a threshold is exceeded, the time duration and the peak value. It is thus not necessary to allocate large sections of memory or utilize large amounts of magnetic tape and the like to continuously store all operating parameters as is typical with prior art systems.

The parameter profile report is illustrated in Table III. Typically, the information provided represents a data snapshot of all parameters at the particular time listed. The computer module within the data recorder 12 may automatically record data snapshots at various

TABLE III

DATA SNAPSHOT - Vehicle No. 1234

| PARAMETER | DATE 4/21/77 | DATE 4/21/77 | DATE 4/22/77 |
|---|---|---|---|
| TIME | 2:30 | 6:39 | 1:16 |
| MILEAGE | 45.1 | 276.6 | 30.0 |
| MILES PER GALLON | 3.9 | 6.0 | 6.6 |
| MILES PER HOUR | 59. | 57. | 55. |
| RPM | 1810. | 1840. | 1720. |
| BATTERY VOLTS | 13.0 | 13.1 | 13.0 |
| OIL PRESSURE | 48.6 | 48.3 | 47.6 |
| FUEL FILTER | 2.0 | 3.0 | 2.3 |
| COOLANT PRESSURE | 3.0 | 5.0 | 3.5 |
| AIR PRESSURE | 75. | 87. | 86. |
| BRAKE TEMP | 85. | 68. | 82. |
| COOLANT TEMP | 158. | 162. | 159. |
| FUEL TEMP | 39. | 51. | 62. |

TABLE III-continued

DATA SNAPSHOT - Vehicle No. 1234

| PARAMETER | DATE 4/21/77 | DATE 4/21/77 | DATE 4/22/77 |
|---|---|---|---|
| OIL, COOLANT LEVEL* | 3 | 3 | 0 |

Legend - Oil,Coolant Level*
0 - Both levels low
1 - Oil level low
2 - Coolant level low
3 - Both levels satisfactory

On-Board Subsystem

Figure 2:
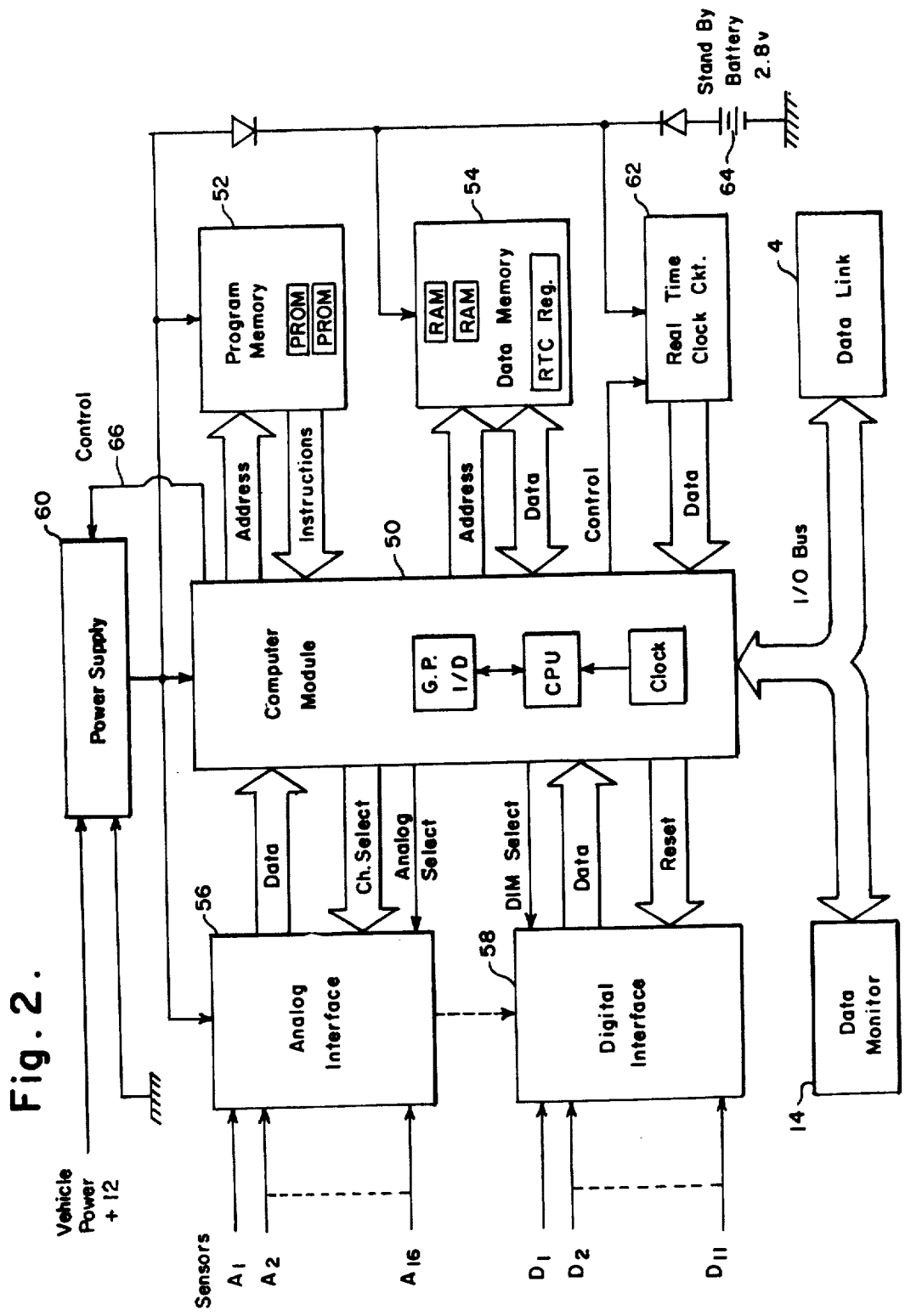
FIG. 2 is a block diagram of the on-board subsystem in accordance with the invention.

A block diagram of the on-board subsystem 2 is illustrated in FIG. 2. The on-board subsystem 2 is seen to comprise a computer module 50, program memory 52, data memory 54, analog interface 56, digital interface 58, power supply 60 and real time clock circuit 62. The analog interface 56 receives analog data from a plurality of sensors along lines generally designated A1-A16. Similarly, digital interface 58 receives a plurality of input digital signals from digital sensing means along lines generally designated D1-D11. It is clear that any number of analog and digital sensors may be employed consistent with the use requirements of the system.

The computer module 50 may comprise any of a number of well known microprocessors currently available. For example, a suitable device is the PPS-8 microprocessor including associated general purpose I/O, clock generator and memory units manufactured by Rockwell International Corporation, Anaheim, California. The program memory 52 may comprise, for example, a programmable read only memory (PROM) and may be fabricated utilizing PROM chips, Model No. NM5204Q. A plurality of address lines are provided from the computer module 50 to selectively address locations within the program memory 52. Sequentially addressed locations provide instructions fed to the computer module 50 governing the polling routine for the sensing data, threshold data selection requirements and the like. The program residing in program memory 52 may be tailored to specific user uses to govern the manner in which the data is polled and the format of the data stored in data memory 54.

Data memory 54 may comprise, for example, dynamic random access memory (RAM) chips for permitting storage of processed data from the computer module 50 and may be fabricated utilizing thirty-two by one bit RAM chips, Model No. MM74C929. A plurality of address and data lines interconnect the data memory 54 to the computer module 50 to permit bidirectional data transfer to selected memory addresses. A selected address within the data memory may be chosen to serve as a real time clock register.

A real time clock circuit 62 is also provided on the on-board subsystem 2 and is utilized to provide clock pulses to the computer module 50 for time keeping purposes. Additionally, the real time clock circuit 62 provides clock pulses to a separate counter which forms part of the clock circuit and is utilized to maintain accumulated time when the computer module 50 is shut down as, for example, when the engine is turned off. A standby battery 64 is interconnected to the real time clock circuit 62 as well as the data memory 54. When the engine is shut down, the standby battery 64 is utilized to provide the necessary operating voltages for the real time clock circuit 62 to power the separate counter contained therein. Further, standby battery 64 maintains operating voltages to the RAM chips within data memory 54 so that data memory 54 is effectively a nonvolatile memory. Normally, during engine operating conditions, power supply 60 supplies the necessary voltage requirements to data memory 54 and real time clock circuit 62 as well as the other units residing on the on-board subsystem 2. Thus, system power is derived from the 12 volt vehicle battery (not shown) and power supply 60 provides the necessary power conversion, conditioning and regulation for distribution to the various modules and sensors. A control line 66 is shown connecting the computer module 50 to the power supply 60. The control line thus permits microprocessor control of the power supply shut-down to all modules, with the exception, of course, of the data memory 54 and real time clock circuit 62 which are at that time supplied by the standby battery 64. The computer module 50 thus senses ignition turnoff or power failures as high priority interrupts and the normal activity of the microprocessor is suspended in favor of a data protect or shut-down routine. After all data being processed is properly stored, the last instruction of the shut-down routine effectively implements the power supply shutdown (via line 66) which in turn shuts down power to the computing module itself. This mode of controlled shut-down assures safe preservation of critical data regardless of the cause of the power loss. Data is likewise preserved prior to a CPU directed power shut-off in response to a sensed engine-off condition.

Analog Interface

Figure 3:
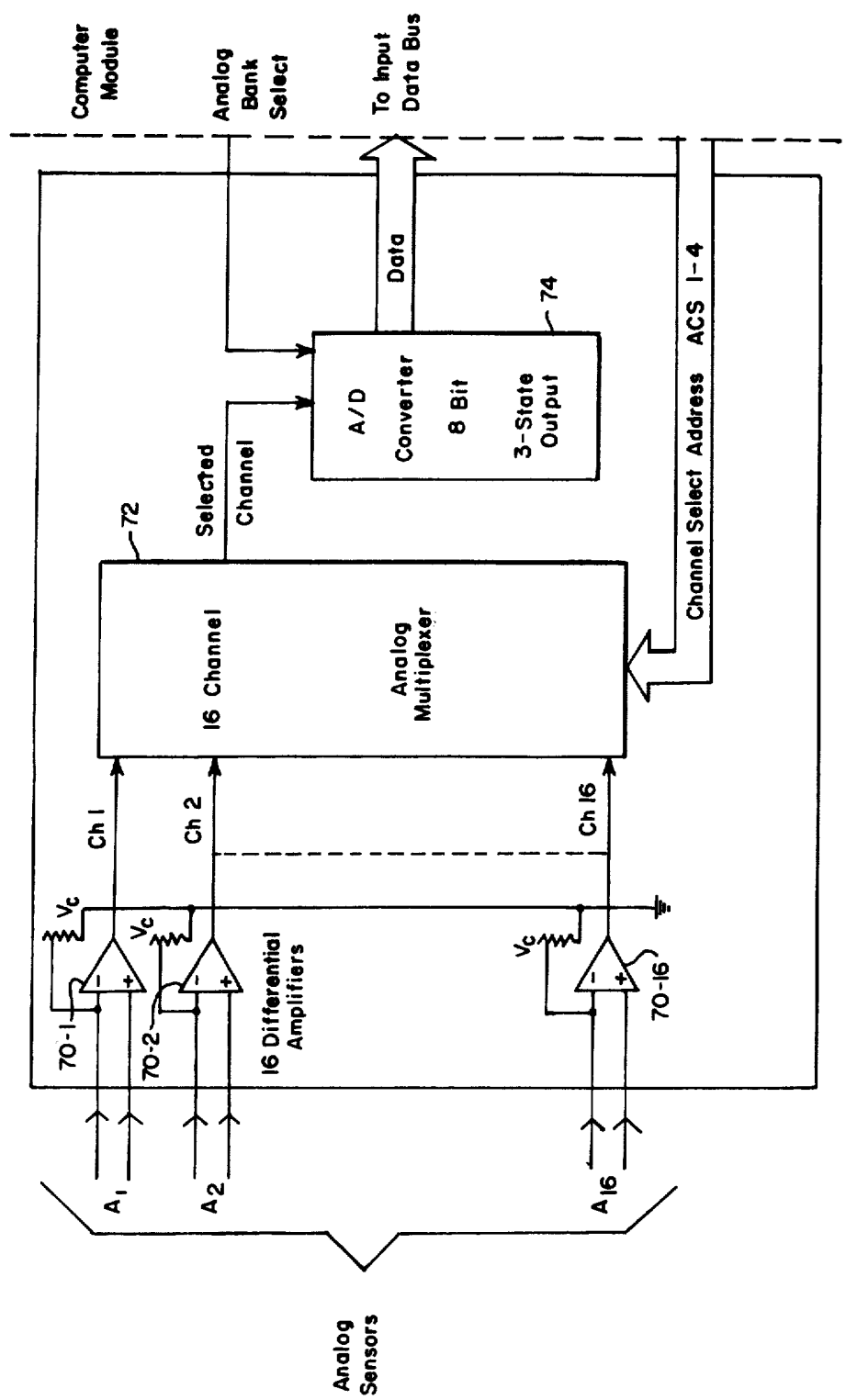
FIG. 3 is a schematic diagram of the analog interface.

A block diagram of the analog interface 56 is shown in FIG. 3. Typically, each analog channel provides a difference input signal to a voltage comparator 70, as for example, National, Model No. LM124AN. Each of the voltage comparators is identified by a channel suffix to designate the corresponding analog input channel. It is also noted that each voltage comparator 70 has a corresponding reference potential input which may be individually set at a desired voltage level. Noise discrimination filters and gain control resistor circuits may also be provided (not shown). Each of the outputs of the voltage comparators 70 are fed to a sixteen channel analog multiplexer 72 (as for example two eight channel data selectors, Model F34051) where the analog data is sequentially selected and fed to an analog-to-digital converter 74. The converted digital data is then fed to the computer module 50 for further processing.

Digital Interface—Overview

Figure 4:
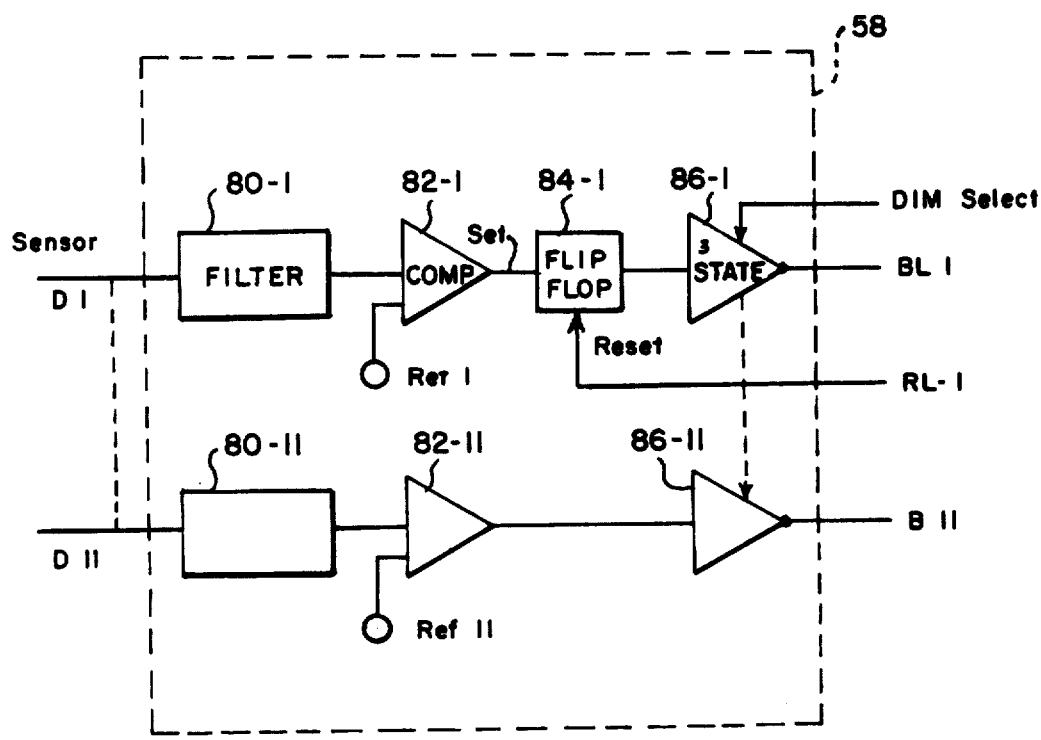
FIG. 4 is a schematic diagram showing an overview of the digital interface.

FIG. 4 is a schematic diagram of the digital interface 58. Two representative digital channels are illustrated corresponding to a first channel providing sensed data along line D1 and a last channel providing sensed data along line D11. The channel associated with line D1 is shown to comprise a filter 80, comparator 82, flip-flop 84 and tri-state buffer 86. After filtering of the data in filter 80 the data is compared to a reference voltage source which is utilized to discriminate the sensed data signal from noise levels. The output of comparator 82 is then utilized to set flip-flop 84 which remains set until reset by the microprocessor along reset line RL-1. The microprocessor may select the output from channel 1 as well as the remaining channels by means of enabling the tri-state buffer 86 via a control signal along line DIM select (digital interface module-select). The channel associated with the digital sensor having an input along line D11 likewise comprises a filter 80, comparator 82 and tri-state buffer 86. In this case, however, the flip-flop 84 is not utilized. These channels typically represent signal levels which do not change very often and consequently do not have to be latched in a flip-flop. As before, suffixes have been utilized to designate the channel associated with the various devices 80, 82, 84 and 86.

Digital Interface—Detailed Description

Real Time Clock Circuit

Figure 5:
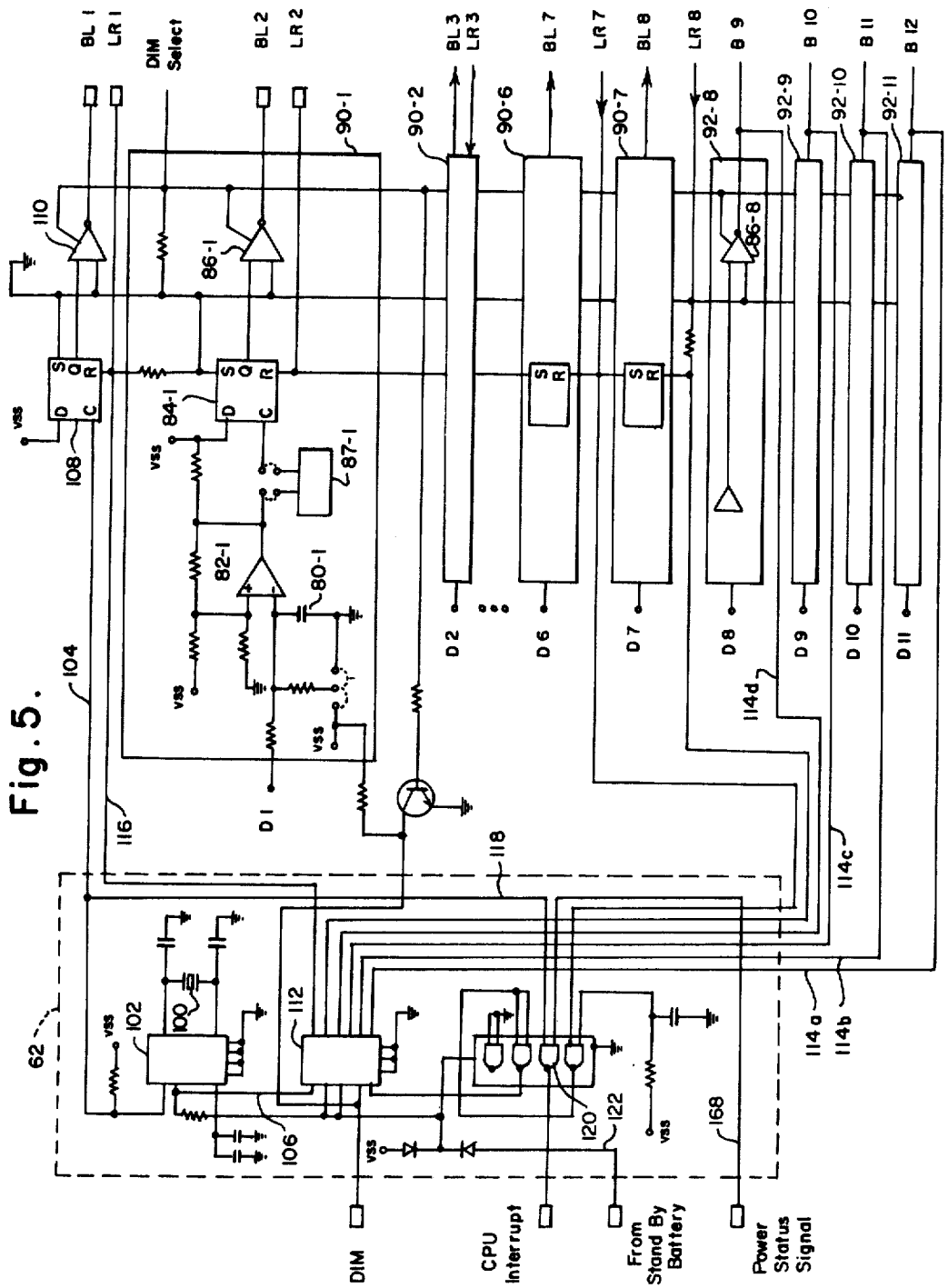
FIG. 5 is a detailed schematic diagram of the digital interface and the real time clock circuit.

A more detailed circuit diagram for the digital interface 58 is shown in FIG. 5. Also illustrated in FIG. 5 is a schematic diagram for the real time clock circuit 62. Each channel of the digital interface circuit 58 is seen to comprise a filter 80, comparator 82, flip-flop 84, tri-state buffer 86 and a programmable divide by N counter 87. The programmable divide by N counter is utilized for relatively high frequency input signals as, for example, engine RPM and provides a single output pulse for a programmable number of input pulses. Effectively then, counter 87 slows down the pulse rate for high frequency input signals. These devices, namely devices 80, 82, 84, 86 and 87, interconnected as a unit shown in the Figure form a digital channel interface circuit generally designated 90. Identical circuits are provided for each of the signal channels D2-D7 with small changes as shown associated with the latch reset lines LR7 and LR8 associated with channels 6 and 7 respectively. A similar but not quite identical digital interface circuit is shown at 92 associated with input signals D8-D11. The difference between the digital channel interface circuits 90 and 92 is simply the removal of the flip-flop and the former circuit (see also FIG. 4).

The DIM select signal is an address decode off of the address lines of the computing module 50 and is normally low (logical zero or zero volts) to pass therethrough the signals from the data input lines D1-D11. When the DIM select signal goes high, the tri-state buffers are placed in a high impedance state with the buffer outputs left floating. As such, additional signals interconnected to the output terminals of the buffers 86 may be utilized to feed the input data lines to the central processing unit (CPU) of the computer module 50. Thus, signals tied to the outputs of buffers 86-8, 86-9, 86-10 and 86-11 may be passed to the data input lines of the CPU whenever the DIM select signal is not low, e.g. whenever the $\overline{DIM}$ signal is present. In this fashion, the tri-state buffers 86 may be utilized to multiplex various signals into the data lines of the CPU. The data input terminals in FIG. 5 are identified as BL1-BL8 and as B9-B12. Reset signals to the flip-flops 84 are fed by the CPU after reading data along terminals BL1-BL8 to reset the corresponding flip-flops 84.

The real time clock circuit 62 is utilized to provide clock signals which are received either by the computer module 50 or by a separate counter in the event that the computer power is turned off, e.g. the vehicle ignition is off. Thus, the real time clock circuit is seen to comprise a crystal oscillator 100 which provides clock signals of 4.194 MHz to a frequency division and conditioning network 102 as, for example, Intersel Model No. 1MC7213. The frequency division and conditioning network 102 divides the crystal clock signals to provide a 16 Hz clock signal along line 104 and a 1 ppm signal along line 106. The 16 Hz clock signals along line 104 are fed to flip-flop 108 and through tri-state buffer 110 to the data terminal BL1 for input to the computer module 50. Normally, the DIM select signal is low thus enabling a continual source of 16HZ clock signals utilized by the computer module 50 for real time clock tracking purposes.

The one pulse per minute (ppm) clock signal is fed from the frequency division and conditioning network 102 to a five stage decade counter 112 which may be, for example, Motorola Model No. 4535. The five stage decade counter counts the 1 ppm pulses and sequentially reads each digit out as a binary coded decimal (BCD) along lines 114a-114d. The BCD digits from decade counter 112 are thus provided at terminals B9-B12 and are multiplexed into the data bus of the computer module 50 upon the occurrence of the $\overline{DIM}$ signal. It is noted, however, that decade counter 112 is continually reset by the reset line from the computer module 50 at terminal LR1 whenever the CPU of the computer module 50 is operative. Thus, whenever the ignition is on and the vehicle is operating it is a function of the computer module 50 to keep accurate real time and the decade counter 112 is continually reset along terminal LR1 and line 116.

The 16 Hz is also fed along line 118 to one input of NAND gate 120. A second input of the NAND gate 120 is provided by a power status signal supplied from the power supply 60. The power status signal is normally high (logical 1 or 5 volts) when the power supply is operating at acceptable voltage levels. Consequently, the output of NAND gate 120 provides an interrupt signal to the CPU in time synchronism with the 16 Hz clock signals. Upon receipt of the interrupt signal the CPU of the computer module 50 examines the signal from input terminal BL1 and, if a clock signal exists the interrupt is interpreted as a clock signal interrupt. As such, the computer software updates the real time clock and resets the clock flip-flop 108. The polling time for the CPU to cycle through all of the digital as well as analog input signals is typically on the order of 4 ms. An interrupt signals is, of course, serviced at the highest priority. If a clock pulse does not exist along the data line associated with the input terminal BL1 then the software program governing the computer module 50 interprets the interrupt as a power failure condition and a data protect or shut-down sequence is instituted.

When the vehicle ignition is turned off all power to the system is terminated with the exception of power provided by the standby battery 64 to the real time clock circuit 62 and data memory 54 (see FIG. 2). It is important to note, however, that it is the CPU which is responsible for the power shut down to the on-board subsystem 2. Thus, as seen in FIG. 5, the standby battery power is fed along line 122 to the decade counter 112 as well as the frequency division and conditioning network 102. As such, the 1 ppm pulses are continually stored in the five stage decade counter 112 and thus maintain accurate time even though the engine is inoperative. It is further pointed out that this time keeping function is maintained even if the vehicle battery is completely removed as may be entirely appropriate during a maintenance procedure. The standby battery 64 may typically be housed on the RAM memory board of the data memory 58 and is not effected by removal of the vehicle battery.

After the vehicle is started and power is again supplied to the computer module 50 as well as the other units of the on-board subsystem 2, it is necessary to update the real time counter residing in the data memory 54. Typically, when the computer is operative one or more memory locations within the data memory 54 will be utilized to provide the real time keeping function. When the computer is turned off these data memory locations are no longer operated but the information is nevertheless preserved by means of the standby battery 64, e.g. the memory is non-volatile. It is consequently only necessary to add to the contents of the real time clock counters within data memory 54 the time increment during which the CPU was inoperative i.e. the time increment during which the vehicle engine was turned off. Inasmuch as a five stage decade counter only counts in increments of minutes it is necessary to update the real time clock registers in data memory 54 at the exact time at which the one minute pulse increments the register. Thus, the updating of the real time counters is done when the five stage decade counter increments to the next succeeding minute. At most, it can take only one minute in order to bring the real time clock residing in the data memory up to data. The computer program memory residing in program memory 52 directs the computer module 50 to continually examine the least signficant bit of the decade counter 112. The BCD digits are fed to the data bus of the CPU along lines 114a–114d when the engine is first started up and the CPU continually issues a $\overline{\text{DIM}}$ signal to provide a continual sequential readout of the data from decade counter 112. All of the digits which sequentially appear on lines 114a–114d are stored in a temporary time register within the data memory 54. The least significant bit of this temporary time register is continually monitored by the CPU and upon a one increment change thereof the time interval in the temporary time register is utilized to update the real time registers of the data memory 54. At this time the $\overline{\text{DIM}}$ signal is removed and the DIM select signal is consequently generated to enable passage of the 16 Hz clock signals to pass to the CPU. In this fashion, the contents of the decade counter 112 are utilized to maintain an accurate real time counter within the CPU even though the counter 112 counts at rather large increments of 1 ppm. Synchronizing the transfer of the counter 112 to the real time register within the data memory 54 enables accurate real time tracking even after temporary inoperability of the CPU.

Power Supply Circuit

Figure 6:
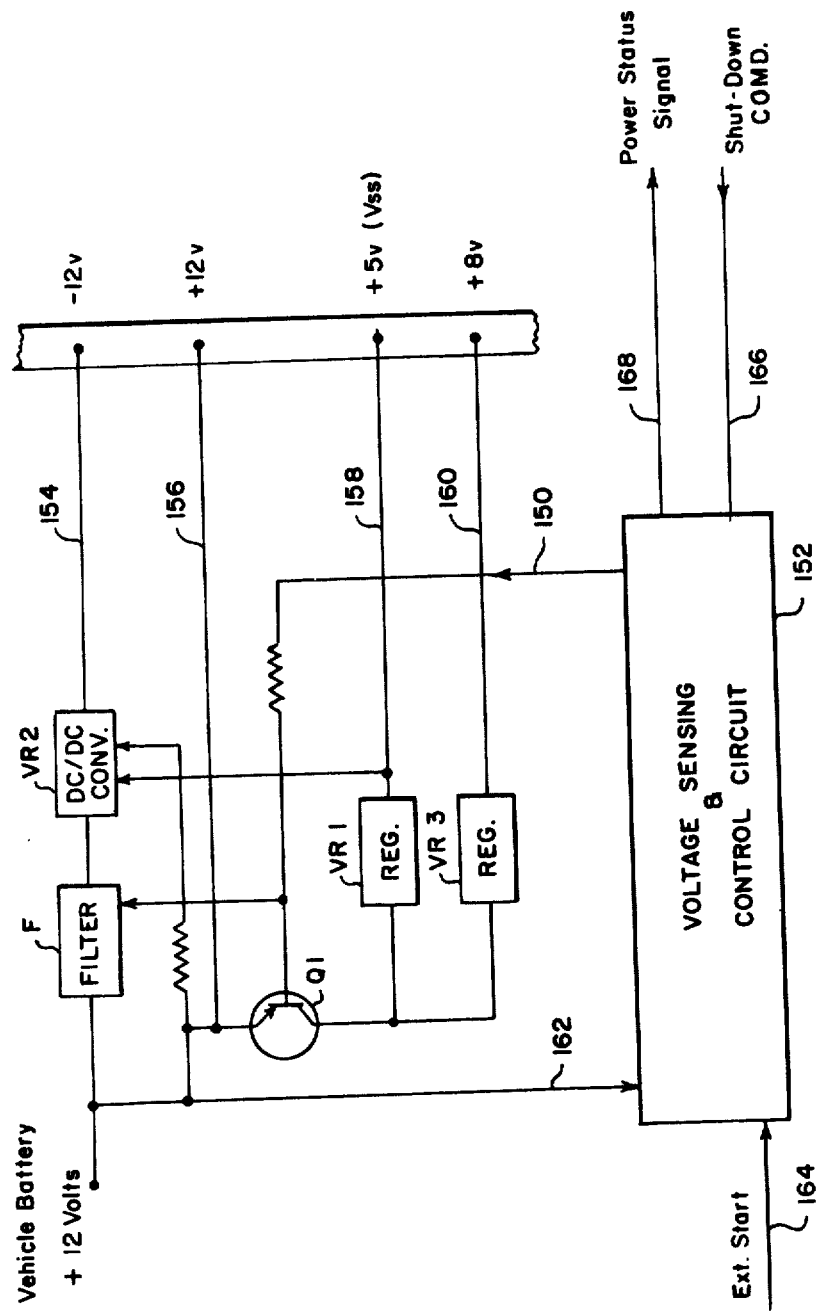
FIG. 6 is a block schematic diagram of the power supply circuit.

FIG. 6 is a block schematic diagram of the power supply 60. The power supply 60 is seen to comprise a filter F, power transistor Q1 and voltage regulators VR1-VR3. Typically, the vehicle battery supplies a 12 volt signal to the emitter junction of power transistor Q1. The base of transistor Q1 is connected by means of a line 150 to a voltage sensing and control circuit 152 which is further described in connection with FIG. 7. Essentially, voltage sensing and control circuit 152 operates to turn on and off the power transistor Q1. In turn, power transistor Q1 is connected for operating voltage regulators VR1-VR3 to provide various output voltage signals along lines 154, 156, 158 and 160. These lines provide respectively voltage levels of −12 v, +12 v, +5 v and +8 v. These voltage levels are utilized to power the various other circuits illustrated in FIG. 2. It is important to realize, however, that all voltage levels are essentially controlled by the power transistor Q1 which in turn is controlled by the voltage sensing and control circuit 152.

A first input to the voltage sensing and control circuit 152 is provided by means of a line 162 which directly supplies the vehicle battery voltage which is subsequently sensed in circuit 152. A further input of the voltage sensing and control circuit 152 is provided by an external start signal along line 164. This signal is provided from the ignition switch and is present whenever the ignition switch is turned on and the engine is in the cranking mode. A further input to the voltage sensing and control circuit 152 is provided from the central processing unit of the control module 50. This signal is the shut-down command provided along a line 166. This command is issued by the CPU of the computer module 50 whenever the detected battery voltage level is below acceptable limits or whenever the CPU detects an engine shut-down condition as for example when the engine is manually turned off. The voltage sensing and control circuit 152 provides a power status signal to the CPU of the control module 50 along line 168. This signal is normally high (nominally 5 volts) but goes low upon detection of an abnormal battery voltage condition. It is this signal, the power status signal, that essentially initiates a data protect or shut-down sequence within the CPU. After the shut-down sequence is completed the CPU then issues the shut-down command to the voltage sensing and control circuit 152 which subsequently turns off the power transistor Q1 thereby shutting down the entire power supply.

Figure 7:
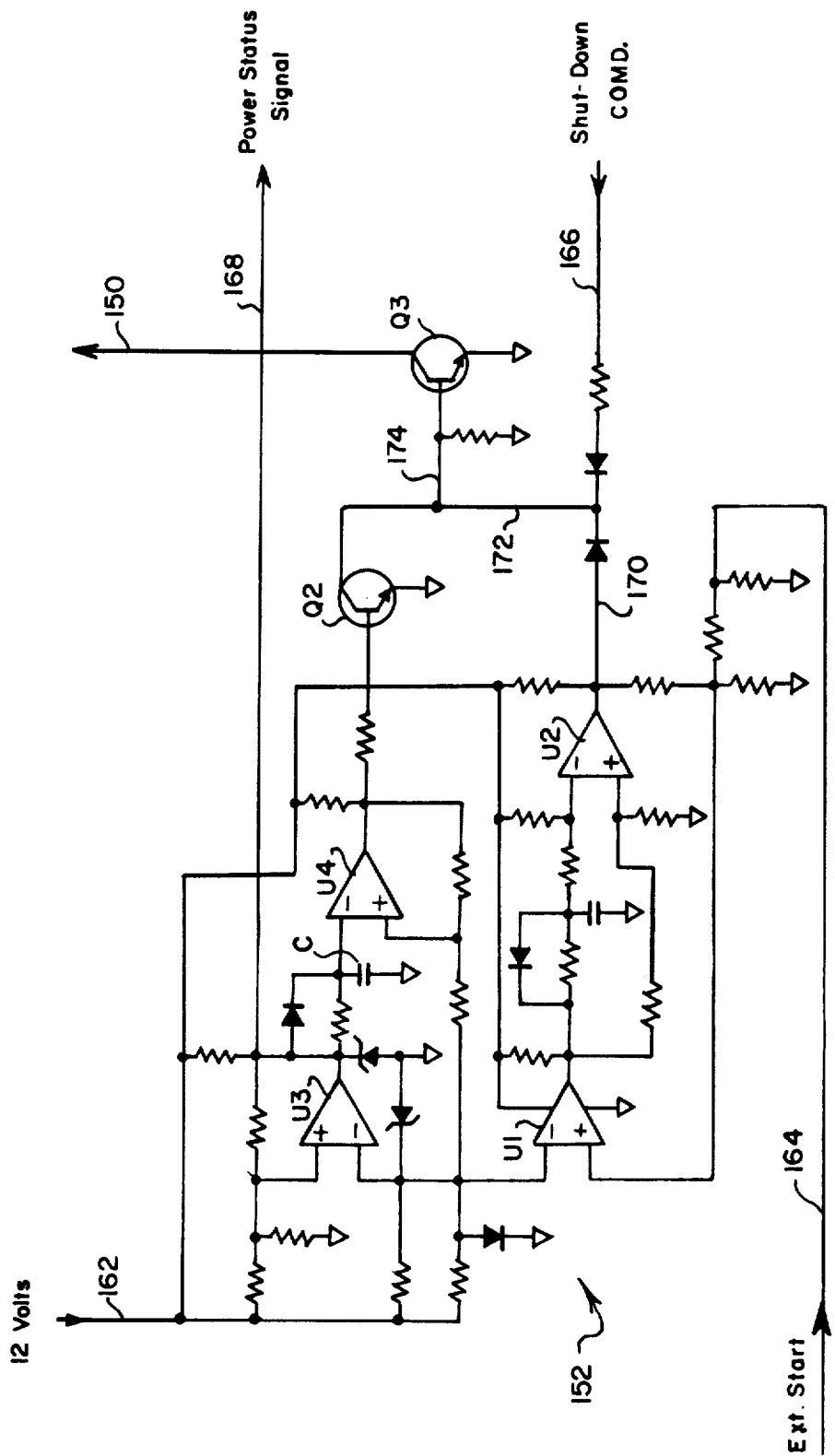
FIG. 7 is a detailed schematic diagram of the voltage sensing and control circuit of FIG. 6.

A schematic diagram of the voltage sensing and control circuit 152 is illustrated in FIG. 7. The voltage sensing and control circuit 152 is seen to comprise a plurality of voltage comparators, U1-U4 and transistors Q2 and Q3. A number of resistors, Zener diodes and diodes are also provided interconnecting the various elements as shown.

The power status signal along line 168 is indicative of the status of the power supply, namely, the vehicle battery power supply which is nominally 12 volts. The 12 volt battery signal is fed into the voltage sensing and control circuit 152 along line 162 and is connected to the positive input of the voltage comparator U3. The output of voltage comparator U3 is normally 5.1 volts maintained by the Zener diodes at the output thereof. Thus, the normal status of the power status signal is a logical 1 corresponding to the 5 volt output of comparator U3. However, the output of comparator U3 will go to zero whenever the voltage magnitude at the minus input is larger than that at the positive input. This condition occurs when the vehicle battery voltage drops below acceptable levels which may, for example, be set at a threshold of approximately 5 volts. The threshold may obviously be selected by means of the resistors dividing the voltage to the inputs of comparator U3. Comparator U3 thus provides a means to sense the vehicle battery source and provide an output signal, the power status signal indicative of the acceptable or unacceptable condition of the vehicle battery. If the power status signal drops to zero volts, the CPU of the computer module 50 will initate a data protect and shut-down sequence and subsequently issue a shut-down command over line 166.

The operation of the voltage sensing and control circuit 152 may be best understood by assuming initially that the vehicle engine is turned off. Under such circumstances, the external start signal along line 164 and representative of an ignition on condition is a logical zero corresponding to 0 volts. This 0 volt signal is fed to the positive input of voltage comparator U1. However, the negative input of voltage comparator U1 is at a higher potential than the positive input inasmuch as this input receives a divided voltage from the vehicle battery source, e.g. non-zero. Under these circumstances the voltage comparator output is low thus forcing the output of voltage comparator U2 to be also low. The zero volt output of voltage comparator U2 is fed via lines 170, 172 and 174 to the base of control transistor Q3. The zero volt on the base of transistor Q3 maintains the transistor in a non-conducting state. The collector of transistor Q3 is connected, however, via a line 150 to the power transistor Q1 (see FIG. 6). Consequently, whenever the control transistor Q3 is off the power transistor Q1 will likewise be off and no power will be delivered to the system.

Let us now assume that the operator of the vehicle turns on the ignition switch and consequently causes the external start signal on line 164 to go high. This high signal is fed to the positive input of voltage comparator U1 forcing its output high and forcing the output of voltage comparator U2 high. In turn, control transistor Q3 turns on giving power to the entire system including the CPU of the computer module 50. After the CPU of the computer module 50 is energized a normal polling sequence examines the power status signal on line 168. Assuming that the vehicle battery source is within acceptable limits, no shut-down signal will be issued. The shut-down command along line 166 is 0 volts to force a shut-down, and nominally 5 volts when no shut-down is desired. Consequently, a 5 volt signal is fed from the CPU of the computer module 50 along lines 166, 172 and 174 to the base of control transistor Q3. Consequently, even after the operator has released the ignition key, the control transistor Q3 will be maintained on since the base voltage is now supplied by the CPU itself which has subsequently been brought up to power.

The CPU may now detect a shut-down condition as, for example, by means of one of the digital or analog sensors. For example, engine rpm may be continually monitored and the absence of an rpm signal triggers the CPU to enter the data protect and shut-down mode. At such time, a 0 volt signal is applied as the shut-down command along lines 166, 172 and 174 to turn off control transistor Q3 and subsequently turn off the power transistor Q1. Nominally a power off condition is detected during a typical polling sequence which may last on the order of 4 ms and the data protect and shut-down routine proceeds immediately in response thereto.

The shut-down command may also be given by the computer module 50 in response to a battery failure condition which would be detected by the CPU by means of the power status signal on line 168. An additional shut-down procedure is also provided in the event of excessive battery drain by means of voltage comparator U4 and transistor Q2. Normally, when the output of voltage comparator U3 is high (corresponding to an acceptable operating condition) the output of comparator U4 is low and thus transistor Q2 is non-conducting. However, when the vehicle battery voltage is inadequate (below 5 volts for example), the output of voltage comparator U3 goes to 0 volts thus forcing the output of voltage comparator U4 to a high state. The output of voltage comparator U4 turns on transistor Q2 which in turn turns off the control transistor Q3 thus shutting down power. It is important to note, however, that voltage comparator U4 does not change state instantaneously in response to a low voltage signal at the output of voltage comparator U3. In effect, capacitor C connected at the negative input terminal of voltage comparator U4 maintains a high voltage at the input to the negative terminal thus maintaining the output of U4 in a low state for a time delay roughly on the order of 1-2 seconds. This time delay is effective to permit the CPU of the computer module 50 to detect the power status signal (which immediately goes to 0 volts as per the output of voltage comparator U3) and initiate the data protect and shutdown sequence. If the CPU is operating properly through the entire shut-down routine the CPU itself would issue the shut-down command well in advance of the time delay supplied by capacitor C. However, in the event that no shut-down command ever gets issued, the voltage comparator U4 and transistor Q2 insure that after the time delay the control transistor Q3 will be turned off thus shutting down power to the system.

Further details of the operation of the micro processor are set forth in the computer print-out of this specification.

The word vehicle as utilized herein and in the appended claims is not intended to be restricted to truck but generally applies to all forms of vehicles including by way of example, boats, airplanes, trains, tractors, off-highway machines, etc. More generally, a "device" utilizing the principles of the invention is intended to encompass not only vehicle but stationary apparatus such as, for example, generators, engines, plant and process control systems, numerically controlled apparatus and all forms of measuring and testing equipment.

Although the invention has been described in terms of specific preferred embodiments, the invention should not be deemed limited thereto, since other embodiments and modification will readily occur to one skilled in the art. It is therefore to be understood that the appended claims are intended to cover all such modifications as fall within the true spirit and scope of the invention.

```
1  ASSEMBLY LISTING                    10-MAY-79  08:53
-ADDR CODE    ARG  ST NO       STATEMENT

1   *TRIPMASTER SYSTEM PROGRAM FOR PPS4*
                           2   *VERSION FOR TROY POLICE
                           3   *MARCH 5,1979
                           4   *EQUIPED WITH AUTO SHUTDOWN
1  ASSEMBLY LISTING                    08:53  BANK 0  ROM 0  PAGE  0
-ADDR CODE    ARG  ST NO       STATEMENT

5        ORG   000       PROGRAM START
0000  81           1       6        T     *+1
0001  73      C            7        LDI   #C        ESTABLISH POWER SUPPY
** % MEMORIES
0002  1D                   8        DOA
0003  21                   9        SF2             INHIBIT INTERUPTS
0004  000F    F0          10        LBL   #F0       VALIDATE MEMORY  FOR5
0006  70      F           11        LDI   #F
0007  0C                  12        EOR
0008  1E                  13        SKZ
0009  9B      1B          14        T     ZAM
000A  17                  15        INCB
000B  7F                  16        LDI   #0
000C  0C                  17        EOR
000D  1E                  18        SKZ
000E  9B      1B          19        T     ZAM
000F  17                  20        INCB
0010  75      A           21        LDI   #A
0011  0C                  22        EOR
0012  1E                  23        SKZ
0013  9B      1B          24        T     ZAM
0014  17                  25        INCB
0015  7A      5           26        LDI   #5
0016  0C                  27        EOR
0017  1E                  28        SKZ
0018  9B      1B          29        T     ZAM
0019  5C00    C00         30        TL    CRTC      GO COMPUTE REAL TIME
001C  00F0    F           31  ZAM   LBL   #0F       ZERO ALL RAM ROUTINE
001D  7F                  32        LDI   #0
001E  04                  33  ZAM1  LDA
001F  F9      F9          34  ZAM2  TM    ZROW
0020  1B                  35        XBMX              CLEAR RAM 0
0021  1A                  36        XAX
0022  6E      1           37        ADI   #1
0023  A5      25          38        T     *+2
0024  A8      28          39        T     ZAM3
0025  1A                  40        XAX
0026  1B                  41        XBMX
0027  9F      1F          42        T     ZAM2     'NEW BM*
0028  00E0    1F          43  ZAM3  LBL   #1F
002A  37                  44        LD    0        !# OF RAMS THAT WILL
**BE CLEARED
002B  6E      1           45        ADI   #1
002C  B1      31          46        T     ZAM4
002D  7E      1           47        LDI   #1
002E  3F                  48        EX    0
002F  5620    620         49        TL    TRLST    GO LOAD TRESHOLDS
0031  7F                  50  ZAM4  LDI   #0
0032  1A                  51        XAX
0033  DA      DA          52        TM    INC      !INCREMENT RAM #
0034  37                  53        LD    0
0035  1B                  54        XBMX
0036  9E      1E          55        T     ZAM1
                          56  *************TM POINTER CROSS REFERENCE PAG
```

```
→E
1    ASSEMBLY LISTING                              08:53  BANK 0  ROM 0  PAGE 3
-ADDR  CODE  ARG  ST NO        STATEMENT
                        57            ORG   0C0
 00C0   EB   14    58    L14   PTR   #14
 00C1   EA   15    59    L15   PTR   #15
 00C2   E0   1F    60    L1F   PTR   #1F
 00C3   DB   24    61    L24   PTR   #24
 00C4   D9   26    62    L26   PTR   #26
 00C5   BB   44    63    L44   PTR   #44
X00C6   BA   45    64    L45   PTR   #45
 00C7   B9   46    65    L46   PTR   #46
 00C8   80   7F    66    L7F   PTR   #7F
 00C9   BC   43    67    L43   PTR   #43
 00CA   CD   32    68    L32   PTR   #32
 00CB   BD   42    69    L42   PTR   #42
 00CC   C3   3C    70    L3C   PTR   #3C
 00CD   C2   3D    71    L3D   PTR   #3D
 00CE   DC   23    72    L23   PTR   #23
1    ASSEMBLY LISTING                              08:53  BANK 0  ROM 0  PAGE 3
-ADDR  CODE  ARG  ST NO        STATEMENT
                        73            ORG   0D0
 00D0   00  100    74   WAIT   PTR   QWAIT
 00D1   04  104    75   ID01   PTR   QID01
 00D2   0E  10E    76   TCB1   PTR   QTCB1
 00D3   0F  10F    77   TCB2   PTR   QTCB2
 00D4   10  110    78   TCB4   PTR   QTCB4
 00D5   11  111    79   TCB8   PTR   QTCB8
 00D6   16  116    80   CTB1   PTR   QCTB1
 00D7   17  117    81   CTB2   PTR   QCTB2
 00D8   18  118    82   CTB4   PTR   QCTB4
 00D9   19  119    83   CTB8   PTR   QCTB8
 00DA   1E  11E    84   INC    PTR   QINC
 00DB   25  125    85   TV=0   PTR   QTV=0
 00DC   26  126    86   TV=1   PTR   QTV=1
 00DD   27  127    87   TV=2   PTR   QTV=2
 00DE   28  128    88   TV=3   PTR   QTV=3
 00DF   29  129    89   TV=4   PTR   QTV=4
 00E0   2A  12A    90   TV=5   PTR   QTV=5
 00E1   2B  12B    91   TV=6   PTR   QTV=6
 00E2   2C  12C    92   TV=7   PTR   QTV=7
 00E3   2F  12F    93   TV=A   PTR   QTV=A
 00E4   2E  12E    94   TV=9   PTR   QTV=9
 00E5   20  130    95   TV=B   PTR   QTV=B
 00E6   31  131    96   TV=C   PTR   QTV=C
 00E7   32  132    97   TV=D   PTR   QTV=D
 00E8   33  133    98   TV=E   PTR   QTV=E
 00E9   34  134    99   TV=F   PTR   QTV=F
 00EA   40  140   100   ZERO   PTR   QZERO
 00EB   43  143   101   PAMF   PTR   QPAMF
 00EC   93  193   102   CHFTV  PTR   QCHFTV
 00ED   65  165   103   DECUB  PTR   QDECUB
 00EE   6F  16F   104   PAMC   PTR   QPAMC
 00EF   80  180   105   CETUP  PTR   QCETUP
 00F0   4F  14F   106   DINC   PTR   QDINC
 00F1   48  148   107   PCB1   PTR   QPCB1
 00F2   49  149   108   PCB2   PTR   QPCB2
 00F3   4A  14A   109   PCB4   PTR   QPCB4
 00F4   4B  14B   110   PCB8   PTR   QPCB8
 00F5   9A  19A   111   AI     PTR   QAIXP
 00F6   7A  17A   112   THP    PTR   QTHP
 00F7   1A  11A   113   LF     PTR   QLF
```

```
00F8    57      157     114     QHT4    PTR     QQHT4
00F9    39      139     115     QPOW    PTP     QQPOW
00FA    C0      1C0     116     QCRC    PTP     QDCRC
00FB    3D      13D     117     BTH     PTP     QBTH
00FC    74      174     118     BTHL    PTP     QBTHL
00FD    9F      19F     119     OUT4    PTP     QOUT4
00FE    DE      1DE     120     MUX     PTP     QMUX
                        121     *
                        122     ****************************TM ROUTINES ON PORG 10
**0,140,130)
1   ASSEMBLY LISTING                08:53   BANK 0  ROM 0   PAGE 4
-ADDR   CODE    ARG     ST NO           STATEMENT

123             ORG     100
0100    73      C       124     QWAIT   LDI     #C      ! ANY VALUE DEPENDEN
**T ON DESIRED TIME
0101    6E      1       125             ADI     #1      ! USED TO INPUT I/O
0102    31      101     126             T       -1
0103    05              127             RTN
0104    1C0A    A       128     QID01   IOL     #0A     !
0106    2F              129             EXD     0       !   INPUT DATA FROM I
**/O #0
0107    1C09    9       130             IOL     #09
0109    2F              131             EXD     0
010A    1C03    3       132             IOL     #03
010C    3F              133             EX      0
010D    05              134             RTN
010E    7E      1       135     QTSB1   LDI     #1      ! TEST BIT SUBROUTIN
**E
010F    7D      2       136     QTSB2   LDI     #2
0110    7B      4       137     QTSB4   LDI     #4
0111    77      8       138     QTSB8   LDI     #8
0112    0D              139             AND
0113    1E              140             SKZ
0114    07              141             RTNSK           BIT IS PRESENT
**FLAG IS SET
0115    05              142             RTN             FLAG IS NOT SET
0116    7E      1       143     QSTB1   LDI     #1      ! ****SET BIT OR FLA
**G SUB ***
0117    7D      2       144     QSTB2   LDI     #2
0118    7B      4       145     QSTB4   LDI     #4
0119    77      8       146     QSTB8   LDI     #8
011A    70      F       147     QLF     LDI     #F
011B    0F              148             OR
011C    3F              149             EX      0
011D    05              150             RTN
011E    37              151     QINC    LD      0       ! ****INCREMENT BI
**NARY
011F    6E      1       152             ADI     #1      !
0120    A3      123     153             T       -3
0121    2F              154             EXD     0
0122    9E      11E     155             T       QINC
0123    3F              156             EX      0
0124    05              157             RTN
0125    7F              158     QTV=0   LDI     #0      ! ****TEST VALUE OF
RESISTER SUB*
0126    7E      1       159     QTV=1   LDI     #1
0127    7D      2       160     QTV=2   LDI     #2
0128    7C      3       161     QTV=3   LDI     #3
0129    7B      4       162     QTV=4   LDI     #4
012A    7A      5       163     QTV=5   LDI     #5
```

```
012B   79    6    164   QTV=6   LDI   #6
012C   78    7    165   QTV=7   LDI   #7
012D   77    8    166   QTV=8   LDI   #8
012E   76    9    167   QTV=9   LDI   #9
012F   75    A    168   QTV=A   LDI   #A
0130   74    B    169   QTV=B   LDI   #B
0131   73    C    170   QTV=C   LDI   #C
0132   72    D    171   QTV=D   LDI   #D
0133   71    E    172   QTV=E   LDI   #E
0134   70    F    173   QTV=F   LDI   #F
0135   0C         174           EOR
0136   1E         175           SKZ
0137   07         176           RTNSK         IF VALUE NOT EQUAL
**SK
0138   05         177           RTN           VALUE IN MEMORY
***DESIRED VALUE
0139   7F         178   QZROW   LDI   #0
013A   2F         179           EXD   0
013B   B9   139   180           T     ←2
013C   05         181           RTN
                  182   *
                  183   *
013D   53F9  3F9  184   QBTH    TL    QBTHQ
                  185   ***************TM CONTINUED*********
********
1  ASSEMBLY LISTING                  08:53  BANK 0  ROM 0  PAGE  5
-ADDR  CODE  ARG  ST NO        STATEMENT
                  186           ORG   140
0140   7F         187   QZERO   LDI   #0       !USED TO CLEAR A WORD
0141   3F         188           EX    0        !
0142   05         189           RTN            !            !
**      !    **
0143   37         190   QRAMF   LD    0        !            **
0144   13         191           SAG            !   LOAD INF
**O FROM DISTANT RAMTO RAM0
0145   2F         192           EXD   0
0146   83   143   193           T     ←3
0147   05         194           RTN
0148   71    E    195   QRCB1   LDI   #E       !   **
0149   72    D    196   QRCB2   LDI   #D       !   ! RESET BIT
**OR FLAG SUB
014A   75    A    197   QRCB4   LDI   #A
014B   78    7    198   QRCB8   LDI   #7
014C   0D         199           AND
014D   3F         200           EX    0
014E   05         201           RTN            !            !
**      !    **
014F   24         202   QDINC   RC             **
0150   78    7    203           LDI   #7       !   ! INCREMENT
DECIMAL COUNTERS SUB*
0151   08         204           ADCSK
0152   65         205           DC
0153   2F         206           EXD   0
0154   15         207           SKC
0155   05         208           RTN
0156   3F   14F   209           T     QDINC
0157   1A         210   QCHT4   XAX              **
0158   37         211           LD    0
```

```
0159   1F            212           DECB
015A   1A            213   LOOP    XAX
015B   19            214           XABL
015C   1A            215           XAX
015D   2F            216           EXD    0
015E   1A            217           XAX
015F   19            218           XABL
0160   1A            219           XAX
0161   37            220           LD     0
0162   1F            221           DECB
0163   9A    15A     222           T      LOOP
0164   05            223           RTN
0165   33     4      224   QDESUB  LD     4
0166   0E            225           COMP
0167   08            226           ADCSK         SUB WILL SUBTTRACT 04D
                                                 !FROM 00D-F
0168   65            227           DC            !FROM 00D-F
                     228   ******                !RESULT IN 04D-F
0169   2B     4      229           EXD    4
016A   4C     3      230           SKBI   #C
016B   A5    165     231           T      QDESUB
016C   15            232           SKC
016D   07            233           RTNSK         !UNDER THRESH
016E   05            234           RTN           !OVER THRESHOLD
016F   13            235   QRAMS   SAG
0170   37            236           LD     0
0171   2F            237           EXD    0
0172   AF    16F     238           T      ←3
0173   05            239           RTN
                     240   ********************TM CONTINUED
0174   2F            241   QBTHL   EXD    0      !PUT 900 FOR UNDER TH
**RESH
0175   1F            242           DECB
0176   1F            243           DECB
0177   76     9      244           LDI    #9     COMPARE
0178   3F            245           EX     0
0179   05            246           RTN
017A   EF    EF      247   QTHR    TM     SETUP
017B   EE    EE      248           TM     RAMS
017C   05            249           RTN
017D   5AE0  AE0     250   QMPHS   TL     MPHSE
1    ASSEMBLY LISTING                   08:53  BANK 0  ROM 0  PAGE 6
-ADDR  CODE  ARG   ST NO           STATEMENT

251           ORG    180
0180   00EA   15     252   QSETUP  LBL    #15    !  **
0182   37            253           LD     0      !         !  ANALOMS
**COUNTER =BM=WHERE
0183   1A            254           XAX                     !  DATA IS
**STOPED
0184   00E0   1F     255           LBL    #1F    !  BU STOPED IN EVENT
**COUNTER
0186   37            256           LD     0
0187   04            257           LBUA                    CHANGE BU
0188   10            258           LBMX                    NOW SITING AT DES
**IRED BM =1 FROM INTIALIZATION
0189   05            259           RTN
018A   00EA   15     260   QAI&R   LBL    #15
018C   DA    DA      261           TM     INC
```

```
018D   00F0    F      262           LBL     #0F
018F   7F             263           LDI     #0    !CLEAR ROW 0,0 FOR ME
**XT LOAD
0190   2F             264           EXD     #0
0191   8F     18F     265           T       *-2
0192   05             266           RTN
0193   1A             267  QSHFTV   XAX
0194   2F             268           EXD     0
0195   1A             269           XAX
0196   19             270           XABL
0197   1A             271           XAX
0198   2F             272           EXD     0
0199   95     195     273           T       *-4
019A   1A             274           XAX
019B   19             275           XABL
019C   1A             276           XAX
019D   3F             277           EX      0
019E   05             278           RTN
019F   FE     FE      279  QOUT4    TM      MUX
01A0   DB     DB      280           TM      TV=0
01A1   A3     1A3     281           T       *+2    !
01A2   9F     19F     282           T       QOUT4
01A3   7D     2       283  NWS      LDI     #2     !OUT PUT NEXT WORD
01A4   1C1D   1D      284           IOL     #1D
01A6   7F             285           LDI     #0
01A7   1C1D   1D      286           IOL     #1D    PULSE
01A9   00BF   40      287  OT4      LBL     #40
01AB   1C13   13      288           IOL     #13    !INPUT SIGNALS
01AD   3F             289           EX
01AE   D4     D4      290           TM      TSB4   !CHECK START IN
01AF   BB     1BB     291           T       CLGT
01B0   D5     D5      292           TM      TSB2   !CHECK READY
01B1   B6     1B6     293           T       SETF
01B2   16             294           SKF1
01B3   B7     1B7     295           T       MX
01B4   26             296           RF1
01B5   05             297           RTN
01B6   22             298  SETF     SF1
01B7   FE     FE      299  MX       TM      MUX
01B8   DB     DB      300           TM      TV=0
01B9   A9     1A9     301           T       OT4
01BA   B7     1B7     302           T       MX
01BB   57B0   7B0     303  CLGT     TL      CINTL
01BD   5400   400     304  CUBTR    TL      ZCUBTR
1    ASSEMBLY LISTING                     08:53  BANK 0  ROM 0  PAGE  7
-ADDR   CODE    ARG    ST NO         STATEMENT

305           ORG     1C0
                       306  *****THIS ROUTINE IS USED FOR TROY POLICE
01C0   EC     EC      307  QDSRS    TM      SHFTV
01C1   00EA   15      308           LBL     #15
01C3   DA     DA      309           TM      INC
01C4   EF     EF      310           TM      SETUP
01C5   7C     3       311           LDI     #3
01C6   19             312           XABL
01C7   EB     EB      313           TM      RAMF
01C8   00FC   3       314           LBL     #03
01CA   05             315           RTN
01CB   00E9   16      316  DCPT     LBL     #16    !SAVE PAM1 BU &BM
```

```
01CD   37              317           LD    0
01CE   1F              318           DECB
01CF   3F              319           EX    0
01D0   17              320           INCB
01D1   3F              321           EX    0
01D2   00E0    1F      322           LBL   #1F
01D4   37              323           LD    0
01D5   00E3    1C      324           LBL   #1C
01D7   3F              325           EX    0
01D8   00E0    1F      326           LBL   #1F
01DA   3F              327           EX    0
01DB   05              328           RTN
01DC   5B80    B80     329   DSRCA   TL    DSR         !GO TO SNAP STORAGE
                       330    *
                       331    *
                       332    *
                       333    *
                       334    *
01DE   7E      1       335   QMUX    LDI   #1
01DF   1B              336           LXA
01E0   7F              337           LDI   #0
01E1   1C07    7       338           IDL   #07         ! BLANK DISPLAY
01E3   A4      1E4     339           T     ↔1
01E4   00DA    25      340           LBL   #25         ! GET DISPLAY POINTER
01E6   37              341           LD    0
01E7   19              342   OPD     XABL
01E8   1F              343           DECB
01E9   AB      1EB     344           T     ↔2
01EA   B7      1F7     345           T     LD3
01EB   37              346           LD    0
01EC   1C17    17      347           IDL   #17
                       348    *     !     !           !   OUTPUT DATA
01EE   10              349           LBMX                 POINT TO DIGIT SE
**LECT REGISTER
01EF   37              350           LD    0
01F0   1C07    7       351           IDL   #07
01F2   11              352           LABL
01F3   00DA    25      353           LBL   #25         ! PUT BL BACK IN DISP
**LAY POINTER
01F5   3F              354           EX    0
01F6   05              355           RTN               !FINISHED WITH MUX
01F7   7B      4       356   LD3     LDI   #4
01F8   A7      1E7     357           T     OPD
                       358    ************MAIN LINE OF PROGRAM  RG 040.0
**80
1   ASSEMBLY LISTING                     08:53  BANK 0  ROM 0  PAGE 1
-ADDR   CODE    ARG  ST NO           STATEMENT

359           ORG   040
0040   31      41      360   DIGTL   T     ↔1
0041   5940    940     361   CMPR    TL    SHTWN       GO CHECK SHUTDOWN
0043   00DA    35      362   SHTR    LBL   #35         ! INPUT DIGITAL
0045   73      C       363           LDI   #C
0046   1C1D    1D      364           IDL   #1D         ! SET DIM HIGH
0048   D0      D0      365           TM    WAIT
0049   D1      D1      366           TM    IO01        ! INPUT A,B,C, OF I/O
** #0 WITH DIM HIGH
```

```
004A   7B            367          LDI   #4
004B   1C1D    1D    368          IOL   #1D      ! THIS IS EXTERNAL KE
**Y BOARD ENTRY
004D   D0      D0    369          TM    WAIT
004E   1F            370          DECB
004F   D1      D1    371  LIRT1   TM    IO01     !INPUT A,B,C, I/O #0
**WITH DIM LOW
0050   CA      CA    372          LB    L32      ! **
0051   37            373          LD    0        !       ! RESET GR
**OUPS A & B OF DIGITAL
0052   1C0E    E     374          IOL   #0E
0054   1F            375          DECB
0055   37            376          LD    0
0056   1C0D    D     377          IOL   #0D
0058   576B    76B   378          TL    RT       ! MOVE KEY INPUT TO P
**ROPER LOCATION
005A   36      1     379  RT1     LD    1        REAL TIME CLOCK COMPUTE
005B   3F            380          EX    0        (OPERATING)
005C   CA      CA    381          LB    L32      !CHECK TIME PULSE
005D   D2      D2    382          TM    TSB1
005E   A1      61    383          T     *+3      ! NO TIME PULSE
005F   5387    387   384          TL    .1SEC    !GO SERVICE CLOCK & T
**IMERS
0061   5800    800   385  KIGN    TL    KLINK    !EXIT FOR DATA LINK
**CHECK
0063   D2      D2    386  KIGN1   TM    TSB1
0064   B7      77    387          T     IGF      ! GOCHECK LEVELS & PE
**TURN TO DIGTL
0065   C5      C5    388          LB    L44      ! SET FLAG FOR IGN ON
0066   D6      D6    389          TM    STB1
0067   5640    640   390          TL    TP7      !GO CHECK FOOT BRAKE
                     391          *
                     392          *
                     393          *
0069   CA      CA    394  VSPD    LB    L32      ! CHECK VEHICLE SPEED
006A   D4      D4    395          TM    TSB4
006B   AE      6E    396          T     *+3      ! NO SPEED PULSE
006C   5440    440   397          TL    VESPD
006E   545A    45A   398          TL    TEST     !CHECK FOR >2MPH
                     399          *9.0-------------------
0070   CA      CA    400  KFUEL   LB    L32      ! CHECK FUEL .1 GAL I
**NPUT
0071   D3      D3    401          TM    TSB2     ! A-2
0072   B5      75    402          T     *+3
0073   54C0    4C0   403          TL    FUEL
0075   5740    740   404          TL    ESPD
0077   5500    500   405  IGF     TL    IGOF
0079   7F            406  LIRT    LDI   #0
007A   1C07    7     407          IOL   #07
007C   8F      4F    408          T     LIRT1
                     409          ****************MAIN LINE CONTINUED
1  ASSEMBLY LISTING                   08:53  BANK 0  ROM 1  PAGE 29
-ADDR  CODE    ARG   ST NO         STATEMENT

410          ORG   740
0740   CA      CA    411  ESPD    LB    L32      ! CHECK ENGINE SPPEED
0741   D5      D5    412          TM    TSB3
0742   85      745   413          T     *+3      ! NO ENGINE SPEED P
**ULSE
```

```
0743  5430   430   414            TL    ENCPD
0745  16           415   FETCH    IXF1                 CHECK ENTRY OF NE
**W ANALOG CHANNEL SELECT
0746  51     751   416            T     ADV
0747  36           417            PF1
0748  C1     C1    418            LB    L15           ! CHECK IF MPH IS HEX
**T TO INTEROGATE
0749  3A     74A   419            T     *+1
074A  3B     74B   420            T     *+1
074B  3C     74C   421            T     *+1
074C  3D     74D   422            T     *+1
074D  3E     74E   423            T     *+1
074E  37           424            LD    0             !   OUTPUT NEW ANALO
**G CHANNEL
074F  1C1E   1E    425            IOL   #1E
0751  0004   3B    426   ADV      LBL   #3B           ! ADVANCE ANALOG COUN
**TEP
0753  DA     DA    427            TM    INC
0754  0006   39    428            LBL   #39           ! TEST IF COUNTER =40
**96
0756  D3     D3    429            TM    TS82          ! APPROX = 300MS
0757  9A     75A   430            T     *+3
0758  523B   23B   431            TL    INALG          COUNTER=4096 GO TO IN
**PUT ANALOG DATA
075A  52AE   2AE   432            TL    OV            ! ANALOG VALUE IS NOT
** CONVERTED YET
                  433   ***SET UP ROUTINE FOR MPH &PPM
                  434   ***MOVED MPH OR PPM TO ANALOG REGISTERS #43-40
075C  00AC   53    435   STUPM    LBL   #53
075E  36     1     436            LD    1             !ROW 5 TO 4
075F  2E     1     437            EXD   1
0760  9E     75E   438            T     *-2
0761  EF     EF    439   SP       TM    SETUP
0762  EB     EB    440            TM    PAMF
0763  5310   310   441            TL    CINS          !TO ANALOG INTEROGAT
                  442   *                             PAGE 300
0765  009C   63    443   STUPP    LBL   #63            PPM LABLE
0767  35     2     444            LD    2
0768  2D     2     445            EXD   2
0769  A7     767   446            T     *-2
076A  A1     761   447            T     SP
076B  7F           448   RT       LDI   #0            !CLEAR RESET F/F
076C  1C0E   E     449            IOL   #0E
076E  77     3     450            LDI   #3
076F  1C0D   D     451            IOL   #0D
0771  00CB   34    452            LBL   #34
0773  505A   5A    453            TL    RT1
                  454   *********INPUT HEX KEY BOARD &DATA MOVE TO DI
**SP
                  455   *** COMPLETION OF PAGE 740 IS RX IN ANALOG RO
**UTINE
1   ASSEMBLY LISTING                         08:53  BANK 0  ROM 0  PAGE  8
-ADDR   CODE   ARG   ST NO           STATEMENT

456            ORG   200
0200  C0     C0    457   UDISP    LB    L14           ! THIS ROUTINE IS REQ
**UESTED FROM MAIN LINE
0201  E0     E0    458            TM    TV=5          ! EVERY 1 SEC TO REFR
```

```
**ECH DIPLAY DATA
  0202    9D    21D    459              T      MDP1     !  GET NEW DISPLAY P
**EFERENCE =
  0203    00A           35    460              LBL    #35      !  CHECK IF NEW DIGIT
**HAS BEEN ENTERED
  0205    D5    D5     461              TM     TCB8
  0206    B7    237    462              T      SKY
  0207    5275  275    463     IKC      TL     RDE      !GO RESET DIGIT HEX E
**NTRY
  0209    DC    DC     464     RDE1     TM     TV=1     !  TEST IF KEY COUNTER
** = 1
  020A    98    218    465              T      CRDIS    ! = 1 GO CLEAR DISPLA
**Y
  020B    C3    C3     466     IKC1     LB     L24
  020C    37           467              LD     0
  020D    2F           468              EXD    0        !   LOAD KEY INPUT TO
** DISPLAY (SHIFT LEFT)
  020E    8D    20D    469              T      *-1
  020F    90    210    470              T      *-1      !INSERT TEST FOR 2 DI
**GIT CODE HERE
  0210    91    211    471              T      *-1
  0211    C0    C0     472              LB     L14      !  TEST IF KEY COUNTER
** =4
  0212    DF    DF     473              TM     TV=4
  0213    95    215    474              T      *+2
  0214    96    216    475              T      NOEY
  0215    DA    DA     476              TM     INC
  0216    5261  261    477     NOEY     TL     RCDS     !  GO CHECK FOR 1 DEC
** & GO TO DISPLAY
  0218    CE    CE     478     CRDIS    LB     L23      !  CLEAR DISPLAY ROUTI
NE*********
  0219    7F           479              LDI    #0
  021A    2F           480              EXD    0
  021B    99    219    481              T      *-2
  021C    8B    20B    482              T      IKC1
  021D    C0    C0     483     MDP1     LB     L14      !  CLEAR KEY COUNTER
  021E    EA    EA     484              TM     ZERO
  021F    52A1  2A1    485              TL     CKST     !GO CHECK CLOCK SET
  0221    CE    CE     486     CNT      LB     L23      !  MOVE KEY INPUT NOW
**IN DISPLAY
  0222    7F    F      487              LDI    #F       !   REGISTERS INTO DIS
**PLAY REFERENCE = POSITION
  0223    EC    EC     488              TM     SHFTV
  0224    A5    225    489              T      *+1
  0225    A6    226    490              T      *+1
  0226    A7    227    491     REFF     T      *+1
  0227    022B  22B    492              TML    PFLD
  0229    5256  256    493              TL     UWZE
  022B    00D2  2D     494     PFLD     LBL    #2D      !READY FOR BM* USED F
**OR DISPLAY UPDATE
  022D    37           495              LD     0
  022E    1A           496              XAX
  022F    1F           497              DECB            !READY FOR BU*
  0230    37           498              LD     0
  0231    00F0  F      499              LBL    #0F
  0233    04           500              LBUA
  0234    18           501              XBMX
  0235    5240  240    502              TL     CUDISP   GO TO PAGE 240 TO CON
**TINUE
  0237    525D  25D    503     CKY      TL     SKY1     !SEE IF IN HEX IN MOD
**E
                       504     ***********************************
```

```
 1 ASSEMBLY LISTING                        08:53  BANK 0  POM 0  PAGE 9
 -ADDR  CODE    ARG   ST NO        STATEMENT

505                 ORG     240
  0240   EB      EB    506   CUDISP  TM    RAMF       ! MOVE DATA FROM DICT
**ANT RAM TO RAM 0
  0241  00D1     2E    507           LBL   #2E
  0243   37            508           LD    0
  0244   0E            509           COMP
  0245   6B      4     510           ADI   #4
  0246   88     248    511           T     *+2
  0247   90     250    512           T     DOWN       ! IFNFO IS IN PROPER
** LOCATION
  0248   1A            513           XAX
  0249  00F0     F     514           LBL   #0F        ! PUT # OF  LEFT SHIF
**TO IN
  024B   2F            515           EXD   0          !   BASED ON BL
  024C   8B     24B    516           T     *-1
  024D   1A            517           XAX
  024E   6E      1     518           ADI   #1
  024F   88     248    519           T     *-7
  0250  00FC     3     520   DOWN    LBL   #03        ! VALUE IS NOW LOADED
** DOWN TO DISPLAY
  0252   35      2     521           LD    2
  0253   2D      2     522           EXD   2
  0254   92     252    523           T     *-2
  0255   05            524           RTN
  0256  00D0     2F    525   UWZE    LBL   #2F        ! ZERO UNWANTED DIGIT
**S
  0258   DF      DF    526           TM    TV=4       !4DIGITS IN FIELD
  0259   A1     261    527           T     RSDS
  025A   DD      DD    528           TM    TV=2       !2 DIGITS IN FIELD TO
** BE DISPLAYED
  025B   B8     273    529           T     L1
  025C   7F            530           LDI   #0         !3 DIGITS WILL BE DIS
**PLAYED
  025D   19            531   UW      XABL
  025E   7F            532           LDI   #0
  025F   2F            533           EXD   0
  0260   9E     25E    534           T     *-2
  0261  0280    280    535   RSDS    TML   RSD
  0263   34      3     536           LD    3       !    **LEADING ZERO S
**UPPRESSION    LBL 20
  0264   DB      DB    537   ZS      TM    TV=0
  0265   A7     267    538           T     *+2
  0266   AC     26C    539           T     DIP        ! MSD NONE ZERO GO D
**ISP
  0267   34      3     540           LD    3
  0268   3C      3     541           EX    3
  0269   17            542           INCB
  026A   43      C     543           SKBI  3
  026B   A4     264    544           T     ZS         !   RETURN TO ZERO S
**UPPRESSION
  026C   BC     27C    545   DIP     T     DISP
  026D   C0      C0    546   CKY1    LB    L14        !ARE YOU IN HEX INPUT
** MODE?
  026E   DB      DB    547           TM    TV=0
  026F   B1     271    548           T     *+2
  0270   AC     26C    549           T     DIP
```

```
0271  5226   226   550         TL     REFF
0273  7E     1     551   L1    LDI    #1
0274  9D     25D   552         T      UW      !FOR UNWANTED ZERO 0
0275  C0     C0    553   PDE   LB     L14     !RESET HEX ENTRY
0276  7C     C     554         LDI    #C
0277  1C0D   D     555         IOL    #0D
0278  DA     DA    556         TM     INC
027A  5209   209   557         TL     PDE1
                   558   **DATA IS IN THE DISPLAY READY FOR MUX
027C  FE     FE    559   DISP  TM     MUX
027D  5A80   A80   560         TL     TP2
```

1   ASSEMBLY LISTING                    08:53  BANK 0  ROM 1  PAGE 29
-ADDR  CODE   ARG   ST NO    STATEMENT

```
                   561         ORG    775
0775  E0     E0    562   RX    TM     TV=5
0776  BB     77B   563         T      CK22
0777  E1     E1    564         TM     TV=6
0778  BD     77D   565         T      CBP
0779  E2     E2    566         TM     TV=7
077A  BD     77D   567         T      CBP
077B  534B   34B   568   CK22  TL     CK
077D  5359   359   569   CBP   TL     CBTMP
```

1   ASSEMBLY LISTING                    08:53  BANK 0  ROM 0  PAGE 10
-ADDR  CODE   ARG   ST NO    STATEMENT

```
                   570         ORG    280
0280  00EC   1C    571   RCD   LBL    #1C
0282  7E     1     572         LDI    #1
0283  2F           573         EXD
0284  7D     2     574         LDI    #2
0285  2F           575         EXD
0286  7B     4     576         LDI    #4
0287  2F           577         EXD
0288  77     8     578         LDI    #8
0289  3F           579         EX
028A  05           580         RTN
                   581   ****INPUT ANALOG VALUE AND INTEROGATE ROUTINE
                   582   *       !  LOCATED IN PAG 200,300, 340
                   583   ****
028B  00C4   3B    584   INALG LBL    #3B     ! INPUT ANALOG VALUE ROUTINE*********
028D  7F           585         LDI    #0
028E  2F           586         EXD    0       !  ZERO ANALOG TIMER
028F  48     7     587         SKBI   #8
0290  9D     28D   588         T      *-3
0291  7F           589         LDI    #0       ! ENABLE AIM = LOW
0292  1C1D   1D    590         IOL    #1D
0294  D0     D0    591         TM     WAIT
0295  00F0   F     592         LBL    #0F
0297  EA     EA    593         TM     ZERO
0298  00C7   3B    594         LBL    #3B     CHECK FOR OV FLAG
029A  D2     D2    595         TM     TSB1
029B  9F     29F   596         T      ADVIX
029C  EA     EA    597         TM     ZERO    !OV IS PRESENT
029D  5340   340   598         TL     BAD
029F  52C0   2C0   599   ADVIX TL     ADV1
02A1  00CA   35    600   CKIT  LBL    #35     !CHECK FOR CLOCK SET **BIT
                   601   *                            WITHN DIM =1
```

```
02A3   D2     D2    602           TM    TCB1
02A4   AC     2AC   603           T     CNT1     !NOT THERE
02A5   CE     CE    604           LB    L23      !RESET CLOCK TO WHAT
**EVER
02A6   EB     EB    605           TM    PAMF
02A7   003C   3C    606           LBL   #03      !IS IN DISPLAY WITH N
**EXT ENTRY
02A9   EE     EE    607           TM    PAMS
02AA   57B0   7B0   608           TL    CINTL
02AC   5221   221   609   CNT1    TL    CNT
02AE   D2     D2    610   OV      TM    TSB1     !CHECK ANALOG TIME=25
**OMS
02AF   B7     2B7   611           T     CK11
02B0   1F           612           DECB
02B1   1C13   13    613           IOL   #13      BRING IN OV DIGIT
02B3   3F           614           EX    0
02B4   D2     D2    615           TM    TCB1     !TEST OVERFLOW
02B5   B7     2B7   616           T     CK11     !OVER FLOW NOT THERE
02B6   BB     2BB   617           T     INALG
02B7   5350   350   618   CK11    TL    CK1
1      ASSEMBLY LISTING                    08:53  BANK 0  ROM 0  PAGE 11
-ADDR  CODE   ARG   ST NO          STATEMENT

619           ORG   2C0
02C0   0074   3B    620   ADV1    LBL   #8B
02C2   DA     DA    621           TM    INC
02C3   DE     DE    622           TM    TV=3
02C4   86     2C6   623           T     **2
02C5   B8     2C8   624           T     **3
02C6   EA     EA    625           TM    ZERO
02C7   B9     2F9   626           T     BD
02C8   1C19   19    627           IOL   #19      TOGGLE ACC
02CA   2F           628           EXD
02CB   1C1A   1A    629           IOL   #1A      DATA
02CD   3F           630           EX
02CE   1C19   19    631           IOL   #19
02D0   17           632           INCB
02D1   0C           633           EOR
02D2   1E           634           BKZ
02D3   80     2C0   635           T     ADV1
02D4   D2     D2    636           TM    TCB1     !CHECK FOR 1-2 DIGIT
02D5   B9     2F9   637           T     BD
02D6   F1     F1    638           TM    RSB1
02D7   1F           639           DECB
02D8   37           640           LD    0
02D9   1B           641           LXA            !DATA IN X
02DA   17           642           INCB
02DB   37           643           LD    0
02DC   19           644           XABL           !AT BL OFM DC
02DD   1A           645           XAX            !OE IN X, DATA IN A
02DE   3F           646           EX    0        !DATA IN MEMORY
02DF   1A           647           XAX            !OE IN A
02E0   19           648           XABL           !AT OE
02E1   17           649           INCB           !AT OF
02E2   0F           650           OR
02E3   3F           651           EX    0
02E4   E3     E3    652           TM    TV=E
02E5   A7     2E7   653           T     FLANG
02E6   80     2C0   654           T     ADV1
02E7   10F7   3     655   FLANG   LBL   #03
```

```
02E9    37              656             LD      0
02EA    00BE    41      657             LBL     #41
02EC    3F              658             EX
02ED    00FB    4       659             LBL     #04
02EF    37              660             LD      0
02F0    CB      CB      661             LB      L42
02F1    3B      4       662             EX      4
02F2    33      4       663             LD      4
02F3    17              664             INCB
02F4    3F              665             EX      0
02F5    C5      C5      666             LB      L44
02F6    F4      F4      667             TM      RSB8
02F7    5300    300     668             TL      ADV3
02F9    5340    340     669     BD      TL      BAD
                        670     ****ANALOG INPUT ROUTINE CONTINUED
I   ASSEMBLY LISTING                    08:53   BANK 0  ROM 0  PAGE 12
-ADDR  CODE  ARG  ST NO        STATEMENT

671             ORG     300
0300    77      8       672     ADV3    LDI     #8      ! ENABLE FREE RUN OF
** ADC
0301    1C0D    D       673             IOL     #0D
0303    7B      4       674             LDI     #4      ! DISABLE ANALOG BOA
**RD AIM = HIGH
0304    1C1D    1D      675             IOL     #1D
0306    EF      EF      676     STUP    TM      SETUP
0307    EB      EB      677             TM      RAMF
0308    C5      C5      678             LB      L44     ! CHECK IF ANALOG VAL
**UE IS BAD A-OP< 1/2 DIG-1
0309    D5      D5      679             TM      TSB8
030A    90      310     680             T       CIN5
030B    00FC    3       681             LBL     #03     ! PLACE AN #A IN THE
** LSD OF ANALOG VALUE
030D    75      A       682             LDI     #A
030E    3F              683             EX      0
030F    AC      32C     684             T       STORE
                        685     *14.0----------------
0310    5716    716     686     CIN5    TL      CIN51
0312    C9      C9      687     CIN52   LB      L43
0313    7D      F       688             LDI     #F      ! MOVE PRESENT ANALO
**G VALUE IN
0314    F8      F8      689             TM      SHT4    !   -THRESHOLD C
**OMPARE
0315    C9      C9      690             LB      L43
0316    7D      C       691             LDI     #C      !  ! -PEAK COMP
**ARE
0317    F8      F8      692             TM      SHT4
0318    20              693             SC
0319    00F0    F       694             LBL     #0F
031B    ED      ED      695             TM      DECUB
031C    BB      33B     696             T       OVTH    ! PARAMETER WAS
** OVER THRESHOLD
031D    53F0    3F0     697             TL      OVTH2
031F    00FF            698     FIST    LBL     #00     ! CHECK F 1ST PASS FL
**AG IS SET ?
0321    D2      D2      699             TM      TSB1
0322    A7      327     700             T       LPVO    !EVENT NOT STORED
0323    EA      EA      701             TM      ZEPO    ! RESET,FLAG
0324    A5      325     702             T       *-1
0325    5340    340     703             TL      EVENT
                        704     *20.0----------------
```

```
0327    09      09      705     LPVO    LB      L43
0328    33      4       706             LD      4
0329    3B      4       707             EXD     4
                        708     ********         !       INTEROGATE ROUTINE
**      !       **********
032A    40      F       709             SKBI    #0
032B    A8      32B     710             T       *-3
032C    F6      F6      711     STORE   TM      THR             ! PUT INFO BACK IN DI
**START RAM
032D    00BB    3E      712     RAP3    LBL     #3E             RESET BTHP
032F    F1      F1      713             TM      PSB1
0330    C1      C1      714     RAP     LB      L15             ! INCREMENT ANALOG CO
**UNTER
0331    37              715             LD      0
0332    6E      1       716             ADI     #1
0333    B4      334     717             T       *+1
0334    3F              718             EX      0
0335    E9      E9      719             TM      TV=F            ! IF ANALOG CHANNEL 2
**EQUENCE IS FINISHED
0336    B9      339     720             T       RO1H1           ! RESET .01 HR
0337    5347    347     721             TL      RA              !   CONTINUE PAGE 3
**40
0339    535F    35F     722     RO1H1   TL      RO1H            !       "
033B    53F6    3F6     723     OVTH    TL      OVTH1
1       ASSEMBLY LISTING                        08:53   BANK 0   ROM 0   PAGE 13
 ADDR   CODE    ARG     ST NO           STATEMENT

724             ORG     340
0340    C5      C5      725     BAD     LB      L44             ! ANALOG DATA OVER FL
**OWED>1
0341    D9      D9      726             TM      STB3            ! SET BAD FLAG LOAD (
**F)
0342    CB      CB      727             LB      L42
0343    5300    300     728             TL      ADV3            ! LOCATED PAGE 300
0345    5320    320     729     RAP1    TL      RAP
0347    DC      DC      730     RA      TM      TV=1
0348    99      359     731             T       CBTHP
                        732     *
                        733     *
                        734     *
                        735     *
                        736     *
0349    5775    775     737             TL      RX
034B    22              738     CK      OF1
034C    C0      C0      739             LB      L14             UPDATE DISPLAY EVERY
034D    DB      DB      740             TM      TV=0            !300MS IF IN
034E    90      350     741             T       CK1             !HEX ENTRY MODE
034F    9D      35D     742             T       ISP1
0350    00BB    44      743     CK1     LBL     #44
0352    D3      D3      744             TM      TSB2            ! CHECK FOR F IN DISP
** FOR 1 SEC UPDATE
0353    97      357     745             T       *+4             !NOT THERE
0354    F2      F2      746     ISP     TM      RSB2
0355    5200    200     747             TL      UDISP           !=1 SEC TIME TO UPDAT
**E DISPLAY
0357    527C    27C     748             TL      DISP            ! NOT EQUAL TO 1 SEC
0359    00BB    3E      749     CBTHP   LBL     #3E
035B    D6      D6      750             TM      STB1
035C    2B      34B     751             T       CK
```

```
035D   C5    C5    752   ICP1    LB    L44
035E   94    354   753           T     ICP
035F   A0    360   754   PO1H    T     **1           ! RESET .01HP DURATION
                   755   **      !
**TIMERS HAVE BEEN INC
0360   00D9  26    756           LBL   #26
0362   D4    D4    757           TM    TCB4
0363   A8    368   758           T     DONE
0364   F3    F3    759           TM    RCB4
0365   C6    C6    760           LB    L45
0366   D8    D8    761           TM    STB4
0367   3B    34B   762           T     CK
0368   C6    C6    763   DONE    LB    L45
0369   F3    F3    764           TM    RCB4
036A   3B    34B   765           T     CK
                   766   ***     !        PARAMETER IS OVER THRESHOLD
036B   00FF        767   OVTHR   LBL   #00
036D   D2    D2    768           TM    TCB1          ! CHECK IF 1ST FLAG I
**S SET
036E   B7    377   769           T     ST&IN         ! GO SET 1ST FLAG & I
**NC DURATION
036F   C6    C6    770           LB    L45           ! CHECK FOR .01HP
0370   D4    D4    771           TM    TCB4
0371   B5    375   772           T     PEAK          ! .01HP IS NOT THERE
0372   00F8  7     773   PNUB    LBL   #07
0374   F0    F0    774           TM    DINC
0375   53D5  3D5   775   PEAK    TL    NCUB          !PAGE 3E0
0377   53B0  3B0   776   ST&IN   TL    STIN
·1   ASSEMBLY LISTING                       08:53  BANK 0  POM 0  PAGE 14
-ADDR  CODE  ARG   ST NO         STATEMENT

777           ORG   380
0380   C6    C6    778   STIN    LB    L45
0381   D4    D4    779           TM    TCB4
0382   85    385   780           T     **3
0383   55A7  5A7   781           TL    DELY
0385   5327  327   782           TL    LPYO
                   783   **************** TIMER .1 SEC SUBROUTINE
                   784   ***     !              ROUTINE LOCATED PAGE
** 380 &0C0
                   785   ********        ! NOW CONTAINING     REQUIRING
24HR TIMER &DISPLAY CLK
0387   00E4  1B    786   .1SEC   LBL   #1B
0389   DA    DA    787           TM    INC
038A   00E4  1B    788           LBL   #1B
038C   DB    DB    789           TM    TV=0
038D   A3    3A3   790           T     XSEC
                   791   ***     !       !  1SEC HAS POSED CHECK
**FOR 6 SEC, .01HR & 1 MIN
038E   00D4  2B    792   T2      LBL   #2B           ! MILES PER HOUR TIME
**R
0390   F0    F0    793           TM    DINC
0391   00D5  2A    794           LBL   #2A
0393   E0    E0    795           TM    TV=5          !CHG FOR NEW 16HZ CLO
**CK OSC.
0394   97    397   796           T     TMPH          ! GO CHECK FOR 3.6 S
**EC FOR MPH
```

```
0395  5061   61   797  CLK    TL    HIGH
0397  00D4   2B   798  TMPH   LBL   #2B
0399  E2     E2   799         TM    TV=7    !CHG FOR NEW 16HZ CLO
**CK OSC.
039A  9C     39C  800         T     MPH1    !CHG FOR NEW 16HZ CLO
**CK OSC.
039B  95     395  801         T     CLK     !CHG FOR NEW 16HZ CLO
**CK OSC.
039C  EA     EA   802  MPH1   TM    ZERO
039D  1F          803         DECB
039E  EA     EA   804         TM    ZERO
039F  0080   7F   805         LBL   #7F     SET FMPH
03A1  F7     F7   806         TM    LF
03A2  95     395  807         T     CLK
03A3  C5     C5   808  XCEC   LB    L44
03A4  D7     D7   809         TM    STB2    !SET 1 SEC FLAG DISP
03A5  5A00   A00  810         TL    TP1
03A7  A8     3A8  811         T     **1
03A8  00E5   1A   812  TP1R   LBL   #1A
03AA  E1     E1   813         TM    TV=6    !CHECK FOR 6 SEC
03AB  AD     3AD  814         T     **2     !=60SEC
03AC  BE     3BE  815         T     T2      !NOT EQUAL
03AD  EA     EA   816  SEC6   TM    ZERO
03AE  C6     C6   817         LB    L45
03AF  D9     D9   818         TM    STB8    ! SET 6 SEC FLAG FOR
**PPM
03B0  0091   6E   819         LBL   #6E     SET 6 SEC LINK FLAG
03B2  D7     D7   820         TM    STB2
03B3  00E5   19   821         LBL   #19
03B5  DA     DA   822         TM    INC     ! INCREMENT MINUTES
03B6  E1     E1   823         TM    TV=6    !CHECK FOR 1HR
03B7  BA     3BA  824         T     OHR     !=360 COUNTS
03B8  53C0   3C0  825         TL    MIN
03BA  53C7   3C7  826  OHR    TL    OHR1
1     ASSEMBLY LISTING                08:53  BANK 0  ROM 0  PAGE 15
-ADDR  CODE   ARG  ST NO         STATEMENT

827         ORG   3C0     !CHANGED TIMER CONT**
***
03C0  00D6   29   828  MIN    LBL   #29
03C2  F0     F0   829         TM    DINC    !/10 COUNTER
03C3  DC     DC   830         TM    TV=1
03C4  8E     3CE  831         T     MNT1    !
03C5  53BE   3BE  832  T2T    TL    T2
03C7  00E6   19   833  OHR1   LBL   #19     ! CLEAR 360 COUNTS
03C9  EA     EA   834         TM    ZERO
03CA  00D9   26   835         LBL   #26     SET .01HR FLAG
03CC  F7     F7   836         TM    LF      !LOAD F
03CD  80     3C0  837         T     MIN     ! *PAGE  380
03CE  C6     C6   838  MNT1   LB    L45
03CF  D7     D7   839         TM    STB2
                      840  ********              !       SET MINUTES BIT
03D0  00D7   28   841         LBL   #28
03D2  EA     EA   842         TM    ZERO
03D3  5551   551  843         TL    24HR
                      844  *****************SUBTRACT ROUTINE FOR ANALOG IS
**RVICING
03D5  00F3   C    845  MSUB   LBL   #0C
03D7  30          846         SC
03D8  33     4    847         LD    4       !SUBTRACTS 04A-C
```

```
03D9    0E              348             COMP            !FROM 00A-C
03DA    03              349             ADCCK
03DB    65              350             DC              !LEAVES LARGER VALUE
**IN
03DC    1F              351             DECB            !00A-C
03DD    33      4       352             LD      4
03DE    49      6       353             SKBI    #9
03DF    98      3D8     354             T       *-7
03E0    15              355             CKC
03E1    AD      3ED     356             T       NSB1
03E2    FB      FB      357             TM      BTH
03E3    A5      3E5     358             T       *+2         !CHECK FBTHP NOT =
03E4    AB      3EB     359             T       NSB
03E5    00B8    40      360     NSBT    LBL     #40         INSERT NEW P/U THRESH
03E7    33      4       361             LD      4
03E8    2B      4       362             EXD     4
03E9    49      6       363             SKBI    #9
03EA    A7      3E7     364             T       *-3
03EB    5327    327     365     NSB     TL      LPVO
03ED    FB      FB      366     NSB1    TM      BTH
03EE    AB      3EB     367             T       NSB
03EF    A5      3E5     368             T       NSBT
03F0    FB      FB      369     OVTHS   TM      BTH
03F1    B4      3F4     370             T       *+3
03F2    526B    26B     371             TL      OVTHP
03F4    531F    31F     372             TL      FIST
03F6    FB      FB      373     OVTH1   TM      BTH
03F7    B2      3F2     374             T       *-5
03F8    B4      3F4     375             T       *-4
03F9    0071    8E      376     QBTHQ   LBL     #8E
03FB    D2      D2      377             TM      TSB1
03FC    05              378             RTN
03FD    07              379             RTNSK
                        380     ********************************************

1       ASSEMBLY LISTING                            08:53   BANK 0  ROM 1   PAGE 17
-ADDR   CODE    ARG     ST NO           STATEMENT

881             ORG     440
                        882     *       VEHICLE SPEED SUBROUTINE
0440    549D    49D     883     VESPD   TL      VESP2
0442    F0      F0      884     VESP1   TM      DINC
0443    0028    77      885             LBL     #77         !INC CMPG
0445    F0      F0      886             TM      DINC
0446    54DC    4DC     887             TL      MILAG       !PAGE 4C0
0448    0030    7F      888     MH      LBL     #7F         !CHECK 3.6 MPH CALC
044A    D2      D2      889             TM      TSB1
044B    9A      45A     890             T       TEST        !NOT THERE
044C    EA      EA      891             TM      ZERO
044D    00A8    57      892             LBL     #57         !MOVE CSPD TO PSPD
044F    7C      3       893             LDI     #3
0450    F8      F8      894             TM      SHT4
0451    00A8    57      895             LBL     #57
0453    7F              896             LDI     #0
0454    2F              897             EXD     0
0455    43      C       898             SKBI    #3
0456    93      453     899             T       *-3
0457    0081    7E      900             LBL     #7E
0459    F4      F4      901             TM      PCB8        !RESET FIDLE
045A    0030    7F      902     TEST    LBL     #7F
```

```
0450  D3    D3    903           TM    TCB2
045D  A5    465   904           T     >2MP1
045E  0081  7E    905           LBL   #7E
0460  D5    D5    906           TM    TCB3
0461  A7    467   907           T     POC
0462  C7    C7    908           LB    L46
0463  D9    D9    909           TM    CTB3       !SET IDLE FLAG
0464  AC    46C   910           T     IDLE       !NOT ON
0465  5580  580   911   >2MP1   TL    >2MP
0467  D9    D9    912   POC     TM    CTB3       !SET TE-3
0468  0080  7F    913           LBL   #7F
046A  F2    F2    914           TM    RCB2       !RESET FMPH
046B  A5    465   915           T     >2MP1
046C  C4    C4    916   IDLE    LB    L26        !CHECK FTS .01
046D  D5    D5    917           TM    TCB3
046E  B3    473   918           T     KILL
046F  F4    F4    919           TM    RCB3       !RESET FTS
0470  0054  AB    920           LBL   #AB
0472  F0    F0    921           TM    DINC       !INC IDLE TIME
0473  5598  598   922   KILL    TL    KFULL
1     ASSEMBLY LISTING                           08:53 BANK 0 ROM 1 PAGE 22
-ADDR  CODE  ARG   ST NO         STATEMENT

923           ORG   580
0580  C7    C7    924   >2MP    LB    L46        RESET FIDL
0581  F4    F4    925           TM    RCB3
0582  C4    C4    926           LB    L26        CHECK FOR .01 HR
0583  D5    D5    927           TM    TCB3
0584  B1    5B1   928           T     FULL       !NOT THERE
0585  F4    F4    929           TM    RCB3       !IS THERE RESET FTC
0586  0053  A7    930           LBL   #A7        !DECIMAL INC ROAD TIM
**E
0588  F0    F0    931           TM    DINC
0589  000F  30    932           LBL   #30        CHECK HAND BRAKE
058B  D5    D5    933           TM    TCB3
058C  90    590   934           T     FLHB       !NO HAND BRAKE
058D  C7    C7    935           LB    L46        !SET FHBK FLAG
058E  D3    D3    936           TM    CTB4
058F  98    598   937           T     KFULL
0590  C7    C7    938   FLHB    LB    L46        !CHECK.FHBK
0591  D4    D4    939           TM    TCB4
0592  97    597   940           T     RBL
0593  0033  CC    941           LBL   #CC        IS THERE
0595  F0    F0    942           TM    DINC       !DECIMAL INC COUNT H
**BK
0596  C7    C7    943           LB    L46
0597  F3    F3    944   RBL     TM    RCB4       !RESET FLAG FHBK
0598  C7    C7    945   KFULL   LB    L46
0599  F2    F2    946           TM    RCB2       !RESET PTO FLAG
059A  B1    5B1   947           T     FULL
059B  0092  6D    948   4DIV    LBL   #6D
059D  DA    DA    949           TM    INC
059E  DF    DF    950           TM    TV=4
059F  A2    5A2   951           T     **3
05A0  5493  493   952           TL    CLMP
05A2  EA    EA    953           TM    ZERO
05A3  0098  67    954           LBL   #67
05A5  5482  482   955           TL    ENCP2
05B2  00FF        956   DELY    LBL   #00        USED FOR 36 SEC OVER
```

```
**THRESH
 05A9    D3     D3     957              TM     TSB2
 05AA    AE     5AE    958              T      DELY1
 05AB    D6     D6     959              TM     STB1
 05AC    5372   372    960              TL     PNUB
 05AE    D7     D7     961    DELY1     TM     STB2
 05AF    5327   327    962              TL     LPVO
 05B1    5070   70     963    FULL      TL     KFUEL    !TO MAINLINE
                                                  08:53  BANK 0  ROM 1  PAGE 13
1   ASSEMBLY LISTING
-ADDR   CODE   ARG    ST NO             STATEMENT

964              ORG    480
                              965       * ENGINE SPEED SUBROUTINE
 0480    5900   900    966    ENSPD     TL     TP3
 0482    0098   67     967    ENSP2     LBL    #67              !INC CRPM
 0484    F0     F0     968              TM     DINC
 0485    C6     C6     969              LB     L45
 0486    D5     D5     970              TM     TSB3             !CHECK FOR 6 SEC RPM
 0487    93     493    971              T      CLMP
 0488    F4     F4     972              TM     PCB3
 0489    0098   67     973              LBL    #67              YES 6 SEC IS OVER
 048B    7C     3      974              LDI    #3               MOVE CRPM TO PRPM
 048C    F3     F3     975              TM     SHT4
 048D    0098   67     976              LBL    #67              !CLEAR CRPM
 048F    7F            977              LDI    #0
 0490    2F            978              EXD    0
 0491    48     C      979              SKBI   #C
 0492    8F     48F    980              T      -3
 0493    C7     C7     981    CLMP      LB     L46              CHECK IDLE FLAG
 0494    D5     D5     982              TM     TSB3
 0495    9B     49B    983              T      KLG              !NOT THERE
 0496    0098   57     984              LBL    #57
 0498    7F            985              LDI    #0
 0499    2F            986              EXD    0                !CLEAR MPH REGISTER
 049A    98     498    987              T      -2
 049B    5745   745    988    KLG       TL     FETCH
 049D    0098   7D     989    VESP2     LBL    #7D
 049F    F0     F0     990              TM     DINC
 04A0    0098   7D     991              LBL    #7D
                              992       *
                              993       *
                              994       *
                              995       *
 04A2    E1     E1     996              TM     TV=6
 04A3    A5     4A5    997              T      VERO
 04A4    AD     4AD    998              T      FUK              !T FUK
                              999       *
                              1000      *
                              1001      *
                              1002      *
 04A5    EA     EA     1003   VERO      TM     ZERO
 04A6    1F            1004             DECB
 04A7    4A     5      1005             SKBI   #A
 04A8    A5     4A5    1006             T      -3
 04A9    0098   57     1007             LBL    #57
 04AB    5442   442    1008             TL     VESP1
 04AD    5070   70     1009   FUK       TL     KFUEL
 04AF    0098   57     1010   CMPH      LBL    #57
 04B1    F0     F0     1011             TM     DINC
```

```
 0482  5448   448  1012            TL      MH
                   1013    *       FUEL ROUTINE
1   ASSEMBLY LISTING                       03:53   BANK  0  ROM 1  PAGE 19
-ADDR  CODE   ARG  ST NO           STATEMENT

1014            ORG     400
 04C0  C7     C7   1015   FUEL     LB      L46       CHECK IDLE
 04C1  D5     D5   1016            TM      TSB8
 04C2  94     4D4  1017            T       RDF       !VEHICLE MUST BE MOVI
--NG
 04C3  D3     D3   1018            TM      TSB2
 04C4  98     4D8  1019            T       TIF       !IN PTO MODE
 04C5  004C   BF   1020            LBL     #BF       INC PTO FUEL
 04C7  F0     F0   1021            TM      DINC
 04C8  0088   77   1022   MMPG     LBL     #77       MOVE CMPG TO RMPG
 04CA  7C     3    1023            LDI     #3
 04CB  F9     F9   1024            TM      CHT4
 04CC  0086   79   1025            LBL     #79       CLEAR CMPH
 04CE  7F          1026            LDI     #0
 04CF  2F          1027            EXD     0
 04D0  43     C    1028            CKBI    #3
 04D1  8E     4CE  1029            T       *-3
 04D2  5740   740  1030            TL      ECPD
 04D4  0046   B9   1031   RDF      LBL     #B9       INC ROAD FUEL
 04D6  F0     F0   1032            TM      DINC
 04D7  88     4C8  1033            T       MMPG
 04D8  0048   BC   1034   TIF      LBL     #BC       INC IDLE FUEL
 04DA  F0     F0   1035            TM      DINC
 04DB  88     4C8  1036            T       MMPG
                   1037   *MILAGE ROUTINE FOR VEHICLE SPEED
 04DC  00A0   5F   1038   MILAG    LBL     #5F
 04DE  F0     F0   1039            TM      DINC
 04DF  00A2   5D   1040            LBL     #5D       .1 MILE
 04E1  DC     DC   1041            TM      TV=1
 04E2  A5     4E5  1042            T       *+3
 04E3  5448   448  1043   MH2      TL      MH
 04E5  EA     EA   1044            TM      ZERO
 04E6  005C   A3   1045            LBL     #A3
 04E8  F0     F0   1046            TM      DINC
 04E9  A3     4E3  1047            T       MH2
                   1048   ****IGNITION OFF SUBROUTINE-SERVICES LEVEL:
1   ASSEMBLY LISTING                       03:53   BANK  0  ROM 1  PAGE 20
-ADDR  CODE   ARG  ST NO           STATEMENT

1049            ORG     500
 0500  C5     C5   1050   IGOF     LB      L44
 0501  D2     D2   1051            TM      TSB1      !CHECK FOR FIGN
 0502  86     506  1052            T       RIG       !NOT THERE
 0503  004B   B4   1053            LBL     #B4       DECIMAL INC # OF IG
 0505  F0     F0   1054            TM      DINC
 0506  C5     C5   1055   RIG      LB      L44
 0507  F1     F1   1056            TM      RSB1      !RESET FIGN
 0508  00CF   30   1057            LBL     #30       CHECK OIL FLAG
 050A  D3     D3   1058            TM      TSB2
 050B  A9     529  1059            T       COO       !NOT THERE
 050C  004F   B0   1060            LBL     #B0       SET OIL FLAG
 050E  D9     D9   1061            TM      STBS
 050F  00CF   30   1062   OL       LBL     #30       CHECK COOLANT
 0511  D4     D4   1063            TM      TSB4
```

```
0512    AD      52D     1064            T       TDF     !NOT THERE
0513    004F    B0      1065            LBL     #B0
0515    D8      D8      1066            TM      CTB4    !SET COOLANT FLAG
0516    7F              1067    CDF     LDI     #0      CLEAR DISPLAY
0517    1C07    7       1068            IOL     #07
0519    7F      F       1069            LDI     #F      !CLEAR INDICATORS
051A    1C2E    2E      1070            IOL     #2E
051C    7F      F       1071            LDI     #F
051D    1C2D    2D      1072            IOL     #2D
051F    0071    3E      1073            LBL     #3E     RESET FVAL & FBTHP
0521    EA      EA      1074            TM      ZERO
0522    0075    3A      1075            LBL     #3A     CLEAR 600T & DS1HP
0524    F9      F9      1076            TM      ZROW
0525    C1      C1      1077            LB      L15     CLEAR ANALOG COUNTER
0526    EA      EA      1078            TM      ZERO
0527    5040    40      1079            TL      DIGTL
0529    004F    B0      1080    COO     LBL     #B0     RESET OIL FLAG
052B    F4      F4      1081            TM      PCB8
052C    3F      50F     1082            T       OL
052D    004F    B0      1083    TDF     LBL     #B0     RESET COOLANT FLAG
052F    F3      F3      1084            TM      PCB4
0530    96      516     1085            T       CDF
                        1086    *
                        1087    *
                        1088    *
                        1089    ***LOG MILAGE, ROAD TIME, IDLE TIME PTOTIME
                        1090    ***ROAD FUEL, IDLE FUEL,PTO FUEL
                        1091    *** RESET 24.00HR CLK,CHANGE BU FOR DATE &RET
**URN
1   ASSEMBLY LISTING                            08:53  BANK 0  ROM 1  PAGE 21
-ADDR  CODE    ARG    ST NO             STATEMENT

1092            ORG     540
                        1093    ****PART OF DAT LOG PROGRAM BELOW
0540    0050    AF      1094    ROWA    LBL     #AF
0542    F9      F9      1095            TM      ZROW    !CLEAR ROW A
0543    0040    BF      1096            LBL     #BF
0545    F9      F9      1097            TM      ZROW    !CLEAR ROW B RAM 0
0546    0030    CF      1098            LBL     #CF
0548    F9      F9      1099            TM      ZROW    !CLEAR ROW C RAM 0
0549    0073    8C      1100            LBL     #8C     !CLEAR DS 20,DS 40
054B    EA      EA      1101            TM      ZERO
054C    0020    DF      1102            LBL     #DF
054E    F9      F9      1103            TM      ZROW
054F    55F3    5F3     1104            TL      XYZ
                        1105    *37.0-----------------
0551    003C    C3      1106    24HR    LBL     #C3     !INCREMENT CLOCK REGI
**STER
0553    F0      F0      1107            TM      DINC
0554    003D    C2      1108            LBL     #C2
0556    E1      E1      1109            TM      TV=6
0557    3A      55A     1110            T       *+3
0558    55F3    5F3     1111    TT2     TL      XYZ
055A    EA      EA      1112            TM      ZERO    !CLEAR TENTHS MINUTES
055B    1F              1113            DECB
055C    F0      F0      1114            TM      DINC    !INCREMENT HRS
055D    003F    C0      1115            LBL     #C0
055F    D5      D5      1116            TM      TC22    !IS HRS =2
0560    98      558     1117            T       TT2
```

```
0561    17              1118            INCB                    !IS UNITS HRS =4
0562    D4      D4      1119            TM      TCB4
0563    98      558     1120            T       TT2
0564    F9      F9      1121            TM      CPOW            !CLEAR 24.
0565    0010    EF      1122            LBL     #EF             !INC DAY BCD COUNTS
0567    DA      DA      1123            TM      INC
0568    002E    D1      1124            LBL     #D1             INC # OF DAY SINCE LA
**ST POWER DOWN
056A    F0      F0      1125            TM      DINC
056B    0053    A7      1126            LBL     #A7             CHECK FOR ROAD TIME
056D    DB      DB      1127    RD      TM      TV=0
056E    B0      570     1128            T       *+2             !- 0
056F    B4      574     1129            T       RDS
0570    1F              1130            DECB
0571    43      C       1131            SKBI    #3
0572    AD      56D     1132            T       RD
0573    98      558     1133            T       TT2
0574    00E1    1E      1134    RDS     LBL     #1E             CHECK FOR FILLED TD
**TRIP DATA
0576    E4      E4      1135            TM      TV=9
0577    98      558     1136            T       TT2             !=0 NO ROOM FILLED P
**AMS
0578    37              1137            LD      0
0579    C2      C2      1138            LB      L1F
057A    55C0    5C0     1139            TL      STDA
1    ASSEMBLY LISTING                           08:53  BANK 0  ROM 1  PAGE 23
-ADDR   CODE    APG     ST NO           STATEMENT

1140            ORG     5C0
05C0    3F              1141    STDA    EXD     0               !EXCHANGE #1E & #1F
05C1    3F              1142            EX      0
05C2    C1      C1      1143            LB      L15             !EXCHANGE #15 & #18
05C3    37              1144            LD      0
05C4    00E7    18      1145            LBL     #18
05C6    3F              1146            EXD     0
05C7    C1      C1      1147            LB      L15
05C8    3F              1148            EX      0
05C9    0050    AF      1149            LBL     #AF
05CB    EB      EB      1150            TM      RAMF            !MOVE POW #0A
05CC    F6      F6      1151            TM      THR
05CD    F5      F5      1152            TM      AI              !IN LOCATION
05CE    0040    BF      1153            LBL     #BF             !MOVE POW #0B
05D0    EB      EB      1154            TM      RAMF
05D1    F6      F6      1155            TM      THR
05D2    F5      F5      1156            TM      AI
05D3    0030    CF      1157            LBL     #CF
05D5    EB      EB      1158            TM      RAMF            !MOVE POW #0C
05D6    F6      F6      1159            TM      THR
05D7    F5      F5      1160            TM      AI
05D8    0020    DF      1161            LBL     #DF
05DA    EB      EB      1162            TM      RAMF
05DB    F6      F6      1163            TM      THR             !MOVE POW #0D
05DC    C1      C1      1164            LB      L15
05DD    E9      E9      1165            TM      TV=F
05DE    A1      5E1     1166            T       *+3             !=F TIME TO INCR TO N
**EW PAM
05DF    DA      DA      1167            TM      INC
05E0    A4      5E4     1168            T       ECH
05E1    EA      EA      1169            TM      CEPO
```

```
05E2    C2      C2      1170            LB      L1F
05E3    DA      DA      1171            TM      INC
05E4    00E1    1E      1172    ECH     LBL     #1E             !EXCHANGE #1E & #1F
05E6    37              1173            LD      0
05E7    C2      C2      1174            LB      L1F
05E8    2F              1175            EXD     0
05E9    3F              1176            EX      0
05EA    C1      C1      1177            LB      L15             !EXCHANGE #15 & #18
05EB    37              1178            LD      0
05EC    00E7    18      1179            LBL     #18
05EE    2F              1180            EXD     0
05EF    C1      C1      1181            LB      L15
05F0    3F              1182            EX      0
05F1    5540    540     1183            TL      POWR
05F3    0010    EF      1184    XYZ     LBL     #EF             MOVE DATE TO #B1
05F5    37              1185            LD      0
05F6    004E    B1      1186            LBL     #B1
05F8    3F              1187            EX      0
05F9    538E    38E     1188            TL      T2
1       ASSEMBLY LISTING                        08:53   BANK 0  ROM 1   PAGE 29
-ADDR   CODE    ARG     ST NO           STATEMENT

1189            ORG     700
0700    CD      CD      1190    KIG     LB      L3D
0701    D5      D5      1191            TM      TSB3            !CHECK FOR DATA LINK
**EXTRACT
0702    8B      70B     1192            T       KIG1
0703    C4      C4      1193            LB      L26
0704    D2      D2      1194            TM      TSB1            !CHECK FOR 1 HR
0705    8B      70B     1195            T       KIG1
0706    F1      F1      1196            TM      RCB1
0707    CC      CC      1197            LB      L3C
0708    DA      DA      1198            TM      INC
0709    DF      DF      1199            TM      TV=4
070A    92      712     1200            T       LCLR1
070B    0091    6E      1201    KIG1    LBL     #6E
070D    EA      EA      1202            TM      ZEPO
070E    00CF    30      1203            LBL     #30
0710    5063    63      1204            TL      KIGN1
0712    17              1205    LCLR1   INCB
0713    F4      F4      1206            TM      RCB3            !RESET F2MIN
0714    501B    1B      1207            TL      ZAM             !0 ZEPO ALL MEMORY
0716    0071    3E      1208    CING1   LBL     #3E             !USED IN ANALOG ROUTI
**NE
0718    D3      D3      1209            TM      TSB2
0719    9C      71C     1210            T       ORE
071A    5312    312     1211            TL      CING2
071C    00BF    40      1212    ORE     LBL     #40
071E    EA      EA      1213            TM      ZEPO
071F    5327    327     1214            TL      LPVO
                        1215    ************************
1       ASSEMBLY LISTING                        08:53   BANK 0  ROM 1   PAGE 30
-ADDR   CODE    ARG     ST NO           STATEMENT

1216            ORG     730
0730    CC      CC      1217    FINCH   LB      L3C
0731    77      3       1218            LDI     #3
0732    3F              1219            EX
```

```
0782   70      F       1220             LDI    #F
0784   00DC    23      1221             LBL    #23       OUT PUT F1
0786   3F              1222             EX     0
0787   37              1223             LD     0
0788   1F              1224             DECB
0789   36      786     1225             T      *-3
078A   FD      FD      1226    FIN1     TM     OUT4
078B   CC      CC      1227             LB     L3C
078C   37              1228             LD     0
078D   6E      1       1229             ADI    #1
078E   90      790     1230             T      *+2
078F   92      792     1231             T      *+3
0790   3F              1232             EX
0791   8A      78A     1233             T      FIN1
0792   7E      1       1234             LDI    #1
0793   1C1D    1D      1235             IOL    #1D       OUTPUT END OF DATA
0795   7F              1236             LDI    #0
0796   1C1D    1D      1237             IOL    #1D
0798   CD      CD      1238             LB     L3D
0799   D9      D9      1239             TM     STB3      !SET F2MIN
079A   57B0    7B0     1240             TL     CINTL
079C   CD      CD      1241    NLINK    LB     L3D
079D   F4      F4      1242             TM     RCB3      !RESET F2MIN
079E   9F      79F     1243             T      *+1
079F   00D0    2F      1244             LBL    #2F
07A1   F9      F9      1245             TM     ZROW
07A2   0230    230     1246    NEX      TML    PCD
07A4   00D2    2D      1247             LBL    #2D
07A6   72      D       1248             LDI    #D        LOAD AN D FOR 1ST ROW
      TO BE OUTPUTTED
07A7   3F              1249             EX
07A8   00D1    2E      1250             LBL    #2E
07AA   7C      3       1251             LDI    #3
07AB   3F              1252             EX     0
07AC   CD      CD      1253             LB     L3D       SET VIDL
07AD   D6      D6      1254             TM     STB1
07AE   57C3    7C3     1255             TL     NEXT
07B0   00D0    2F      1256    CINTL    LBL    #2F
07B2   7B      4       1257             LDI    #4
07B3   3F              1258             EXD
07B4   7C      3       1259             LDI    #3
07B5   3F              1260             EXD
07B6   73      C       1261             LDI    #C
07B7   3F              1262             EXD
07B8   7F              1263             LDI    #0
07B9   3F              1264             EX
07BA   5040    40      1265             TL     DIGTL
1    ASSEMBLY LISTING                        08:53 BANK 0 POM 1 PAGE 31
-ADDR  CODE    ARG    ST NO             STATEMENT

1266             ORG    7C0
07C0   EA      EA      1267    NINK     TM     ZEPO      !PUTING 0123456789AB
07C1   0014    EB      1268             LBL    #EB
07C3   11              1269             LABL
07C4   3F              1270             EXD
07C5   33      7C3     1271             T      *-2
07C6   5790    79C     1272             TL     NLINK
07C8   0228    228     1273    NEXT     TML    RFLD
```

```
07CA    CC     CC          1274            LB      L3C
07CB    7B      C          1275            LDI     #C         ;LOAD C FOR INC COUNT
07CC    3F                 1276            EX
07CD    00D1   2E          1277    K2      LBL     #2E
07CF    DA     DA          1278            TM      INC
07D0    4C      3          1279            SKBI    #C
07D1    93     7D3         1280            T       *+2
07D2    9D     7DD         1281            T       K1
07D3    4B      +          1282            SKBI    #B
07D4    96     7D6         1283            T       *+2
07D5    9D     7DD         1284            T       K1
07D6    CC     CC          1285    AD4     LB      L3C
07D7    37                 1286            LD      0
07D8    6E      1          1287            ADI     #1         INC BL 4 TIMES
07D9    9B     7DB         1288            T       *+2
07DA    A0     7E0         1289            T       T4
07DB    3F                 1290            EX
07DC    8D     7CD         1291            T       K2
07DD    CD     CD          1292    K1      LB      L3D        SET FNEBU
07DE    D8     D8          1293            TM      STB4
07DF    96     7D6         1294            T       AD4
07E0    FD     FD          1295    T4      TM      OUT4
07E1    CD     CD          1296            LB      L3D
07E2    D4     D4          1297            TM      TSB4       !CHECK FOR NEW BU
07E3    88     7C8         1298            T       NEXT
07E4    D2     D2          1299            TM      TSB1       !VIDL
07E5    AD     7ED         1300            T       CIC
07E6    F1     F1          1301            TM      RSB1       !RESET VIDL
07E7    F3     F3          1302            TM      RSB4       !RESET FNEBU
07E8    00D3   2C          1303            LBL     #2C
07EA    77      8          1304            LDI     #8         !START RAM DUMP AT 8
07EB    3F                 1305            EX
07EC    88     7C8         1306            T       NEXT
07ED    F3     F3          1307    CIC     TM      RSB4
07EE    00D3   2C          1308            LBL     #2C
07F0    DB     DB          1309            TM      TV=0       !CHECK IF BU=0
07F1    BA     7FA         1310            T       PM1
07F2    DD     DD          1311            TM      TV=2
07F3    B9     7F9         1312            T       PM0
07F4    DC     DC          1313            TM      TV=1
07F5    B7     7F7         1314            T       *+2
07F6    88     7C8         1315            T       NEXT
07F7    5780   780         1316            TL      FINSH
07F9    7F                 1317    PM0     LDI     #0
07FA    7E      1          1318    PM1     LDI     #1
07FB    3F                 1319            EX
07FC    88     7C8         1320            T       NEXT
1       ASSEMBLY LISTING                           09:53  BANK 0  ROM 2  PAGE 32
-ADDR   CODE   ARG ST NO           STATEMENT

1321            ORG     800
                           1322    *41.0-------------------
0800    00BF   40          1323    KLINK   LBL     #40
0802    1C13   13          1324            IOL     #13
0804    3F                 1325            EX      0
0805    D4     D4          1326            TM      TSB4       !IS DATA LINK *START
**PULSE PRESENT
```

```
0806    38      308     1327            T       ←2
0807    5A      50A     1328            T       LINK
0808    5700    700     1329            TL      KIK
080A    0091    6E      1330    LINK    LBL     #6E
080C    D2      D2      1331            TM      TDB1
080D    F5      315     1332            T       ←←←
080E    D3      D3      1333            TM      TDB2
080F    92      512     1334            T       KIK
0810    57C0    7C0     1335            TL      NIMK
0812    CA      CA      1336    KIK     LB      L32
0813    5079    79      1337            TL      LIRT
0815    EA      EA      1338    OSS     TM      ZERO
0816    D6      D6      1339            TM      CTB1
0817    7D      D       1340            LDI     #D
0818    101D    1D      1341            IDL     #1D
081A    00ED    1A      1342            LBL     #1A
081C    EA      EA      1343            TM      ZERO
081D    92      512     1344            T       KIK
1       ASSEMBLY LISTING                        08:53   BANK 0  ROM 2   PAGE 33
-ADDR   CODE    ARG     ST NO           STATEMENT

1345            ORG     340
0840    003D    C2      1346    EVENT   LBL     #C2     !MOVE TIME
0842    EB      EB      1347            TM      RAMF
0843    00FD    2       1348            LBL     #02
0845    70      F       1349            LDI     #F
0846    EC      EC      1350            TM      SHFTV
0847    005C    A3      1351            LBL     #A3     !MOVE MILAGE
0849    EB      EB      1352            TM      RAMF
084A    004E    B1      1353            LBL     #B1     !MOVE DATE
084C    37              1354            LD      0
084D    00F7    3       1355            LBL     #03
084F    3F              1356            EX
0850    C1      C1      1357            LB      L15     !MOVE PARAMETER #10
0851    37              1358            LD      0
0852    00F6    9       1359            LBL     #09
0854    3F              1360            EX      0
0855    C1      C1      1361            LB      L15     !EXCHANGE #17 WITH #1
←←5
0856    37              1362            LD      0
0857    00E3    17      1363            LBL     #17
0859    3F              1364            EX      0
085A    C1      C1      1365            LB      L15
085B    3F              1366            EX      0
085C    C2      C2      1367            LB      L1F     !EXCHANGE #1D WITH #1
←←F
085D    37              1368            LD      0
085E    00E2    1D      1369            LBL     #1D
0860    3F              1370            EX      0
0861    C2      C2      1371            LB      L1F
0862    3F              1372            EX      0
0863    F6      F6      1373            TM      THR     !STORE NEW EVENT
0864    C1      C1      1374            LB      L15     !IN RAMS 0 THRU F
0865    E9      E9      1375            TM      TV=F
0866    AA      36A     1376            T       ←←4     !=F TIME TO INC BU#
0867    DA      DA      1377            TM      INC
0868    5380    380     1378    COVT1   TL      COVTH
086A    EA      EA      1379            TM      ZERO
086B    C2      C2      1380            LB      L1F
```

```
086C   E9    E9   1381           TM    TV=F      !CHECK IF SUB =F
086D   B0    870  1382           T     POVTH     !IF SO RE WRITE START
**ING AT RAM C
086E   DA    DA   1383           TM    INC
086F   A8    868  1384           T     COVT1
0870   7C    C    1385   POVTH   LDI   #C
0871   3F         1386           EX    0
0872   00E9  9D   1387           LBL   #9D
0874   DA    DA   1388           TM    INC       !KEEPS TRACT OF #OF 0
**V THRESH LOOPS
0875   A8    868  1389           T     COVT1
1   ASSEMBLY LISTING                 08:53    BANK 0    ROM 2    PAGE 34
-ADDR  CODE  ARG  ST NO           STATEMENT

1390                    ORG    880
0880   C2    C2   1391   COVTH   LB     L1F
0881   37         1392           LD     0        !EXCHANGE BACK #1D &
**#1F
0882   00E9  1D   1393           LBL    #1D
0884   3F         1394           EX     0
0885   C2    C2   1395           LB     L1F
0886   3F         1396           EX     0
0887   C1    C1   1397           LB     L15      !EXCHANGE BACK #17 &
**#15
0888   37         1398           LD     0
0889   00E9  17   1399           LBL    #17
088B   3F         1400           EX     0
088C   C1    C1   1401           LB     L15
088D   3F         1402           EX     0
088E   DC    DC   1403           TM    TV=1      !CHECK FOR BELOW THRE
**SH PARAMETERS
088F   A0    8A0  1404           T     9RST
0890   E1    E1   1405           TM    TV=6
0891   A0    8A0  1406           T     9RST
0892   E2    E2   1407           TM    TV=7
0893   A0    8A0  1408           T     9RST
0894   EF    EF   1409           TM    SETUP
0895   1F         1410           DECB
0896   1F         1411           DECB
0897   1F         1412           DECB
0898   EA    EA   1413   AMF     TM    SEPO
0899   43    C    1414           CKBI  #3
089A   98    898  1415           T     AMF
089B   7F    0    1416           LDI   #0
089C   19         1417           XABL
089D   EA    EA   1418           TM    SEPO
089E   532D  32D  1419           TL    PAP3
08A0   EF    EF   1420   9RST    TM    SETUP
08A1   1F         1421           DECB
08A2   1F         1422           DECB
08A3   1F         1423           DECB
08A4   EA    EA   1424           TM    SEPO
08A5   1F         1425           DECB
08A6   EA    EA   1426           TM    SEPO
08A7   1F         1427           DECB
08A8   79    9    1428           LDI   #9
08A9   3F         1429           EXD   0
08AA   98    898  1430           T     AMF
```

```
1  ASSEMBLY LISTING                        08:50  BANK 0  ROM 2  PAGE 40
-ADDR  CODE   ARG  ST NO    STATEMENT                 DATA SNAPSHOT TIMERS
                    1431           ORG    A00
 0A00  0073    84   1432  TP1      LBL    #84         !SNAPSHOT TIMERS
 0A02   D2     D2   1433           TM     TSB1
 0A03   87    A07   1434           T      TP12
 0A04  0075    8A   1435           LBL    #8A         !VEC
 0A06   F0     F0   1436           TM     DINC
 0A07  0073    84   1437  TP12     LBL    #84
 0A09   D3     D3   1438           TM     TSB2
 0A0A   8E    A0E   1439           T      TP14
 0A0B  0073    87   1440           LBL    #87
 0A0D   DA     DA   1441           TM     INC
 0A0E  0073    84   1442  TP14     LBL    #84
 0A10   D4     D4   1443           TM     TSB4
 0A11   95    A15   1444           T      TP16
 0A12  0061    9E   1445           LBL    #9E
 0A14   DA     DA   1446           TM     INC
 0A15  00BB    44   1447  TP16     LBL    #44
 0A17   D2     D2   1448           TM     TSB1
 0A18   B2    A32   1449           T      TP19
 0A19  0073    84   1450           LBL    #84
 0A1B   D5     D5   1451           TM     TSB3
 0A1C   9E    A1E   1452           T      *+2
 0A1D   BB    A3B   1453           T      TP19
 0A1E  0050    AF   1454           LBL    #AF
 0A20   F0     F0   1455           TM     DINC
 0A21  0051    AE   1456           LBL    #AE
 0A23   E1     E1   1457           TM     TV=6
 0A24   A6    A26   1458           T      *+2
 0A25   A9    A29   1459           T      TP17
 0A26   EA     EA   1460           TM     ZERO
 0A27   1F          1461           DECB
 0A28   F0     F0   1462           TM     DINC
 0A29  0053    AC   1463  TP17     LBL    #AC
 0A2B   DE     DE   1464           TM     TV=3
 0A2C   AE    A2E   1465           T      *+2
 0A2D   BB    A3B   1466           T      TP19
 0A2E  0073    84   1467           LBL    #84
 0A30   D9     D9   1468           TM     TSB8
 0A31   BB    A3B   1469           T      TP19
 0A32  0073    84   1470  TP18     LBL    #84
 0A34   F4     F4   1471           TM     PCB8
 0A35  0050    AF   1472           LBL    #AF
 0A37   7F          1473           LDI    #0
 0A38   2F          1474           EXD    0
 0A39   4B     4    1475           SKBI   #B
 0A3A   37    A37   1476           T      *-3
 0A3B  5A40   A40   1477  TP19     TL     TP5
1  ASSEMBLY LISTING                        08:53  BANK 0  ROM 2  PAGE 43
-ADDR  CODE   ARG  ST NO    STATEMENT
                    1478           ORG    AE0         !MPH SHIFT ROUT.
 0AE0  00AC    53   1479  MPH2E    LBL    #53
 0AE2   37          1480           LD     0
 0AE3  0080    4F   1481           LBL    #4F
 0AE5   3F          1482           EX     0
 0AE6  00AD    52   1483           LBL    #52
 0AE8   37          1484           LD     0
```

```
0AE9  00E1  4E  1485        LBL   #4E
0AEB   3F        1486        EX    0
0AEC  00AE  51  1487        LBL   #51
0AEE   07        1488        LD    0
0AEF  00E2  4D  1489        LBL   #4D
0AF1   3F        1490        EX    0
0AF2   05        1491        RTN
1     ASSEMBLY LISTING              08:53  BANK 0  ROM 0  PAGE 3
-ADDR CODE   ARG ST NO      STATEMENT

1492                ORG    0FF
00FF  7D   17D 1493   MPHS  PTR    0MPHS
1     ASSEMBLY LISTING              08:53  BANK 0  ROM 2  PAGE 42
-ADDR CODE   ARG ST NO      STATEMENT

1494                ORG    A80
0A80  00F0   F  1495  TP2   LBL    #0F
0A82   7F        1496        LDI    #0
0A83   3F        1497        EXD    0
0A84   40    0  1498        CKBI   #0
0A85   82   A82 1499        T      *-3
0A86   FF   FF  1500        TM     MPHO
0A87  00F0   F  1501        LBL    #0F
0A89   ED   ED  1502        TM     DESUB
0A8A   8C   A8C 1503        T      *+2
0A8B   90   A90 1504        T      TP21
0A8C  007B  84  1505  TP21A LBL    #84
0A8E   F3   F3  1506        TM     RCB4
0A8F   97   A97 1507        T      TP22
0A90  007B  84  1508  TP21  LBL    #84
0A92   D8   D8  1509        TM     STB4
0A93  0083  8C  1510        LBL    #8C
0A95   E2   E2  1511        TM     TV=7
0A96   B5   AB5 1512        T      TPE
0A97  00F0   F  1513  TP22  LBL    #0F
0A99   7F        1514        LDI    #0
0A9A   3F        1515        EXD    0
0A9B   7C    3  1516        LDI    #3
0A9C   3F        1517        EXD    0
0A9D   7F        1518        LDI    #0
0A9E   3F        1519        EXD    0
0A9F   FF   FF  1520        TM     MPHS
0AA0  00F0   F  1521        LBL    #0F
0AA2   ED   ED  1522        TM     DESUB
0AA3   A5   AA5 1523        T      *+2
0AA4   B0   AB0 1524        T      TP23
0AA5  0078  84  1525        LBL    #84
0AA7   D7   D7  1526        TM     STB2
0AA8  0079  86  1527        LBL    #86
0AAA   E9   E9  1528        TM     TV=F
0AAB   AE   AAE 1529        T      *+3
0AAC  5A00  AC0 1530        TL     TP24
0AAE  5B40  B40 1531        TL     IGNT   !GO CHECK IGN TIMER
0AB0  007B  84  1532  TP23  LBL    #84
0AB2   F2   F2  1533        TM     PCB2
0AB3  5AC0  AC0 1534        TL     TP24
0AB5  01DC  1DC 1535  TPE   TML    DORPA
0AB7   8C   A8C 1536        T      TP21A
1     ASSEMBLY LISTING              08:53  BANK 0  ROM 2  PAGE 43
-ADDR CODE   ARG ST NO      STATEMENT
```

| ADDR | CODE | ARG | ST NO | | STATEMENT | |
|---|---|---|---|---|---|---|
| | | | 1537 | | ORG | ACO |
| 0AC0 | 00F0 | F | 1538 | TP24 | LBL | #0F |
| 0AC2 | 7A | 5 | 1539 | | LDI | #5 |
| 0AC3 | 2F | | 1540 | | EXD | 0 |
| 0AC4 | 7B | 4 | 1541 | | LDI | #4 |
| 0AC5 | 2F | | 1542 | | EXD | 0 |
| 0AC6 | 7F | | 1543 | | LDI | #0 |
| 0AC7 | 2F | | 1544 | | EX | 0 |
| 0AC8 | FF | FF | 1545 | | TM | MPHS |
| 0AC9 | 00F0 | F | 1546 | | LBL | #0F |
| 0ACB | ED | ED | 1547 | | TM | DESUB |
| 0ACC | 2F | ACF | 1548 | | T | *+3 |
| 0ACD | 5B29 | B29 | 1549 | | TL | TP26 |
| 0ACF | 5B00 | B00 | 1550 | | TL | TP25 |

1   ASSEMBLY LISTING                    08:53   BANK 0  ROM 2  PAGE 44

| ADDR | CODE | ARG | ST NO | | STATEMENT | |
|---|---|---|---|---|---|---|
| | | | 1551 | | ORG | B00 |
| 0B00 | 00F0 | F | 1552 | TP25 | LBL | #0F |
| 0B02 | 7B | 4 | 1553 | | LDI | #4 |
| 0B03 | 2F | | 1554 | | EXD | 0 |
| 0B04 | 7F | | 1555 | | LDI | #0 |
| 0B05 | 2F | | 1556 | | EXD | 0 |
| 0B06 | 7F | | 1557 | | LDI | #0 |
| 0B07 | 3F | | 1558 | | EX | 0 |
| 0B08 | 009C | 63 | 1559 | | LBL | #63 |
| 0B0A | 37 | | 1560 | | LD | 0 |
| 0B0B | 00B0 | 4F | 1561 | | LBL | #4F |
| 0B0D | 3F | | 1562 | | EX | 0 |
| 0B0E | 009D | 62 | 1563 | | LBL | #62 |
| 0B10 | 37 | | 1564 | | LD | 0 |
| 0B11 | 00B1 | 4E | 1565 | | LBL | #4E |
| 0B13 | 3F | | 1566 | | EX | 0 |
| 0B14 | 009E | 61 | 1567 | | LBL | #61 |
| 0B16 | 37 | | 1568 | | LD | 0 |
| 0B17 | 00B2 | 4D | 1569 | | LBL | #4D |
| 0B19 | 3F | | 1570 | | EX | 0 |
| 0B1A | 00F0 | F | 1571 | | LBL | #0F |
| 0B1C | ED | ED | 1572 | | TM | DESUB |
| 0B1D | 2F | B1F | 1573 | | T | *+2 |
| 0B1E | A9 | B29 | 1574 | | T | TP26 |
| 0B1F | 007B | 84 | 1575 | | LBL | #84 |
| 0B21 | D6 | D6 | 1576 | | TM | STB1 |
| 0B22 | 0076 | 89 | 1577 | | LBL | #89 |
| 0B24 | E1 | E1 | 1578 | | TM | TV=6 |
| 0B25 | A7 | B27 | 1579 | | T | *+2 |
| 0B26 | AC | B2C | 1580 | | T | TP27 |
| 0B27 | 01DC | 1DC | 1581 | | TML | DCPCA |
| 0B29 | 007B | 84 | 1582 | TP26 | LBL | #84 |
| 0B2B | F1 | F1 | 1583 | | TM | PCB1 |
| 0B2C | 003E | C1 | 1584 | TP27 | LBL | #C1 |
| 0B2E | DE | DE | 1585 | | TM | TV=3 |
| 0B2F | B1 | B31 | 1586 | | T | *+2 |
| 0B30 | B9 | B39 | 1587 | | T | TP28 |
| 0B31 | 003F | C0 | 1588 | | LBL | #C0 |
| 0B33 | DB | DB | 1589 | | TM | TV=0 |
| 0B34 | B6 | B36 | 1590 | | T | *+2 |
| 0B35 | B9 | B39 | 1591 | | T | TP28 |
| 0B36 | 007D | 82 | 1592 | | LBL | #82 |

```
0B38    D6      D6    1593             TM    STB1     !SET 2 AM FLAG
0B39    5B50   B50    1594   TP29      TL    TP4      !GO RESET TIMERS
1    ASSEMBLY LISTING                        08:53  BANK 0  ROM 2  PAGE 45
-ADDR   CODE    ARG  ST NO             STATEMENT

1595             ORG   B40
0B40    007B    34    1596   IGNT      LBL   #34
0B42    D5      D5    1597             TM    TSB8
0B43    B8     B48    1598             T     ++5      !NO ENG. TIME < 30MIN
**.
0B44    01DC   1DC   1599             TML   DSRCA    !YES ENG. TIME > 30MI
**N.GO SNAPSHOT
0B46    5AB0   AB0   1600             TL    TP23
0B48    5AC0   AC0   1601             TL    TP24
1    ASSEMBLY LISTING                        08:53  BANK 0  ROM 2  PAGE 39
-ADDR   CODE    ARG  ST NO             STATEMENT

1602             ORG   9C0
09C0    00B9    46    1603   TP3       LBL   #46      !RPM ACCUMULATOR FOR
**TROY POLICE
09C2    D5      D5    1604             TM    TSB8
09C3    B9     9C9    1605             T     TP32
09C4    00B0    CF    1606             LBL   #CF
09C6    F0      F0    1607             TM    DINC
09C7    5482   482    1608   TP31      TL    ENSP2
09C9    00B0    DF    1609   TP32      LBL   #DF
09CB    F0      F0    1610             TM    DINC
09CC    B7     9C7    1611             T     TP31
1    ASSEMBLY LISTING                        08:53  BANK 0  ROM 2  PAGE 46
-ADDR   CODE    ARG  ST NO             STATEMENT

1612             ORG   B80      !DATA SNAPSHOT STORAG
**E FOR TROY POLICE
0B80    007C    33    1613   DSR       LBL   #33
0B82    D2      D2    1614             TM    TSB1
0B83    B5     B85    1615             T     ++2
0B84    BE     B8E    1616             T     DSR1
0B85    D6      D6    1617             TM    STB1
0B86    00E9    16    1618             LBL   #16
0B88    7F           1619             LDI   #0
0B89    3F           1620             EX    0
0B8A    00E3    1C    1621             LBL   #1C
0B8C    75      A     1622             LDI   #A
0B8D    3F           1623             EX    0
0B8E    00EA    15    1624   DSR1      LBL   #15      !SAVE ANALOG COUNT IN
** 85
0B90    37           1625             LD    0
0B91    007A    35    1626             LBL   #85
0B93    3F           1627             EX    0
0B94    00EA    15    1628             LBL   #15
0B96    7F           1629             LDI   #0
0B97    3F           1630             EX    0
0B98    EF      EF    1631             TM    SETUP
0B99    E3      E3    1632             TM    PAMF
0B9A    00FC    3     1633             LBL   #03
0B9C    70      F     1634             LDI   #F
0B9D    FA      FA    1635             TM    DSRS
0B9E    73      C     1636             LDI   #C
0B9F    FA      FA    1637             TM    DSRS
```

```
0BA0    76        9    1638         LDI    #9
0BA1    FA       FA    1639         TM     DOPS
0BA2    73        6    1640         LDI    #6
0BA3    FA       FA    1641         TM     DOPO
0BA4  0019       EF    1642         LBL    #EF        !LOAD DAY #
0BA6    3F             1643         LD     0
0BA7  00FF            1644          LBL    #00
0BA9    3F             1645         EX     0
0BAA  01C3      1C3    1646         TML    DORT       !SAVE PAM1, BU,BM & LD
**AD CMAP VECTORS
0BAC    F6       F6    1647         TM     THR        !STORE FIRST ROW
0BAD  01CB      1CB    1648         TML    DORT       !RESTORE PAM1 BU,BM
0BAF  00E9       16    1649         LBL    #16
0BB1    DA       DA    1650         TM     INC
0BB2    1F             1651         DECB
0BB3    DA       DA    1652         TM     INC
0BB4    EF       EF    1653         TM     SETUP
0BB5    EB       EB    1654         TM     RAMF
0BB6  00FC        3    1655         LBL    #03
0BB8  5BC0      BC0    1656         TL     DCP2
1      ASSEMBLY LISTING                    08:53  BANK 0  ROM 2  PAGE 47
-ADDR  CODE     ARG  ST NO         STATEMENT

1657                       ORG    BC0
0BC0    70        F    1658  DCP2   LDI    #F
0BC1    FA       FA    1659         TM     DOPO
0BC2    73        C    1660         LDI    #C
0BC3    FA       FA    1661         TM     DOPO
0BC4    76        9    1662         LDI    #9
0BC5    FA       FA    1663         TM     DOPS
0BC6    73        6    1664         LDI    #6
0BC7    FA       FA    1665         TM     DOPO
0BC8  01CB      1CB    1666         TML    DORT
0BCA    F6       F6    1667         TM     THR        !STORE 2ND ROW OF DAT
**A
0BCB  01CB      1CB    1668         TML    DORT
0BCD  00E9       16    1669         LBL    #16
0BCF    DA       DA    1670         TM     INC
0BD0    1F             1671         DECB
0BD1    DA       DA    1672         TM     INC
0BD2    EF       EF    1673         TM     SETUP
0BD3    EB       EB    1674         TM     RAMF
0BD4  00FC        3    1675         LBL    #03
0BD6    70        F    1676         LDI    #F
0BD7    FA       FA    1677         TM     DOPS
0BD8    73        C    1678         LDI    #C
0BD9    FA       FA    1679         TM     DOPS
0BDA    76        9    1680         LDI    #9
0BDB    FA       FA    1681         TM     DOPS
0BDC    79        6    1682         LDI    #6
0BDD    FA       FA    1683         TM     DOPS
0BDE  01CB      1CB    1684         TML    DORT
0BE0    F6       F6    1685         TM     THR        !STORE 3RD ROW OF DAT
**A
0BE1  00EA       15    1686         LBL    #15
0BE3    DA       DA    1687         TM     INC
0BE4  00C3       C3    1688         LBL    #C3
0BE5    EB       EB    1689         TM     RAMF
0BE7  00FC        3    1690         LBL    #03
0BE9    70        F    1691         LDI    #F
```

```
0BEA    EC      EC      1693            TM      CHFTV
0BEB    00BC    B3      1694            LBL     #B3
0BED    EB      EB      1694            TM     PAMF
0BEE    00FC    3       1695            LBL     #03
0BF0    5980    B80     1696            TL      DCR3
1  ASSEMBLY LISTING                              BANK 0  ROM 2  PAGE 38
-ADDR  CODE    ARG    ST NO     STATEMENT

1697            ORG     980
0980    74      8       1698    DCR3    LDI     #8
0981    EC      EC      1699            TM      CHFTV
0982    00BC    B3      1700            LBL     #B3
0984    EB      EB      1701            TM      PAMF
0985    00FC    3       1702            LBL     #03
0987    73      7       1703            LDI     #7
0988    EC      EC      1704            TM      CHFTV
0989    005C    A3      1705            LBL     #A3
098B    EB      EB      1706            TM      PAMF
098C    F6      F6      1707            TM      THR     !STORE LAST PCE OF DA
**TA
098D    01CB    1CB     1708            TML     DCPT    !RESTORE PAM1 BU+BM
098F    00E9    16      1709            LBL     #16
0991    DA      DA      1710            TM      INC
0992    DC      DC      1711            TM      TV=1
0993    95      995     1712            T       **2
0994    A5      9A5     1713            T       DCR5
0995    007A    B5      1714            LBL     #B5
0997    37              1715            LD      0
0998    00EA    15      1716            LBL     #15
099A    3F              1717            EX      0
099B    00E3    1C      1718            LBL     #1C
099D    DA      DA      1719            TM      INC
099E    E7      E7      1720            TM      TV=D
099F    A1      9A1     1721            T       **2
09A0    05              1722    DCR4    RTN             RETURN TO INAP CRIT.
09A1    007C    B3      1723            LBL     #B3
09A3    F1      F1      1724            TM      PCB1
09A4    A0      9A0     1725            T       DCR4
09A5    007A    B5      1726    DCR5    LBL     #B5
09A7    37              1727            LD      0
09A8    00EA    15      1728            LBL     #15
09AA    3F              1729            EX      0
09AB    A0      9A      1730            T       DCR4
1  ASSEMBLY LISTING                      08:53 BANK 0  ROM 2  PAGE 45
-ADDR  CODE    ARG    ST NO     STATEMENT

1731            ORG     B50
0B50    0073    B4      1732    TP4     LBL     #B4
0B52    D2      D2      1733            TM      TCB1
0B53    95      B55     1734            T       **2
0B54    9A      B5A     1735            T       TP41
0B55    0075    BA      1736            LBL     #BA
0B57    EA      EA      1737            TM      ZEPO
0B58    1F              1738            DECB
0B59    EA      EA      1739            TM      ZEPO
0B5A    0073    B4      1740    TP41    LBL     #B4
0B5C    D3      D3      1741            TM      TCB2
0B5D    9F      B5F     1742            T       **2
```

```
0B5E    A4      B64     1743            T       TP42
0B5F    0073    87      1744            LBL     #87
0B61    EA      EA      1745            TM      ZERO
0B62    1F              1746            DECB
0B63    EA      EA      1747            TM      ZERO
0B64    0073    84      1748    TP42    LBL     #84
0B66    D4      D4      1749            TM      TCB4
0B67    A9      B69     1750            T       *+2
0B68    B0      B70     1751            T       TP43
0B69    0061    9E      1752            LBL     #9E
0B6B    EA      EA      1753            TM      ZERO
0B6C    1F              1754            DECB
0B6D    EA      EA      1755            TM      ZERO
0B6E    1F              1756            DECB
0B6F    EA      EA      1757            TM      ZERO
0B70    5900    900     1758    TP43    TL      TP6
1   ASSEMBLY LISTING                            08:53   BANK 0  ROM 2   PAGE 36
-ADDR   CODE    ARG     ST NO           STATEMENT

1759            ORG     900
0900    00BB    44      1760    TP6     LBL     #44     !3 AM 3 HR CHECK
0902    D2      D2      1761            TM      TCB1
0903    3F      90F     1762            T       TP61
0904    007D    32      1763            LBL     #32
0906    D2      D2      1764            TM      TCB1
0907    3F      90F     1765            T       TP61
0908    D3      D3      1766            TM      TCB2
0909    3F      90F     1767            T       TP61
090A    01DC    1DC     1768            TML     DCRCA
090C    007D    32      1769            LBL     #32
090E    EA      EA      1770            TM      ZERO
090F    5040    40      1771    TP61    TL      DISTL   !RETURN TO MAINLINE
1   ASSEMBLY LISTING                            08:53   BANK 0  ROM 2   PAGE 41
-ADDR   CODE    ARG     ST NO           STATEMENT

1772            ORG     A40
0A40    00BB    44      1773    TP5     LBL     #44     !3 HR IGN OFF TIMER
0A42    D2      D2      1774            TM      TCB1
0A43    35      A49     1775            T       *+2
0A44    A0      A60     1776            T       TP52
0A45    007D    32      1777            LBL     #32
0A47    D3      D3      1778            TM      TCB2
0A48    3A      A4A     1779            T       *+2
0A49    35      A55     1780            T       TP51
0A4A    006C    93      1781            LBL     #93
0A4C    DA      DA      1782            TM      INC
0A4D    006F    90      1783            LBL     #90
0A4F    DE      DE      1784            TM      Tv=3
0A50    32      A52     1785            T       *+2
0A51    35      A55     1786            T       TP51
0A52    007D    32      1787            LBL     #32
0A54    D7      D7      1788            TM      CTB2
0A55    53A8    3A8     1789    TP51    TL      TP1R
0A57    006C    93      1790    TP52    LBL     #93
0A59    F9      F9      1791            TM      ZPOW
0A5A    35      A55     1792            T       TP51
```

```
1    ASSEMBLY LISTING                        08:53   BANK 0  ROM 1  PAGE 25
-ADDR  CODE   APG  ST NO          STATEMENT

1793            ORG    640
 0640  00CE    31    1794    TP7    LBL    #31         !FOOT BRAKE & ACCEL
**CHECK
 0642    D2    D2    1795           TM     TSB1
 0643    96   656    1796           T      TP72
 0644  000F    F0    1797           LBL    #F0
 0646    7E     1    1798           LDI    #1
 0647    04          1799           LBUA
 0648    D2    D2    1800           TM     TSB1
 0649    94   654    1801           T      TP71
 064A  007E    31    1802           LBL    #31
 064C    D2    D2    1803           TM     TSB1
 064D    3F   64F    1804           T      **2
 064E    94   654    1805           T      TP71
 064F  01DC   1DC    1806           TML    DCRCA
 0651  007E    31    1807           LBL    #31
 0653    D6    D6    1808           TM     STB1
 0654  5069    69    1809    TP71   TL     VSPD
 0656  007E    31    1810    TP72   LBL    #31
 0658    F1    F1    1811           TM     RSB1
 0659    94   654    1812           T      TP71
1    ASSEMBLY LISTING                        08:53   BANK 0  ROM 2  PAGE 41
-ADDR  CODE   APG  ST NO          STATEMENT

1813            ORG    A60
 0A60  009D    62    1814    TP53   LBL    #62         !STRT UP DELAY ON OVT
**HS
 0A62    37          1815           LD     0
 0A63    1E          1816           SKZ
 0A64    AE    A6E   1817           T      TP54
 0A65    1F          1818           DECB
 0A66    37          1819           LD     0
 0A67    1E          1820           SKZ
 0A68    AE    A6E   1821           T      TP54
 0A69    1F          1822           DECB
 0A6A    37          1823           LD     0
 0A6B    1E          1824           SKZ
 0A6C    AE    A6E   1825           T      **2
 0A6D    97    A57   1826           T      TP52
 0A6E  006C    93    1827    TP54   LBL    #93
 0A70    DA    DA    1828           TM     INC
 0A71  006D    92    1829           LBL    #92
 0A73    E5    E5    1830           TM     TV=B
 0A74    E6    A76   1831           T      **2
 0A75    95    A55   1832           T      TP51
 0A76  0071    8E    1833           LBL    #8E         !SET FVAL
 0A78    D7    D7    1834           TM     STB2
 0A79    97    A57   1835           T      TP52
1    ASSEMBLY LISTING                        08:53   BANK 0  ROM 1  PAGE 26
-ADDR  CODE   APG  ST NO          STATEMENT

1836            ORG    630
 0630  00F0    F     1837    TPLST  LBL    #0F         !TRESHOLD LOADER ROUT!
```

```
**ME
06B2    7F              1838    LDI     #0      BATTERY VOLTS
06B3    2F              1839    EXD
06B4    79      6       1840    LDI     #6
06B5    2F              1841    EXD
06B6    7D      2       1842    LDI     #2
06B7    3F              1843    EX
06B8    F6      F6      1844    TM      THR
06B9    F5      F5      1845    TM      AI
06BA    7F              1846    LDI     #0      1-OIL PRESSURE
06BB    2F              1847    EXD
06BC    7F              1848    LDI     #0
06BD    2F              1849    EXD
06BE    7D      2       1850    LDI     #2
06BF    FC      FC      1851    TM      BTHL
06C0    F6      F6      1852    TM      THR
06C1    F5      F5      1853    TM      AI
06C2    7F              1854    LDI     #0      2-BATT. CURRENT
06C3    2F              1855    EXD
06C4    7F              1856    LDI     #0
06C5    2F              1857    EXD
06C6    7A      5       1858    LDI     #5
06C7    3F              1859    EX
06C8    F6      F6      1860    TM      THR
06C9    F5      F5      1861    TM      AI
06CA    7F              1862    LDI     #0      3-ALTERNATOR CURRENT
06CB    2F              1863    EXD
06CC    7F              1864    LDI     #0
06CD    2F              1865    EXD
06CE    79      7       1866    LDI     #7
06CF    3F              1867    EX
06D0    F6      F6      1868    TM      THR
06D1    F5      F5      1869    TM      AI
06D2    7F              1870    LDI     #0      4-EXHAUST MAN. #1CYL
06D3    2F              1871    EXD
06D4    7F              1872    LDI     #0
06D5    2F              1873    EXD
06D6    79      6       1874    LDI     #6
06D7    3F              1875    EX
06D8    F6      F6      1876    TM      THR
06D9    F5      F5      1877    TM      AI
06DA    7A      5       1878    LDI     #5      5-BRAKE TEMP
06DB    2F              1879    EXD
06DC    7D      2       1880    LDI     #2
06DD    2F              1881    EXD
06DE    7E      1       1882    LDI     #1
06DF    FC      FC      1883    TM      BTHL
06E0    F6      F6      1884    TM      THR
06E1    F5      F5      1885    TM      AI
06E2    7F              1886    LDI     #0      6-AXIAL DIFF. TEMP
06E3    2F              1887    EXD
06E4    7B      4       1888    LDI     #4
06E5    2F              1889    EXD
06E6    7E      1       1890    LDI     #1
06E7    FC      FC      1891    TM      BTHL
06E8    F6      F6      1892    TM      THR
06E9    F5      F5      1893    TM      AI
06EA    7F              1894    LDI     #0      7-PWR STEER TEMP
06EB    2F              1895    EXD
06EC    5600    600     1896    TL      #600
```

```
ASSEMBLY LISTING              08:53  BANK 0  ROM 1  PAGE 27
-ADDR  CODE    ARG   ST NO    STATEMENT

1397      ORG    600
06C0   73       4    1398     LDI    #4
06C1   3F            1399     EXD
06C2   7E       1    1900     LDI    #1
06C3   FC       FC   1901     TM     BTHL
06C4   F6       F6   1902     TM     THR
06C5   F5       F5   1903     TM     AI        8-EXHAUST TEMP #2 CYL
06C6   7F            1904     LDI    #0        != 1/2 DESIRED THRESH
06C7   2F            1905     EXD
06C8   7F            1906     LDI    #0
06C9   2F            1907     EXD
06CA   79       6    1908     LDI    #6
06CB   3F            1909     EX
06CC   F6       F6   1910     TM     THR
06CD   F5       F5   1911     TM     AI
06CE   7F            1912     LDI    #0        9-ENG COMPARTMENT TEM
**P
06CF   2F            1913     EXD
06D0   7F            1914     LDI    #0
06D1   2F            1915     EXD
06D2   7E       1    1916     LDI    #1
06D3   3F            1917     EX
06D4   F6       F6   1918     TM     THR
06D5   F5       F5   1919     TM     AI        A-RADIATOR BOT TEMP
06D6   7F            1920     LDI    #0
06D7   2F            1921     EXD    0
06D8   7F            1922     LDI    #0
06D9   2F            1923     EXD    0
06DA   7E       1    1924     LDI    #1
06DB   3F            1925     EX     0
06DC   F6       F6   1926     TM     THR
06DD   F5       F5   1927     TM     AI        B-TRANS OIL TEMP
06DE   7F            1928     LDI    #0
06DF   2F            1929     EXD
06E0   7F            1930     LDI    #0
06E1   2F            1931     EXD
06E2   7D       2    1932     LDI    #2
06E3   3F            1933     EX
06E4   F6       F6   1934     TM     THR
06E5   F5       F5   1935     TM     AI        C-OIL TEMP
06E6   7F            1936     LDI    #0
06E7   2F            1937     EXD
06E8   79       4    1938     LDI    #4
06E9   2F            1939     EXD
06EA   7E       1    1940     LDI    #1
06EB   3F            1941     EX
06EC   F6       F6   1942     TM     THR
06ED   F5       F5   1943     TM     AI        D-BLOCK COOL TEMP
06EE   7D       2    1944     LDI    #2
06EF   2F            1945     EXD
06F0   7E       1    1946     LDI    #1
06F1   2F            1947     EXD
06F2   7D       2    1948     LDI    #2
06F3   3F            1949     EX
06F4   F6       F6   1950     TM     THR
06F5   5600    600   1951     TL     #600
```

```
1   ASSEMBLY LISTING              08:53  BANK 0  ROM 1  PAGE 34
-ADDR  CODE   ARG  ST NO          STATEMENT

1952       ORG    600
0600    F5     F5   1953          TM     AI
0601    76     9    1954          LDI    #9          E-AMBIENT TEMP
0602    2F          1955          EXD    0
0603    76     9    1956          LDI    #9
0604    2F          1957          EXD    0
0605    76     9    1958          LDI    #9
0606    3F          1959          EX     0
0607    F6     F6   1960          TM     THR
0608    F5     F5   1961          TM     AI
0609    7F          1962          LDI    #0          F-ACCELEROMETER
060A    2F          1963          EXD    0
060B    7F          1964          LDI    #0
060C    2F          1965          EXD    0
060D    7C     3    1966          LDI    #3
060E    3F          1967          EX     0
060F    F6     F6   1968          TM     THR
0610    00E1   1E   1969          LBL    #1E
0612    77     8    1970          LDI    #8
0613    2F          1971          EXD    0
0614    72     D    1972          LDI    #D
0615    3F          1973          EX     0
0616    C1     C1   1974          LB     L15
0617    EA     EA   1975          TM     ZERO
0618    57B0   7B0  1976          TL     CINTL
1   ASSEMBLY LISTING              08:53  BANK 0  ROM 2  PAGE 37
-ADDR  CODE   ARG  ST NO          STATEMENT          COMPUTER SHUT DOWN PROGRAM

1977       ORG    940
0940    7B     4    1978  SHTWN   LDI    #4          SHUTDOWN SEQUENCE
0941    1C1D   1D   1979          IOL    #1D         SET DIM=0
0943    D0     D0   1980          TM     WAIT
0944    00CF   30   1981          LBL    #30
0946    1C03   3    1982          IOL    #03
0948    2F          1983          EX     0
0949    D2     D2   1984          TM     TCB1
094A    9C     94C  1985          T      *+2
094B    A9     969  1986          T      SHT3
094C    0010   EF   1987          LBL    #EF
094E    D2     D2   1988          TM     TCB1
094F    9A     95A  1989          T      SHT1
0950    0005   FA   1990          LBL    #FA
0952    36     1    1991          LD     1
0953    0C          1992          EOP
0954    1E          1993          SKZ
0955    AC     96C  1994          T      SHT6
0956    0010   EF   1995          LBL    #EF
0958    F1     F1   1996          TM     PCB1
0959    AE     96E  1997          T      SHT5
095A    0005   FA   1998  SHT1    LBL    #FA
095C    36     1    1999          LD     1
095D    6E     1    2000          ADI    #1
095E    9F     95F  2001          T      *+1
095F    3F          2002          EX     0
0960    E3     E3   2003          TM     TV=A
```

```
0961    A3      963     2004            T       *+2
0962    A5      965     2005            T       CHT2
0963    7F              2006            LDI     #0
0964    3F              2007            EX      0
0965    0010    EF      2008    CHT2    LBL     #EF
0967    D6      D6      2009            TM      STB1
0968    AC      96C     2010            T       CHT6
0969    0010    EF      2011    CHT3    LBL     #EF
096B    F1      F1      2012            TM      RCB1
096C    5043    43      2013    CHT6    TL      SHTR
096E    21              2014    CHT5    SF2
096F    000C    F3      2015            LBL     #F3     LOAD MEMORY VALIDATION
**N PATTERN
0971    75      5       2016            LDI     #5      SAVE MEMORY
0972    3F              2017            EXD     0
0973    7A      A       2018            LDI     #A
0974    3F              2019            EXD     0
0975    7F              2020            LDI     #0
0976    3F              2021            EXD     0
0977    7F      F       2022            LDI     #F
0978    3F              2023            EX      0
0979    5D00    D00     2024            TL      #D00
```
1   ASSEMBLY LISTING                            08:53   BANK 0  ROM 3   PAGE 52
-ADDR   CODE    ARG     ST NO           STATEMENT
                                                        RESETS SLEEP TIMER
```
                        2025            ORG     D00
0D00    74      4       2026            LDI     #4      RESET 5 DECADE CTR
0D01    1C0D    D       2027            IOL     #0D
0D03    7F              2028            LDI     #0
0D04    1C0D    D       2029            IOL     #0D
0D06    71      E       2030            LDI     #E     SHUT DOWN POWER & SAVE
0D07    1D              2031            DOA             MEMORY
0D08    88      D08     2032            T       *+0     HALT POWER SUPPLY NOW OFF
```
                                                08:53   BANK 0  ROM 1   PAGE 16
1   ASSEMBLY LISTING
-ADDR   CODE    ARG     ST NO           STATEMENT
```
                        2033            ORG     400
0400    20              2034    CSUBTR  DC
0401    0013    EC      2035            LBL     #EC
0403    36      1       2036            LD      1
0404    0E              2037            COMP
0405    08              2038            ADCSK
0406    65              2039            DC
0407    2E      1       2040            EXD     1
0408    47      7       2041            CKBI    7
0409    83      403     2042            T       *-6
040A    05              2043            RTN
```
1   ASSEMBLY LISTING                            08:53   BANK 0  ROM 3   PAGE 48
-ADDR   CODE    ARG     ST NO           STATEMENT
                                                THIS ROUTINE CALCULATES
                                                THE SLEEP TIME
```
                        2044            ORG     C00
0C00    00FF            2045    CRTC    LBL     #00     COMPUTE REAL TIME CLO
**CK
0C02    7F              2046            LDI     #0
0C03    3F              2047            EX      0
0C04    77      8       2048            LDI     #8      SET DIM=1
0C05    1C1D    1D      2049            IOL     #1D
0C07    75      1       2050    CRT1    LDI     #1      RESET SCANNER SDC
```

```
0C08   100E   E     2051            IOL    #0E        READ SLEEP TIMER
0C0A   7F           2052            LDI    #0
0C0B   100E   E     2053            IOL    #0E
0C0D   00F7   8     2054            LBL    #08
0C0F   1003   3     2055   CRT2     IOL    #03        READ SDC
0C11   3F           2056            EX     0
0C12   77     8     2057            LDI    #8
0C13   100D   D     2058            IOL    #0D
0C15   7F           2059            LDI    #0
0C16   100D   D     2060            IOL    #0D
0C18   17           2061            INCB
0C19   4D     2     2062            SKBI   #D
0C1A   8F     C0F   2063            T      CRT2       LOOP ALL 5 DIGS
0C1B   00FF         2064            LBL    #00
0C1D   37           2065            LD     0
0C1E   1E           2066            SKZ
0C1F   AA     C2A   2067            T      CRT3
0C20   00F3   C     2068            LBL    #0C
0C22   37           2069            LD     0
0C23   00FE   1     2070            LBL    #01
0C25   3F           2071            EX     0
0C26   1F           2072            DECB
0C27   70     F     2073            LDI    #F
0C28   3F           2074            EX     0
0C29   87     C07   2075            T      CRT1
0C2A   00FE   1     2076   CRT3     LBL    #01
0C2C   37           2077            LD     #0
0C2D   00F3   C     2078            LBL    #0C
0C2F   0C           2079            EOR
0C30   1E           2080            SKZ
0C31   B3     C33   2081            T      ←2
0C32   87     C07   2082            T      CRT1
0C33   5C40   C40   2083            TL     #C40

1    ASSEMBLY LISTING                              09:53  BANK 0  ROM 3  PAGE 49
-ADDR  CODE   ARG   ST NO            STATEMENT

2084            ORG    C40        CONVERTS MINUTES COUNT
0C40   0003   FC    2085            LBL    #FC        TO DAYS, HOURS, MINUTES
0C42   EE     EE    2086            TM     PAMC
0C43   0013   EC    2087            LBL    #EC
0C45   7F           2088            LDI    #0
0C46   2F           2089            EXD
0C47   7B     4     2090            LDI    #4
0C48   2F           2091            EXD
0C49   7B     4     2092            LDI    #4
0C4A   2F           2093            EXD
0C4B   7E     1     2094            LDI    #1
0C4C   2F           2095            EXD
0C4D   01BD   1BD   2096   A1       TML    SUBTR
0C4F   15           2097            CKC
0C50   98     C58   2098            T      ←8
0C51   002E   D1    2099            LBL    #D1
0C53   F0     F0    2100            TM     DINC
0C54   0003   FC    2101            LBL    #FC
0C56   EB     EB    2102            TM     PAMF
0C57   3D     C4D   2103            T      A1
0C58   0003   FC    2104            LBL    #FC
0C5A   EE     EE    2105            TM     PAMC
```

```
0C5B  0013   EC   2106        LBL   *EC
0C5D  7F          2107        LDI   *0
0C5E  3F          2108        EXD
0C5F  79     6    2109        LDI   *6
0C60  3F          2110        EXD
0C61  7F          2111        LDI   *0
0C62  3F          2112        EXD
0C63  7F          2113        LDI   *0
0C64  3F          2114        EX
0C65  01BD  1BD   2115   B1   TML   SUBTR
0C67  15          2116        SKC
0C68  B0    C70   2117        T     *+3
0C69  001E  E1    2118        LBL   *E1
0C6B  F0    F0    2119        TM    DINC
0C6C  0003  FC    2120        LBL   *FC
0C6E  E3    E3    2121        TM    RAMF
0C6F  A5    C85   2122        T     B1
0C70  24          2123        RC
0C71  00F3  C     2124        LBL   *0C
0C72  37          2125        LD
0C74  69    6     2126        ADI   *6
0C75  5C80  C80   2127        TL    *C80
```

1  ASSEMBLY LISTING                                08:53  BANK 0  ROM 3  PAGE 50
-ADDR  CODE   ARG  ST NO      STATEMENT

```
                    2128        ORG   C80
0C80  003C  C3    2129        LBL   *C3
0C82  08          2130        ADCSK
0C83  65          2131        DC
0C84  3F          2132        EX
0C85  00F4  B     2133        LBL   *0B
0C87  75    A     2134        LDI   *A
0C88  0A          2135        ADC
0C89  003D  C2    2136        LBL   *C2
0C8B  08          2137        ADCSK
0C8C  90    C90   2138        T     *+4
0C8D  3F          2139        EXD
0C8E  F0    F0    2140        TM    DINC
0C8F  93    C93   2141        T     *+4
0C90  69    6     2142        ADI   *6
0C91  92    C92   2143        T     *+1
0C92  3F          2144        EXD
0C93  003E  C1    2145        LBL   *C1
0C95  24          2146        RC
0C96  35    2     2147        LD    2
0C97  69    6     2148        ADI   *6
0C98  08          2149        ADCSK
0C99  65          2150        DC
0C9A  2D    2     2151        EXD   2
0C9B  9B    C9B   2152        T     *-5
0C9C  001E  E1    2153        LBL   *E1
0C9E  35    2     2154        LD    2
0C9F  2D    2     2155        EXD   2
0CA0  9E    C9E   2156        T     *-2
0CA1  20          2157        SC
0CA2  001E  E1    2158        LBL   *E1
0CA4  74    B     2159        LDI   *B
0CA5  08          2160        ADCSK
```

```
0CA6   65           2161        DC
0CA7   2F           2162        EXD
0CA8   72     D     2163        LDI    #0
0CA9   03           2164        ADCCK
0CAA   65           2165        DC
0CAB   3F           2166        EX
0CAC   15           2167        SKC
0CAD   B7     CB7   2168        T      E1
0CAE   002E   D1    2169        LBL    #D1
0CB0   F0     F0    2170        TM     DINC
0CB1   001E   E1    2171        LBL    #E1
0CB2   35     2     2172        LD     2
0CB4   2D     2     2173        EXD    2
0CB5   B3     CB3   2174        T      ←2
0CB6   BC     CBC   2175        T      E2
0CB7   003E   C1    2176   E1   LBL    #C1
0CB9   35     2     2177        LD     2
0CBA   2D     2     2178        EXD    2
0CBB   B9     CB9   2179        T      ←2
0CBC   5C00   CC0   2180   E2   TL     #CC0
1    ASSEMBLY LISTING              08:53   BANK 0  ROM 3  PAGE 51
-ADDR  CODE   ARG   ST NO        STATEMENT

2181        ORG    CC0
0CC0   001E   E1    2182        LBL    #E1
0CC2   7F           2183        LDI    #0
0CC3   2F           2184        EXD
0CC4   92    CC2    2185        T      ←2
0CC5   5040   40   *2186        TL     DIGTL
```

TIME CALCULATION COMPLETE

BEGIN NORMAL OPERATION

```
1    CROSS REFERENCE TABLE          08:53      PAGE  1
-STMT.  NAME          USING STATEMENTS

2096   A1            2103
 1295   AD4           1294
  426   ADV            416
  620   ADV1           654   635   599
  672   ADV3           729   668
  599   ADVIX          596
  111   AI            1961  1953  1943  1935  1927  1919  1911  1903
→1893  1885 1877 1869 1861 1853
                      1845  1160  1156  1152
 1413   AMF           1430  1415
 2115   B1            2122
  725   BAD            669   598
  669   BD             637   626
  117   BTH            873   869   866   857
  118   BTHL          1901  1891  1883  1851
 1067   CDF           1085
 1307   CIC           1300
  686   CING           680   441
 1208   CING1          686
  687   CING2         1211
 1256   CINTL         1976  1240   508   308
  738   CK             765   762   751   568
  743   CK1            741   618
  613   CK11           615   611
  563   CK22           563
  500   CKIT           485
```

```
    303    CLST     291
    797    CLK      307   801
    981    CLMP     971   952
   1010    CMPH
    361    CMPR
    486    CNT      609
    609    CNT1     603
   1080    COD     1059
   1379    COVT1   1389  1384
   1391    COVTH   1379
    478    CRDIS    465
   2050    CRT1    2082  2075
   2055    CRT2    2063
   2076    CRT3    2067
   2045    CRTC      20
    506    CUDISP   502
    956    DELY     781
    961    DELY1    958
    103    DECUB   1572  1547  1522  1502  695
    360    DISTL   2186  1771  1265  1079
    106    DINC    2170  2140  2119  2100  1610  1607  1462  1455
**1436   1125  1114  1107  1054  1046
                  1039  1035  1032  1021  1011   990   968   942
**  931   921   886   884   829   793
                  774
    545    DIP      549   539
    559    DISP     748   545
    763    DOME     758
    520    DOWN     512
   1613    DCR      329
   1624    DSP1    1616
   1658    DSP2    1656
   1698    DSP3    1696
   1722    DSP4    1730  1725
   1726    DSP5    1713
    329    DSPCA   1806  1768  1599  1981  1535
    116    DSPS    1683  1681  1679  1677  1665  1663  1661  1659
**1641   1639  1637  1635
    316    DSPT    1708  1684  1668  1666  1648  1646
   2176    E1      2168
   2180    E2      2175
   1172    ECH     1168
    967    ENSP2   1608   955
    966    ENSPD    414
    411    ESPD    1030   404
   1346    EVENT    703
    415    FETCH    988
   1226    FIN1    1233
   1217    FINSH   1316
    698    FIST     872
    655    FLANG    653
    933    FLHB     934
   1015    FUEL     403
   1009    FUK      998
    963    FULL     947   923
    916    IDLE     910
    405    IGF      397
   1596    IGNT    1531
   1050    IGOF     405
```

```
  465    IKC
  466    IKC1        482
  584    INHL3       617    401
   34    INC        1828   1752   1719   1710   1687   1672   1670   1658
**1650   1446  1441  1388   1383   1277
                    1278   1198   1171   1167   1123    949    822    787
** 621    556   476   427    309    261
                      52
   75    ID01        371    366
  746    ISP         753
  752    ISP1        742
 1292    K1         1284   1281
 1336    K1K        1344   1334
 1277    K2         1291
  400    KFUEL      1009    963
  945    KFULL       937    922
 1130    KIG        1329
 1201    KIG1       1195   1192
  385    KIGN        797
  386    KIGN1      1204
  922    KILL        918
  988    KLG         983
 1323    KLINK       385
  551    L1          529
   58    L14         739    553    546    483    472    457
   59    L15        1974   1401   1397   1374   1365   1361   1357   1181
**1177   1164  1147  1143   1077    714
                     413
   60    L1F        1395   1391   1380   1371   1367   1174   1170   1138
   72    L23         604    486    479
   61    L24         466
   62    L26        1193    926    916
   68    L32        1336    411    400    394    381    372
   70    L3C        1285   1274   1267   1217   1197
   71    L3D        1296   1282   1253   1241   1238   1190
   69    L42         727    661
   67    L43         705    690    687
   63    L44        1055   1050    808    752    725    678    666    388
   64    L45         969    838    817    779    770    763    760
   65    L46        1015    981    945    940    938    935    924    908
   66    L7F
 1205    LCLR1      1200
  356    LD3         345
  113    LF          336    306
 1330    LINK       1328
  406    LIRT       1337
  371    LIRT1       408
  213    LOOP        222
  705    LPVO       1214    962    865    782    700
  838    MH         1043   1012
 1043    MH2        1047
 1038    MILAG       887
  828    MIN         837    825
 1022    MMPG       1036   1033
  838    MNT1        831
  802    MPH1        800
 1493    MPH2       1545   1520   1500
 1479    MPH3        250
```

| | | | | | |
|---|---|---|---|---|---|
| 120 | MUX | 559 | 299 | 279 | |
| 299 | MX | 302 | 295 | | |
| 482 | NDP1 | 459 | | | |
| 1246 | NEX | | | | |
| 1272 | NEXT | 1320 | 1315 | 1306 | 1298 1255 |
| 1267 | NINK | 1335 | | | |
| 1241 | NLINK | 1272 | | | |
| 477 | NOEY | 475 | | | |
| 865 | NSB | 867 | 859 | | |
| 866 | NSB1 | 856 | | | |
| 860 | NSBT | 863 | | | |
| 845 | NSUB | 775 | | | |
| 283 | NWS | | | | |
| 1062 | OL | 1082 | | | |
| 342 | OPD | 357 | | | |
| 1212 | OPE | 1210 | | | |
| 237 | OT4 | 301 | | | |
| 119 | OUT4 | 1295 | 1226 | | |
| 610 | OV | 432 | | | |
| 723 | OVTH | 695 | | | |
| 873 | OVTH1 | 723 | | | |
| 869 | OVTH2 | 697 | | | |
| 767 | OVTHP | 871 | | | |
| 775 | PEAK | 772 | | | |
| 773 | PNUB | 960 | | | |
| 912 | POS | 907 | | | |
| 260 | QAI&R | 111 | | | |
| 134 | QBTH | 117 | | | |
| 241 | QBTHL | 118 | | | |
| 876 | QBTHQ | 134 | | | |
| 224 | QDECUB | 231 | 103 | | |
| 202 | QDINC | 209 | 106 | | |
| 307 | QDSRS | 116 | | | |
| 151 | QINC | 155 | 84 | | |
| 123 | QIO01 | 75 | | | |
| 147 | QLF | 113 | | | |
| 250 | QMPHS | 1493 | | | |
| 325 | QMUX | 120 | | | |
| 279 | QOUT4 | 292 | 119 | | |
| 190 | QRAMF | 101 | | | |
| 235 | QRAMS | 104 | | | |
| 195 | QRSB1 | 107 | | | |
| 196 | QRSB2 | 108 | | | |
| 197 | QRSB4 | 109 | | | |
| 198 | QRSB8 | 110 | | | |
| 252 | QSETUP | 105 | | | |
| 267 | QSHFTV | 102 | | | |
| 210 | QSHT4 | 114 | | | |
| 143 | QSTB1 | 80 | | | |
| 144 | QSTB2 | 81 | | | |
| 145 | QSTB4 | 82 | | | |
| 146 | QSTB8 | 83 | | | |
| 247 | QTHP | 112 | | | |
| 135 | QTCB1 | 76 | | | |
| 136 | QTCB2 | 77 | | | |
| 137 | QTCB4 | 78 | | | |
| 138 | QTCB8 | 79 | | | |
| 153 | QTV=0 | 85 | | | |

| | | | | | | | | | |
|---|---|---|---|---|---|---|---|---|---|
| 159 | QTY=1 | 86 | | | | | | | |
| 160 | QTY=2 | 87 | | | | | | | |
| 161 | QTY=3 | 88 | | | | | | | |
| 162 | QTY=4 | 89 | | | | | | | |
| 163 | QTY=5 | 90 | | | | | | | |
| 164 | QTY=6 | 91 | | | | | | | |
| 165 | QTY=7 | 92 | | | | | | | |
| 166 | QTY=8 | | | | | | | | |
| 167 | QTY=9 | 94 | | | | | | | |
| 168 | QTY=A | 93 | | | | | | | |
| 169 | QTY=B | 95 | | | | | | | |
| 170 | QTY=C | 96 | | | | | | | |
| 171 | QTY=D | 97 | | | | | | | |
| 172 | QTY=E | 98 | | | | | | | |
| 173 | QTY=F | 99 | | | | | | | |
| 124 | QWAIT | 74 | | | | | | | |
| 187 | QZERO | 100 | | | | | | | |
| 178 | QZROW | 115 | | | | | | | |
| 720 | RA | 721 | | | | | | | |
| 101 | RAMF | 2121 | 2102 | 1706 | 1701 | 1694 | 1689 | 1674 | 1654 |
| ** 1632 | 1352 | 1347 | 1162 | 1158 | 1154 | | | | |
| | | 1150 | 677 | 605 | 506 | 440 | 313 | | |
| 104 | RAMC | 2105 | 2086 | 607 | 248 | | | | |
| 714 | RAP | 729 | | | | | | | |
| 729 | RAP1 | | | | | | | | |
| 712 | RAP2 | 1419 | | | | | | | |
| 944 | RBC | 940 | | | | | | | |
| 1127 | PD | 1132 | | | | | | | |
| 1134 | PD8 | 1129 | | | | | | | |
| 553 | PDE | 463 | | | | | | | |
| 464 | PDE1 | 557 | | | | | | | |
| 1031 | PDF | 1017 | | | | | | | |
| 491 | REFF | 550 | | | | | | | |
| 494 | RFLD | 1273 | 492 | | | | | | |
| 1055 | PIG | 1052 | | | | | | | |
| 1317 | PM0 | 1312 | | | | | | | |
| 1318 | PM1 | 1310 | | | | | | | |
| 754 | PO1H | 722 | | | | | | | |
| 722 | PO1H1 | 720 | | | | | | | |
| 1385 | POVTH | 1382 | | | | | | | |
| 1094 | POWA | 1183 | | | | | | | |
| 107 | PSB1 | 2012 | 1996 | 1811 | 1724 | 1582 | 1301 | 1196 | 1056 |
| ** 713 | 638 | | | | | | | | |
| 108 | PSB2 | 1533 | 946 | 914 | 746 | | | | |
| 109 | PSB4 | 1506 | 1307 | 1302 | 1084 | 944 | 764 | 759 | |
| 110 | PSB8 | 1471 | 1242 | 1206 | 1081 | 972 | 929 | 925 | 919 |
| ** 901 | 667 | | | | | | | | |
| 571 | PSD | 1246 | 535 | | | | | | |
| 535 | PSDS | 527 | 477 | | | | | | |
| 448 | PT | 378 | | | | | | | |
| 379 | PT1 | 453 | | | | | | | |
| 562 | PX | 737 | | | | | | | |
| 569 | SBP | 567 | 565 | | | | | | |
| 749 | SBTHP | 731 | 569 | | | | | | |
| 916 | SEC6 | | | | | | | | |
| 293 | SETF | 293 | | | | | | | |
| 105 | SETUP | 1673 | 1653 | 1631 | 1420 | 1409 | 676 | 439 | 210 |

| | | | | | | | | |
|---|---|---|---|---|---|---|---|---|
| 102 | SHFTV | 1704 | 1699 | 1692 | 1350 | 488 | 307 | |
| 1999 | SHT1 | 1989 | | | | | | |
| 2008 | SHT2 | 2005 | | | | | | |
| 2011 | SHT3 | 1986 | | | | | | |
| 114 | SHT4 | 1024 | 975 | 894 | 692 | 689 | | |
| 2014 | SHT5 | 1997 | | | | | | |
| 2013 | SHT6 | 2010 | 1994 | | | | | |
| 362 | SHTP | 2013 | | | | | | |
| 1978 | SHTWN | 361 | | | | | | |
| 503 | SKY | 462 | | | | | | |
| 546 | SKY1 | 503 | | | | | | |
| 439 | SP | 447 | | | | | | |
| 1338 | SQ0 | 1332 | | | | | | |
| 776 | ST&IN | 763 | | | | | | |
| 30 | STB1 | 2009 | 1808 | 1617 | 1593 | 1576 | 1339 | 1254 | 959 |
| **750 | 889 | | | | | | | |
| 81 | STB2 | 1834 | 1788 | 1526 | 961 | 839 | 820 | 809 | |
| 82 | STB4 | 1509 | 1293 | 1066 | 936 | 761 | | | |
| 83 | STB3 | 1468 | 1239 | 1061 | 912 | 909 | 818 | 726 | |
| 1141 | STDA | 1139 | | | | | | |
| 778 | STIN | 776 | | | | | | |
| 711 | STORE | 684 | | | | | | |
| 676 | STUP | | | | | | | |
| 435 | STUPM | | | | | | | |
| 443 | STUPR | | | | | | | |
| 304 | SUBTR | 2115 | 2096 | | | | | |
| 792 | T2 | 1188 | 832 | 315 | | | | |
| 832 | T2T | | | | | | | |
| 1295 | T4 | 1289 | | | | | | |
| 1063 | TDF | 1064 | | | | | | |
| 902 | TEST | 890 | 398 | | | | | |
| 112 | THR | 1968 | 1960 | 1950 | 1942 | 1934 | 1926 | 1918 | 1910 |
| **1902 | 1892 | 1884 | 1876 | 1868 | 1860 | | | |
| | | 1852 | 1844 | 1707 | 1685 | 1667 | 1647 | 1373 | 1163 |
| **1159 | 1155 | 1151 | 711 | | | | | |
| 1034 | TIF | 1019 | | | | | | |
| 798 | TMPH | 796 | | | | | | |
| 1432 | TP1 | 310 | | | | | | |
| 1437 | TP12 | 1434 | | | | | | |
| 1442 | TP14 | 1439 | | | | | | |
| 1447 | TP16 | 1444 | | | | | | |
| 1463 | TP17 | 1459 | | | | | | |
| 1470 | TP18 | 1449 | | | | | | |
| 1477 | TP19 | 1469 | 1466 | 1453 | | | | |
| 812 | TP1R | 1789 | | | | | | |
| 1495 | TP2 | 560 | | | | | | |
| 1508 | TP21 | 1504 | | | | | | |
| 1505 | TP21A | 1536 | | | | | | |
| 1513 | TP22 | 1507 | | | | | | |
| 1532 | TP23 | 1600 | 1524 | | | | | |
| 1538 | TP24 | 1601 | 1534 | 1530 | | | | |
| 1552 | TP25 | 1550 | | | | | | |
| 1582 | TP26 | 1574 | 1549 | | | | | |
| 1584 | TP27 | 1580 | | | | | | |
| 1594 | TP28 | 1591 | 1567 | | | | | |
| 1603 | TP3 | 966 | | | | | | |
| 1608 | TP31 | 1611 | | | | | | |
| 1609 | TP32 | 1605 | | | | | | |
| 1732 | TP4 | 1594 | | | | | | |
| 1740 | TP41 | 1735 | | | | | | |
| 1748 | TP42 | 1743 | | | | | | |
| 1758 | TP43 | 1751 | | | | | | |
| 1773 | TP5 | 1477 | | | | | | |
| 1789 | TP51 | 1832 | 1792 | 1786 | 1780 | | | |
| 1790 | TP52 | 1835 | 1826 | | | | | |
| 1814 | TP53 | 1776 | | | | | | |
| 1827 | TP54 | 1821 | 1817 | | | | | |
| 1760 | TP6 | 1758 | | | | | | |
| 1771 | TP61 | 1767 | 1765 | 1762 | | | | |
| 1794 | TP7 | 390 | | | | | | |
| 1809 | TPT1 | 1812 | 1805 | 1801 | | | | |
| 1810 | TP72 | 1796 | | | | | | |
| 1535 | TPE | 1512 | | | | | | |
| 1337 | TPLOT | 49 | | | | | | |
| 75 | TSB1 | 1988 | 1984 | 1803 | 1800 | 1795 | 1774 | 1764 | 1761 |
| **1723 | 1614 | 1448 | 1433 | 1331 | 1299 | | | |
| | | 1194 | 1051 | 889 | 877 | 768 | 699 | 636 | 615 |

| | | | | | | | | | | |
|---|---|---|---|---|---|---|---|---|---|---|
| ** 610 | 602 | 595 | 386 | 382 | | | | | | |
| 77 | TOB2 | | 1779 | 1766 | 1741 | 1438 | 1333 | 1209 | 1116 | 1058 |
| **1018 | 957 | 903 | 744 | 429 | 401 | | | | | |
| 78 | TOB4 | | 1749 | 1443 | 1326 | 1297 | 1119 | 1063 | 939 | 779 |
| ** 771 | 757 | 395 | 290 | | | | | | | |
| 79 | TOB8 | | 1604 | 1597 | 1451 | 1191 | 1016 | 982 | 970 | 933 |
| ** 927 | 917 | 906 | 679 | 461 | 412 | | | | | |
| | | | 292 | | | | | | | |
| 1111 | TT2 | | 1136 | 1133 | 1120 | 1117 | | | | |
| 85 | TV=0 | | 1589 | 1309 | 1127 | 789 | 740 | 547 | 537 | 300 |
| ** 290 | | | | | | | | | | |
| 86 | TV=1 | | 1711 | 1403 | 1313 | 1041 | 830 | 730 | 464 | |
| 87 | TV=2 | | 1311 | 523 | | | | | | |
| 88 | TV=3 | | 1784 | 1535 | 1464 | 622 | | | | |
| 89 | TV=4 | | 1199 | 950 | 526 | 473 | | | | |
| 90 | TV=5 | | 795 | 562 | 458 | | | | | |
| 91 | TV=6 | | 1579 | 1457 | 1405 | 1109 | 996 | 823 | 813 | 564 |
| 92 | TV=7 | | 1511 | 1407 | 799 | 566 | | | | |
| 94 | TV=9 | | 1135 | | | | | | | |
| 93 | TV=A | | 2003 | | | | | | | |
| 95 | TV=B | | 1830 | | | | | | | |
| 96 | TV=C | | | | | | | | | |
| 97 | TV=D | | 1720 | | | | | | | |
| 98 | TV=E | | 652 | | | | | | | |
| 99 | TV=F | | 1528 | 1381 | 1375 | 1165 | 719 | | | |
| 457 | UDISP | | 747 | | | | | | | |
| 531 | UW | | 552 | | | | | | | |
| 525 | UWCE | | 493 | | | | | | | |
| 1003 | VEP0 | | 997 | | | | | | | |
| 884 | VECP1 | | 1008 | | | | | | | |
| 889 | VECP2 | | 883 | | | | | | | |
| 883 | VECPD | | 397 | | | | | | | |
| 394 | VCPD | | 1809 | | | | | | | |
| 74 | WAIT | | 1980 | 591 | 369 | 365 | | | | |
| 308 | XCEC | | 790 | | | | | | | |
| 1184 | XYZ | | 1111 | 1104 | | | | | | |
| 31 | ZAM | | 1207 | 29 | 24 | 19 | 14 | | | |
| 32 | ZAM1 | | 55 | | | | | | | |
| 34 | ZAM2 | | 42 | | | | | | | |
| 42 | ZAM3 | | 39 | | | | | | | |
| 50 | ZAM4 | | 46 | | | | | | | |
| 100 | ZEP0 | | 1975 | 1770 | 1757 | 1755 | 1753 | 1747 | 1745 | 1739 |
| **1737 | 1460 | 1466 | 1464 | 1418 | 1413 | | | | | |
| | | | 1379 | 1343 | 1338 | 1267 | 1213 | 1202 | 1169 | 1112 |
| **1101 | 1073 | 1074 | 1044 | 1003 | 953 | | | | | |
| | | | 891 | 842 | 834 | 816 | 804 | 802 | 701 | 625 |
| ** 597 | 593 | 484 | | | | | | | | |
| 115 | ZPOW | | 1791 | 1245 | 1121 | 1103 | 1099 | 1097 | 1095 | 1076 |
| ** 34 | | | | | | | | | | |
| 537 | ZS | | 544 | | | | | | | |
| 2034 | ZSUBTR | | 304 | | | | | | | |
| 796 | .1CEC | | 384 | | | | | | | |
| 826 | 0HP | | 824 | | | | | | | |
| 833 | 0HP1 | | 826 | | | | | | | |
| 1106 | 24HP | | 843 | | | | | | | |
| 948 | 4DIV | | | | | | | | | |
| 1420 | ?CT | | 1408 | 1406 | 1404 | | | | | |
| 924 | >EMP | | 911 | | | | | | | |
| 911 | >EMP1 | | 915 | 904 | | | | | | |

1    ERRORS DURING ASSEMBLY                          06:53        PAGE   1
0  **  NO ERRORS

-LOG
215.79 TRU
TERMINAL TIME: 1:36:42

PLEASE LOG IN: 8Y*K!3>2DF(
                   >WW/ >W:

```
-TYPE IML06
++++++++++++TRIPMASTER PROGRAM NO 1+++++++++
++++++++++++    J. STEPHAN+++++++++++++++++++
++++++++++MARCH 2,1977+++++++++++++++++++++
++++++++++NEW 16HZ CLOCK WITH ANALOG OV DELY+++++++++++
          ORG  000
+++++++++++++++++++++++++INITIALIZATION
          T  ++1
          LDI    #8
          DOA
          SF2
INITL     LBL  #0F
          LDI  #0
RPT       LBUA
RPT1      LDI  #0
          EXD  0
          T  +-2
          XBMX         !   CLEAR RAM 0
          XAX
          ADI #L
          T  ++2
          T OUT
          XAX
          XBMX
          T RPT1       !NEW EM #
OUT       LBL  #1F
          LD 0         !# OF RAMS THAT WILL BE CLEARED
          ADI #1
          T CLR
          LDI  #1
          EX 0
RELOD2    LB  L15
          TM ZERO      ! ANALOG COUNTER = 0
+++++++++++++++++++++++++THRESHOLD LOAD IN RAM 1 IN BL =D,E,F
+++++++++++++++++       DESIRED  /=NUMBER
 +                      0      7F
 +                      1      7E
 +                      2      7D
 +                      3      7C
 +                      4      7B
 +                      5      7A
 +                      6      79
 +                      7      78
 +                      8      77
 +                      9      76
          LBL  #0F
          LDI  #5        BATERY VOLTAGE
          EXD
          LDI  #2
          EXD
          LDI  #1
          EX
          TM THR
          TM AI
          LDI  #0        1-OIL PRESSURE
          EXD
          LDI  #0
          EXD
          LDI  #2
          TM BTHL
          TM THR
          TM AI
          LDI  #0        2-AIR FILTER
          EXD
          LDI    #8
          EXD
          LDI  #0
```

```
                EX
                TM THR
                TM AI
                LDI #0          3-FUEL PRESSURE
                EXD
                TL INTC
CLR             LDI #0
                XAX
                TM INC          !INCREMENT RAM #
                LD 0
                XBMX
                T RPT
•••••••••••••••••••••••INITIALIZATION CONTINUED
                ORG 400
INTC            LDI #0
                EXD
                LDI #6
                EX
                TM THR
                TM AI
                LDI #0          4-TRIP-TEMP
                EXD
                LDI #9
                EXD
                LDI #0
                EX
                TM THR
                TM AI
                LDI #0          5-CRANK CASE
                EXD
                LDI #4
                EXD
                LDI #0
                TM BTHL
                TM THR
                TM AI
                LDI #0          6-COOLANT PRESSURE
                EXD
                LDI #0
                EXD
                LDI #1
                TM BTHL
                TM THR
                TM AI
                LDI #0          7-AIR PRESSURE
                EXD
                LDI #5
                EXD
                LDI #3
                TM BTHL
                TM THR
                TM AI
                LDI #0          8-EXHAUST TEMP
                EXD             != 1/2 DESIRED THRESH
                LDI #5
                EXD
                LDI #2
                EX
                TM THR
                TM AI
                LDI #5          9-BRAKE TEMP
```

```
        EXD
        LDI #2
        EXD
        LDI #1
        EX
        TM THR
        TM AI
        LDI #0           A-COOLANT TEMP
        EXD
        LDI #9
        EXD
        LDI #1
        EX
        TM THR
        TL INT2
        CFG 030
++++++++++++++++++++++++++++++++++++++++++++
* INT2   TM AI
        LDI #0           B-TRANS TEMP
        EXD
        LDI #2
        EXD
        LDI #1
        EX
        TM THR
        TM AI
        LDI #0           C-FUEL TEMP
        EXD
        LDI #8
        EXD
        LDI #0
        EX
        TM THR
        TM AI
        LDI #0           D-MPH
        EXD
        LDI #6
        EXD
        LDI #0
        EX
        TM THR
        TM AI
        LDI #5           E-RPM
        EXD
        LDI #9
        EXD
        LDI #1
        EX
        TM THR
        LBL #FF PUT HEADER IN MEMORY
        LDI #6 SD OF PROM CODE F = 0
        EXD
        LDI #2
        EXD
        LDI #1                      D = 2
        EXD
        LDI #1 MSD OF PROM CODE C = 3
        EXD
        LDI #4 LSD OF VEHICLE # B = 4
        EXD
        LDI #5                      A = 5
        EXD
        LDI #1                      9 = 6
```

```
            EXD
            LDI  #4 MSD OF VEHICLE # 8 = 7
            EXD
            LDI  #3
            EXD
            LDI  #0                6 = 9
            EXD
            LDI  #0                5 = A
            EXD
            LDI  #0 MSD OF CONTRACT# 4 = B
            EXD
            LDI  #1 LSD OF PROGRAM # 3 = C
            EXD
            TL INT3
            ORG 4EB
++++++++++++++++++++++++++++++
INT3        LDI  #0                2 = D
            EXD
            LDI  #0                1 = E
            EXD
            LDI  #0 MSB OF PROGRAM # 0 = F
            EX
            LB  L15
            LDI  #0
            LB  L15
            LDI  #0
            EX 0
            RF1
            TL CINTL
RELOAD      LBL #0F
            TM ZROW
            TL RELOD2
++++++++++++++THIS COMPLETES INTIALIZATION
+                                      .
++
++++++++++++++++++TM POINTER CROSS REFERENCE PAGE
            ORG  0C0
L14         PTR  #14
L15         PTR  #15
L1F         PTR  #1F
L24         PTR  #24
L26         PTR  #26
L44         PTR  #44
L45         PTR  #45
L46         PTR  #46
L7F         PTR  #7F
L43         PTR  #43
L32         PTR  #32
L42         PTR  #42
L3C         PTR  #3C
L3D         PTR  #3D
L23         PTR  #23
            ORG  0D0
WAIT        PTP  0WAIT
ID01        PTP  0ID01
TSB1        PTP  0TSB1
TSB2        PTP  0TSB2
TSB4        PTP  0TSB4
TSB8        PTP  0TSB8
STB1        PTP  0STB1
STB2        PTP  0STB2
STB4        PTP  0STB4
STB8        PTP  0STB8
INC         PTP  0INC
```

```
TV=0    PTR     QTV=0
TV=1    PTR     QTV=1
TV=2    PTR     QTV=2
TV=3    PTR     QTV=3
TV=4    PTR     QTV=4
TV=5    PTR     QTV=5
TV=6    PTR     QTV=6
TV=7    PTR     QTV=7
TV=8    PTR     QTV=8
TV=9    PTR     QTV=9
TV=B    PTR     QTV=B
TV=C    PTR     QTV=C
TV=D    PTR     QTV=D
TV=E    PTR     QTV=E
TV=F    PTR     QTV=F
ZEPO    PTR     QZEPO
RAMF    PTR     QRAMF
SHFTV   PTR     QSHFTV
DESUB   PTR     QDESUB
RAMS    PTR     QRAMS
SETUP   PTR     QSETUP
DINC    PTR     QDINC
RSB1    PTR     QRSB1
RSB2    PTR     QRSB2
RSB4    PTR     QRSB4
RSB8    PTR     QRSB8
AI      PTR     QAISR
THR     PTR     QTHR
LF      PTR     QLF
SHT4    PTR     QSHT4
ZROW    PTR     QZROW
LOG     PTR     QLOG
BTH     PTR     QBTH
BTHL    PTR     QBTHL
OUT4    PTR     QOUT4
MUX     PTR     QMUX
                        48 CAN BE ASSIGNED
                        TM ROUTINES ON PORG 100,140,180
        ORG 100
QWAIT   LDI #C          ! ANY VALUE DEPENDENT ON DESIRED TIME
        ADI #1          ! USED TO INPUT I/O
        T *-1
        RTN
QID01   IOL #0A         ! (
        EXD 0           ! INPUT DATA FROM I/O #0
        IOL #09
        EXD 0
        IOL #03
        EX 0
        RTN
QTSB1   LDI #1          ! TEST BIT SUBROUTINE
QTSB2   LDI #2
QTSB4   LDI #4
QTSB8   LDI #8
        AND
        SKZ
        RTNSK           ! BIT IS PRESENT    FLAG IS SET
        RTN             ! FLAG IS NOT SET
QSTB1   LDI #1          ! ****SET BIT OR FLAG SUB ***
QSTB2   LDI #2
QSTB4   LDI #4
QSTB8   LDI #8
QLF     LDI #F
        OR
        EX 0
        RTN
QINC    LD 0            ! ****INCREMENT BINARY
        ADI #1          !
        T *+3
        EXD 0
        T QINC
        EX 0
        RTN
```

```
QTV=0    LDI #0       ! ****TEST VALUE OF REGISTER SUB***
QTV=1    LDI #1
QTV=2    LDI #2
QTV=3    LDI #3
QTV=4    LDI #4
QTV=5    LDI #5
QTV=6    LDI #6
QTV=7    LDI #7
QTV=8    LDI #8
QTV=9    LDI #9
QTV=A    LDI #A
QTV=B    LDI #B
QTV=C    LDI #C
QTV=D    LDI #D
QTV=E    LDI #E
QTV=F    LDI #F
         EOR
         SKZ
         RTNSK        !    IF VALUE NOT EQUAL OK
         RTN          !    VALUE IN MEMORY = DESIRED VALUE
QZROW    LDI #0
         EXD 0
         T ←2
         RTN
*
*
*
QBTH     TL QBTHQ
*****************TM CONTINUED*****************
         ORG 140
QZERO    LDI #0       !USED TO CLEAR A WORD
         EX 0         !
         RTN          !    !    !    !    !    !  **
QRAMF    LD 0         !    **
         SAG          !    !    LOAD INFO FROM DISTANT RAM TO RAM0
         EXD 0
         T ←3
         RTN
QRSB1    LDI #E       !    **
QRSB2    LDI #D       !         ! RESET BIT OR FLAG SUB
QRSB4    LDI #B
QRSB8    LDI #7
         AND
         EX 0
         RTN          !    !    !    !    !    !  **
QDINC    RC           !    **
         LDI #7       !         ! INCREMENT DECIMAL COUNTERS SUB***
         ADCSK
         DC
         EXD 0
         SKC
         RTN
         T QDINC
QSHT4    XAX          !    **
         LD 0
         DECB
LOOP     XAX
         XABL
         XAX
         EXD 0
         XAX
         XABL
         XAX
         LD 0
         DECB
         T LOOP
         RTN
```

```
ODESUB  LD 4
        COMP
        ADCSK    !SUB WILL SUBTRACT 04D-F
        DC       !FROM 00D-F
******           !RESULT IN 04D-F
        EXD 4
        SKBI #0
        T ODESUB
        SKC
        RTNSK            !UNDER THRESH
        RTN              !OVER THRESHOLD
ORAMS   SAG
        LD 0
        EXD 0
        T *-3
        RTN
************TM CONTINUED
QBTHL   EXD 0            !PUT 900 FOR UNDER THRESH
        DECB
        DECB
        LDI #9           COMPARE
        EX 0
        RTN
QTHR    TM SETUP
        TM RAMS
        RTN
        ORG 180
QSETUP  LBL #15    !**
        LD 0       !     !    ANALONG COUNTER =BM=WHERE
        XAX        !     !    DATA IS STORED
        LBL #1F    ! BU STORED IN EVENT COUNTER
        LD 0
        LBUA       ! CHANGE BU
        LBMX       ! NOW SITING AT DESIRED BM =1 FROM INTIALIZATION
        RTN
QAI&R   LBL #15
        TM INC
        LBL #0F
        LDI #0           !CLEAR ROW 0,0 FOR NEXT LOAD
        EXD #0
        T *-2
        RTN
QSHFTV  XAX
        EXD 0
        XAX
        XABL
        XAX
        EXD 0
        T *-4
        XAX
        XABL
        XAX
        EX 0
        RTN
QOUT4   TM MUX
        TM TV=0
        T *+2          !
        T QOUT4
NWS     LDI #2         !OUT PUT NEXT WORD
        IOL #1D
        LDI #0
        IOL #1D        PULSE
OT4     LBL #40
        IOL #13        !INPUT SIGNALS
        EX
        TM TSB4        !CHECK START IN
        T CLGT
        TM TSB3        !CHECK READY
```

```
              T SETF
              SKF1
              T MX
              RF1
              RTN
SETF          SF1
MX            TM MUX
              TM TV=0
              T OT4
              T MX
CLGT          TL CINTL
              OPS 1C0
*****THIS ROUTINE WILL MOVE ROWS A,B,C, -0 TO 2,3,4,-X
QLOG          LBL #15
              LD 0
              INCB
              EXD 0
              LDI #5
              EX 0
              LBL #AF
              TM RAMF
              TM SETUP
              TM RAMS
              LBL #15
              LDI #8
              EX 0
              LBL #BF
              TM RAMF
              TM SETUP
              TM RAMS
              LBL #15
              LDI #B
              EX 0
              LBL #CF
              TM RAMF
              TM SETUP
              TM RAMS
              LBL #16
              EXD 0
              EX 0
              RTN
QMUX          LDI #1
              LXA
              LDI #0
              IOL #07      ! BLANK DISPLAY
              T *+1
              LBL #25      ! GET DISPLAY POINTER
              LD 0
OPD           XABL
              DECB
              T *+2
              T LD3
              LD 0
              IOL #17
      *       !            !           OUTPUT DATA
              LBMX         !     POINT TO DIGIT SELECT REGISTER
              LD 0
              IOL #07
              LABL
              LBL #25      ! PUT BL BACK IN DISPLAY POINTER
              EX 0
              RTN          !FINISHED WITH MUX
LD3           LDI #4
              T OPD
```

```
*****************MAIN LINE OF PROGRAM  PG 040,080
        ORG  040
*2.0------------------
DIGTL   LBL #35         ! INPUT DIGITAL
        LDI #C
        IOL #1D         ! SET DIM HIGH
        TM WAIT
        TM ID01         ! INPUT A,B,C, OF I/O #0 WITH DIM HIGH
        LDI #4
        IOL #1D         ! THIS IS EXTERNAL KEY BOARD ENTRY
        TM WAIT
        DECB
LIRT1   TM ID01         !INPUT A,B,C, I/O #0 WITH DIM LOW
        LB  L32         ! **
        LD  0           !       ! RESET GROUPS A & B OF DIGITAL
        IOL #0E
        DECB
        LD  0
        IOL #0D
        TL  RT          ! MOVE KEY INPUT TO PROPER LOCATION
*3.0------------------
RT1     LD  1
        EX  0
        LB  L32         ! CHECK TIME PULSE
        TM  TSB1
        T   *+3         ! NO TIME PULSE
        TL  .1SEC       !GO SERVICE CLOCK & TIMERS
KIGN    TL  KLINK                   !EXIT  FOR DATA LINK CHECK
KIGN1   TM  TSB1
        T   IGF         ! GOCHECK LEVELS & RETURN TO DIGTL
        LB  L44         ! SET FLAG FOR IGN ON
        TM  STB1
        LBL #31         ! CHECK FOOT BRAKE
        TM  TSB1
        T   *+3         ! NO FOOT BRAKE
        TL  FTBK
VSPD    LB  L32         ! CHECK VEHICLE SPEED
        TM  TSB4
        T   *+3         ! NO SPEED PULSE
        TL  VESPD
        TL  TEST        !CHECK FOR >2MPH
*9.0------------------
KFUEL   LB  L32         ! CHECK FUEL .1 GAL INPUT
        TM  TSB2        ! A-2
        T   *+3
        TL  FUEL
        TL  ESPD
IGF     TL  IGOF
LIRT    LDI #0
        IOL #07
        T   LIRT1
********************MAIN LINE CONTINUED
        ORG  740
ESPD    LB  L32         ! CHECK ENGINE SPEED
        TM  TSB3
        T   *+3         ! NO ENGINE SPEED PULSE
        TL  ENSPD
FETCH   SKF1            ! CHECK ENTRY OF NEW ANALOG CHANNEL SELECT
        T   ADV
        RF1
```

```
            LB  L15         ! CHECK IF MPH IS NEXT TO INTEROGATE
            TM  TV=D
            T   STUPM       ! MPH WILL BE INTEROGATED
            TM  TV=E        ! CHECK IF RPM WILL BE NEXT
            T   STUPR       ! RPM IS NEXT
            LB  L15         !          SINCE IT WASN'T MPH OR RPM
            LD  0           !   OUTPUT NEW ANALOG CHANNEL
            IOL #1E
ADV         LBL #3B         ! ADVANCE ANALOG COUNTER
            TM  INC
            LBL #39         ! TEST IF COUNTER =4096
            TM  TSB2        ! APPROX = 300MS
            T   *+3
            TL  INALG         COUNTER=4096 GO TO INPUT ANALOG DATA
            TL  OV          ! ANALOG VALUE IS NOT CONVERTED YET
***SET UP ROUTINE FOR MPH &RPM
***MOVES MPH OR RPM TO ANALOG RESITER: #43-40
STUPM       LBL #53
            LD  1           !ROW 5 TO 4
            EXD 1
            T   *-2
SP          TM  SETUP
            TM  RAMP
            TL  CING        !TO ANALOG INTEROGAT
*                           PAGE 300
STUPR       LBL #63         RPM LABLE
            LD  2
            EXD 2
            T   *-2
            T   SP
RT          LDI #0          !CLEAR RESET F/F
            IOL #0E
            LDI #8
            IOL #0D
            LBL #34
            TL  RT1
*********INPUT HEX KEY BOARD &DATA MOVE TO DISP
*** COMPLETION OF PAGE 740 IS RX IN ANALOG ROUTINE
            ORG 200
UDISP       LB  L14         ! THIS ROUTINE IS REQUESTED FROM MAIN LINE
            TM  TV=5        ! EVERY 1 SEC TO REFRESH DIPLAY DATA
            T   NDR1        ! GET NEW DISPLAY REFERENCE #
            LBL #35         ! CHECK IF NEW DIGIT HAS BEEN ENTERED
            TM  TSB2
            T   SKY
IKC         TL  RDE         !GO RESET DIGIT HEX ENTRY
RDE1        TM  TV=1        ! TEST IF KEY COUNTER = 1
            T   CRDIS       ! = 1 GO CLEAR DISPLAY
IKC1        LB  L24
            LD  0
            EXD 0           !   LOAD KEY INPUT TO DISPLAY (SHIFT LEFT)
            T   *-1
            T   *+1         !INSERT TEST FOR 2 DIGIT CODE HERE
            T   *+1
            LB  L14         ! TEST IF KEY COUNTER =4
            TM  TV=4
            T   *+2
            T   NOEY
            TM  INC
NOEY        TL  RSDS        ! GO CHECK FOR 1 SEC & GO TO DISPLAY
CRDIS       LB  L23         ! CLEAR DISPLAY ROUTINE************
            LDI #0
            EXD 0
            T   *-2
            T   IKC1
NDR1        LB  L14         ! CLEAR KEY COUNTER
```

```
            TM ZERO
            TL CKCT         !GO CHECK CLOCK CFT
CNT         LB  L23         ! MOVE KEY INPUT NOW IN DISPLAY
            LDI #F          ! REGISTERS INTO DISPLAY REFERENCE # POSITION
            TM CHFTV
            T  ++1
            T  ++1
REFF        TM LDS
            TML RFLD
            TL UWZE
RFLD        LBL #2D         !READY FOR BMS USED FOR DISPLAY UPDATE
            LD 0
            XAX
            DECB            !READY FOR BUS
            LD 0
            LBL #0F
            LBUA
            XBMX
            TL CUDISP       GO TO PAGE 240 TO CONTINUE
SKY         TL SKY1         !SEE IF IN HEX IN MODE
****************************************************
            ORG 240
CUDISP      TM RAMF         ! MOVE DATA FROM DISTANT RAM TO RAM 0
            LBL #2E
            LD 0
            COMP
            ADI #4
            T  ++2
            T  DOWN         ! IFNFO IS IN PROPER LOCATION
            XAX
            LBL #0F         ! PUT # OF LEFT SHIFTS IN
            EXD 0           ! BASED ON BL
            T  +-1
            XAX
            ADI #1
            T  +-7
DOWN        LBL #03         ! VALUE IS NOW LOADED DOWN TO DISPLAY
            LD 2
            EXD 2
            T  +-2
            RTN
UWZE        LBL #2F         ! ZERO UNWANTED DIGITS
            TM TV=4         !4DIGITS IN FIELD
            T  RSDC
            TM TV=2         !2 DIGITS IN FIELD TO BE DISPLAYED
            T  L1
            LDI #0          !3 DIGITS WILL BE DISPLAYED
UW          XABL
            LDI #0
            EXD 0
            T  +-2
RSDC        TML RSD
            LD 3            ! **LEADING ZERO SUPPRESSION LBL 20
ZS          TM TV=0
            T  ++2
            T  DIP          ! MSD NONE ZERO GO DISP
            LD 3
            EX 3
            INCB
            SKBI 3
            T  ZS           ! RETURN TO ZERO SUPPRESSION
DIP         T  DISP
SKY1        LB  L14         !ARE YOU IN HEX INPUT MODE?
            TM TV=0
            T  ++2
            T  DIP
            TL REFF
L1          LDI #1
```

```
            T  UW             !FOR UNWANTED ZEROS
RDE         LB  L14           !RESET HEX ENTRY
            LDI #C
            IDL #0D
            TM  INC
            TL  RDE1
**DATA IS IN THE DISPLAY READY FOR MUX
DISP        TM  MUX
            TL  DSHOT
            ORG 775
RX          TM  TV=5
            T   CK22
            TM  TV=6
            T   SBP
            TM  TV=7
            T   SBP
CK22        TL  CK
SBP         TL  SBTHP
            ORG 280
RSD         LBL #13
            LDI #1
            EXD
            LDI #2
            EXD
            LDI #4
            EXD
            LDI #3
            EX
            RTN
****INPUT ANALOG VALUE AND INTEROGATE ROUTINE
*     :       LOCATED IN PAG 200,300, 340
****
INALG       LBL #3B          ! INPUT ANALOG VALUE ROUTINE********
            LDI #0
            EXD 0            !  ZERO ANALOG TIMER
            SKBI #8
            T   *-3
            LDI #0           ! ENABLE AIM = LOW
            IOL #1D
            TM  WAIT
            LBL #0F
            TM  ZERO
            LBL #38           CHECK FOR OV FLAG
            TM  TSB1
            T   ADVIX
            TM  ZERO         !OV IS PRESENT
            TL  BAD
ADVIX       TL  ADV1
CKST        LBL #35          !CHECK FOR CLOCK SET BIT
*                             WITHIN DIM =1
            TM  TSB1
            T   CNT1         !NOT THERE
            LB  L23          !RESET CLOCK TO WHAT EVER
            TM  RAMF
            LBL #03          !IS IN DISPLAY WITH NEXT ENTRY
            TM  RAMS
            TL  CINTL
CNT1        TL  CNT
OV          TM  TSB1         !CHECK ANALOG TIME=250MS
            T   CK11
            DECB
            IOL #13           BRING IN OV DIGIT
            EX  0
            TM  TSB1         !TEST OVERFLOW
            T   CK11         !OVER FLOW NOT THERE
            T   INALG
CK11        TL  CK1
            ORG 200
```

```
ADV1    LDI #8
        IOL #0D
        TM WAIT
        LDI #0
        IOL #0D
        LBL #0E
        IOL #19         TOGGLE ACC
        EXD
        IOL #1A         DATA
        EX
        IOL #19
        INCB
        EOR
        SKZ
        T ADV1
        TM TSB1         !CHECK FOR 1/2 DIGIT
        T BD
        TM RSB1
        DECB
        LD 0
        LXA             !DATA IN X
        INCB
        LD 0
        XABL            !AT BL OFM DS
        XAX             !0E IN X, DATA IN A
        EX 0            !DATA IN MEMORY
        XAX             !0E IN A
        XABL            !AT 0E
        INCB            !AT 0F
        OR
        EX 0
        TM TV=E
        T FLANG
        T ADV1
FLANG   LBL #03
        LD 0
        LBL #41
        EX
        LBL #04
        LD 0
        LB L42
        EX 4
        LD 4
        INCB
        EX 0
        LB L44
        TM RSB3
        TL ADV3
BD      TL BAD
****ANALOG INPUT ROUTINE CONTINUED
        ORG 300
ADV3    LDI #8          ! ENABLE FREE RUN OF ACC
        IOL #0D
        LDI #4          ! DISABLE ANALOG BOARD  AIM = HIGH
        IOL #1D
STUP    TM SETUP
        TM RAMP
        LB L44          ! CHECK IF ANALOG VALUE IS BAD A-OR/ 1/2 DIG-1
        TM TSB3
        T CING
        LBL #03         ! PLACE  AN #A IN THE LSD OF ANALOG VALUE
        LDI #A
        EX 0
        T STORE
```

```
*14.0-------------------
CING    TL CING1
CING2   LB L43
        LDI #F          ! MOVE PRESENT ANALOG VALUE IN
        TM SHT4         !       -THRESHOLD COMPARE
        LB L43
        LDI #C          !       ! -PEAK COMPARE
        TM SHT4
        SC
        LBL #0F
        TM DECUB
        T OVTH          ! PARAMETER WAS   OVER THRESHOLD
        TL OVTH2
FIST    LBL #00         ! CHECK F 1ST PASS FLAG IS SET ?
        TM TSB1
        T LPVO          !EVENT NOT STORED
        TM ZERO         ! RESET FLAG
        LBL #09
        TM DINC         ! --CAREFULL IF EXCEED 99  NO STOP IN DINC
*20.0-------------------
LPVO    LB L43
        LD 4
        EXD 4
********       !        INTEROGATE ROUTINE       ! **********
        SKBI #0
        T +-3
STORE   TM SETUP
        TM RAMS         ! PUT INFO BACK IN DISTANT RAM
        LBL #2E           RESET BTHP
        TM RSB1
RAP     LB L15          ! INCREMENT ANALOG COUNTER
        LD 0
        ADI #1
        EX 0
        TM TV=F         ! IF ANALOG CHANNEL SEQUENCE IS FINISHED
        T R01H1         ! RESET .01 HR
        TL RA           !   CONTINUE PAGE  340
R01H1   TL R01H         !
OVTH    TL OVTH1
        ORG 340
BAD     LB L44          ! ANALOG DATA OVER FLOWED>1
        TM STB3         ! SET BAD FLAG LOAD (F)
        LB L42
        TL ADV3         ! LOCATED PAGE 200
RAP1    TL RAP
RA      TM TV=1
        T SETHP
        TM TV=5         ! SKIP INTEROGATION ROUTINE
        T RAP1          !       ! FOR CHANNELS 2,3,4,5
        TM TV=9
        T RAP1
        TM TV=B
        T RAP1
        TL RX
CK      SF1
        LB L14            UPDATE DISPLAY EVERY
        TM TV=0         !300MS IF IN
        T CK1           !HEX ENTRY MODE
        T ISP1
CK1     LBL #44
        TM TSB2         ! CHECK FOR F IN DISP FOR 1 SEC UPDATE
        T ++4           !NOT THERE
ISP     TM RSB2
        TL UDISP        !=1 SEC TIME TO UPDATE DISPLAY
        TL DISP         ! NOT EQUAL TO 1 SEC
SETHP   LBL #3E
        TM STB1
```

```
           T CK
ISP1    LB L44
        T ISP
R01H    TM ZERO
**                          ! RESET .01HR DURATION TIMERS HAVE BEEN INC
        LBL #26
        TM TSB4
        T DONE
        TM RSB4
        LB L45
        TM STB4
        T CK
DONE    LB L45
        TM RSB4
        T CK
***     !           PARAMETER IS OVER THRESHOLD        !    ****
OVTHR   LBL #00
        TM TSB1          ! CHECK IF 1ST FLAG IS SET
        T ST&IN          ! GO SET 1ST FLAG & INC DURATION
        LB L45           ! CHECK FOR .01HR
        TM TSB4
        T PEAK           ! .01HR IS NOT THERE
PNUB    LBL #07
        TM DINC
PEAK    TL NSUB          !PAGE 3E0
ST&IN   TL STIN
        ORG 3B0
STIN    LB L45
        TM TSB4
        T *+3
        TL DELY
        TL LPVO
***************** TIMER .1 SEC SUBROUTINE
***     !              ROUTINE LOCATED PAGE  3B0 &0C0
*******    ! NOW CONTAINING      REQUIRING 24HR TIMER &DISPLAY CLK**
.1SEC   LBL #1B
        TM INC           !CHG FOR NEW 16HZ CLOCK OSC.
        LBL #1B
        TM TV=0
        T XSEC
***     !         !  1SEC HAS PSSED CHECK FOR 6 SEC, .01HR & 1 MIN
T2      LBL #2B          ! MILES PER HOUR TIMER
        TM DINC
        LBL #2A
        TM TV=2          !CHG FOR NEW 16HZ CLOCK OSC.
        T TMPH           ! GO CHECK FOR 3.6 SEC FOR MPH
CLK     TL KIGN
TMPH    LBL #2B
        TM TV=8          !CHG FOR NEW 16HZ CLOCK OSC.
        T MPH1           !CHG FOR NEW 16HZ CLOCK OSC.
        T CLK            !CHG FOR NEW 16HZ CLOCK OSC.
MPH1    TM ZERO
        DECB
        TM ZERO
        LBL #7F          SET FMPH
        TM LF
        T CLK
XSEC    LB L44
        TM STB2          !SET 1 SEC FLAG DISP
        T *+1
        T *+1
        LBL #1A
        TM TV=6          !CHECK FOR 6 SEC
        T *+2            !-6SEC
        T T2             !NOT EQUAL
SEC6    TM ZERO
        LB L45
        TM STB3          ! SET 6 SEC FLAG FOR RPM
        LBL #6E          SET 6 SEC LINK FLAG
        TM STB2
```

```
            LBL #19
            TM INC          ! INCREMENT MINUTES
            TM TY=6         !CHECK FOR 1HR
            T OHR           !-360 COUNTS
            TL MIN
OHR         TL OHR1
            ORG 300         !CHANGED TIMER CONT***
MIN         LBL #29
            TM DINC         !/10 COUNTER
            TM TY=1
            T MNT1          !
TST         TL T2
OHR1        LBL #19         ! CLEAR 360 COUNTS
            TM ZERO
            LBL #26         SET .01HR FLAG
            TM LF           !LOAD F
            T MIN           ! *PAGE   380
MNT1        LB L45
            TM STB2
*******     !               SET MINUTES BIT
            LBL #23
            TM ZERO
            TL 24HR
****************SUBTRACT ROUTINE FOR ANALOG SERVICING
NSUB        LBL #0C
            SC
            LD 4            !SUBTRACTS 04A-C
            COMP            !FROM 00A-C
            ADCSK
            DC              !LEAVES LARGER VALUE IN
            DECB            !00A-C
            LD 4
            SKBI #9
            T *-7
            SKC
            T NSB1
            TM BTH
            T *+2           !CHECK FBTHP NOT =
            T NSB
NSBT        LBL #4C         INSERT NEW P/U THRESH
            LD 4
            EXD 4
            SKBI #9
            T *-3
NSB         TL LPVO
NSB1        TM BTH
            T NSB
            T NSBT
OVTH2       TM BTH
            T *+3
            TL OVTHR
            TL FIST
OVTH1       TM BTH
            T *-5
            T *-4
QBTHO       LBL #8E
            TM TSB1
            RTN
            RTNSK
********************************************************
****
            ORG 440
*   VEHICLE SPEED SUBROUTINE
VESPD       TL VESP2
VESP1       TM DINC
            LBL #78         !INC CMPG
            TM DINC
            TL MILAG                    !PAGE 400
NH          LBL #7F         !CHECK 3.6 MPH CALC
```

```
            TM TSB1
            T TEST           !NOT THERE
            TM ZERO
            LBL =57
            LDI =3           !MOVE CSPD TO RSPD
            TM SHT4
            LBL =57
            LDI =0
            EXD 0
            SKBI =3
            T *-3
            LBL =7E
            TM RSB3          !RESET FIDLE
TEST        LBL =7F
            TM TSB2
            T >2MP1
            LBL =7E
            TM TSB3
            T POS
            LB  L46
            TM STB3          !SET IDLE FLAG
            LBL =30          !CHECK PTO-HAND BRAKE
            TM TSB3
            T IDLE           !NOT ON
            TL PTO           !IS ON
>2MP1       TL >2MP
POS         TM STB3          !SET 7E-3
            LBL =7F
            TM RSB2          !RESET FMPH
            T >2MP1
IDLE        LB  L26          !CHECK FTS .01
            TM TSB3
            T KILL
            TM RSB3          !RESET FTS
            LBL =AB
            TM DINC          !INC IDLE TIME
KILL        TL KFULL
            ORG 580
>2MP        LB  L46          RESET FIDL
            TM RSB3
            LB  L26          CHECK FOR .01 HR
            TM TSB3
            T FULL           !NOT THERE
            TM RSB3          !IS THERE RESET FTS
            LBL =A7          !DECIMAL INC ROAD TIME
            TM DINC
            LBL =30          CHECK HAND BRAKE
            TM TSB3
            T FLHB           !NO HAND BRAKE
            LB  L46          !SET FHBK FLAG
            TM STB4
            T KFULL
FLHB        LB  L46          !CHECK,FHBK
            TM TSB4
            T RBL
            LBL =CC          IS THERE
            TM DINC          !DECIMAL INC COUNT H BK
            LB  L46
RBL         TM RSB4          !RESET FLAG FHBK
            TL KFULL
PTO         LB  L26
            TM TSB3          !RESET FTS
            T FULL
            TM RSB3
            LBL =AF
            TM DINC          !DEC INC PTO TIME
```

```
              LB   L46
              TM   STB2           !SET PTO FLAG
FULL          TL   KFUEL                        !TO MAINLINE
KFULL         LB   L46
              TM   RSB2           !RESET PTO FLAG
              T    FULL
COLM          LBL       #7C
              TM   DINC
              SKBI      #A
              T         *+5
              TM   ZEPO
              LB   L46
              TL   TSB
              TM   ZEPO
              TL   ESPD
DELY          LBL  #00            USED FOR 36 SEC OVER THRESH
              TM   TSB2
              T    DELY1
              TM   STB1
              TL   PNUB
DELY1         TM   STB2
              TL   LPVO
              ORG  430
*     ENGINE SPEED SUBROUTINE
ENSPD         LBL       #67
ENSP2         TM   DINC           !INC CRPM
              LB   L45
              TM   TSB3           !CHECK FOR 6 SEC RPM
              T    CLMP
              TM   RSB3
              LBL  #67            YES 6 SEC IS OVER
              LDI  #3             MOVE CRPM TO RRPM
              TM   SHT4
              LBL  #67            !CLEAR CRPM
              LDI  #0
              EXD  0
              SKBI #3
              T    *-3
CLMP          LB   L46            CHECK IDLE FLAG
              TM   TSB3
              T    KLG            !NOT THERE
              LBL  #57
              LDI  #0
              EXD  0              !CLEAR MPH REGISTER
              T    *-2
KLG           TL   FETCH
VESP2         LBL  #7D
              TM   DINC
              LBL  #7D
              TM   TV=3
              T    CMPH
              T    *+2            !T FUK
              T    CMPH           !INCB
              TM   TV=6
              T    VERO
              T    FUK            !T FUK
VERO          TM   ZERO
              LBL  #57
              TL   VESP1
FUK           TL   KFUEL
CMPH          LBL  #57
              TM   DINC
              TL   MH
*     FUEL ROUTINE
              ORG  4C0
FUEL          T         MMPG
TSB           TM   TSB3
              T    RDF            !VEHICLE MUST BE MOVING
              T    TIF            !IN PTO MODE
OUTA          TL        ESPD
MMPG          LBL       #78,      MOVE CMPG TO FMPG
              LDI  #3
              TM   SHT4
              LBL  #79            CLEAR CMPH
              LDI  #0
```

```
            EXD 0
            SKBI #3
            T    *-3
            TL   COLM
RIF    LBL  #B9          INC ROAD FUEL
            TM DINC
            T    OUTA
TIF    LBL  #BC          INC IDLE FUEL
            TM DINC
            T    OUTA
*MILAGE ROUTINE FOR VEHICLE SPEED
MILAG  LBL  #5F
            TM DINC
            LBL  #5D          .1 MILE
            TM TV=1
            T    *+3
MH2         TL MH
            TM ZERO
            LBL  #A3
            TM DINC
            T MH2
****IGNITION OFF SUBROUTINE-SERVICES LEVELS
            ORG 500
IGOF   LB   L44
            TM TSB1       !CHECK FOR FIGN
            T RIG         !NOT THERE
            LBL  #B4      DECIMAL INC # OF IG
            TM DINC
RIG    LB   L44
            TM RSB1       !RESET FIGN
            LBL  #30      CHECK OIL FLAG
            TM TSB2
            T COO         !NOT THERE
            LBL  #B0      SET OIL FLAG
            TM STB3
OL     LBL  #30      CHECK COOLANT
            TM TSB4
            T TDF         !NOT THERE
            LBL  #B0
            TM STB4       !SET COOLANT FLAG
CDF    LDI  #0       CLEAR DISPLAY
            IOL  #07
            LDI  #F       !CLEAR INDICATORS
            IOL  #2E
            LDI  #F
            IOL  #2D
            LBL  #8E      RESET FVAL & FBTHP
            TM ZERO
            LBL  #8A      CLEAR 600T & DS1HP
            TM ZROW
            LB   L15      CLEAR ANALOG COUNTER
            TM ZERO
            TL DIGTL
COO    LBL  #B0      RESET OIL FLAG
            TM RSB3
            T OL
TDF    LBL  #B0      RESET COOLANT FLAG
            TM RSB4
            T CDF
FTBK   LBL  #CF      DECREMENT FT BRK
            TM DINC
            TL ESPD
RSF    LBL       #BF
            LDI       #0
            EXD
            SKBI      #0
            T         *-2
            TL        CLRC
```

```
***LOG MILAGE, ROAD TIME, IDLE TIME PTOTIME
***ROAD FUEL, IDLE FUEL,PTO FUEL
*** RESET 24.00HR CLK.,CHANGE BU FOR DATE &RETURN
        ORG 540
*****PART OF DAT LOG PROGRAM BELOW
CLR3    ADI #1
        T ++2
        T ROWA
        TL CLR4
ROWA    LBL #AF
        TM ZROW             !CLEAR ROW A
        TL        RCF
        TM ZROW             !CLEAR ROW B RAM 0
CLRC    LBL       #CF
        TM ZROW             !CLEAR ROW C RAM 0
        LBL #30             !CLEAR D>20,D>40
        TM ZERO
        TL RELOAD
*37.0--------------------
24HR    LBL #C3             !INCREMENT CLOCK REGISTER
        TM DINC
        LBL #C2
        TM TY=6
        T ++3
TT2     TL T2
        TM ZERO             !CLEAR TENTHS MINUTES
        DECB
        TM DINC             !INCREMENT HRS
        LBL #C0
        TM TSB2             !IS HRS -2
        T TT2
        INCB                !IS UNITS HRS =4
        TM TSB4
        T TT2
        TM ZROW             !CLEAR 24.
        LBL #EF             !INC DAY BCD COUNTS
        TM DINC
        LBL #D7             INC # OF DAY SINCE LAST POWER DOWN
        TM DINC
        LBL #9F             !INCREMENT DAY COUNT
        LD 0
        ADI #1              !ADD1 TO PRESENT DAY COUNT
        T ++2
        T OVER
        EX 0
        TM TY=1
        T DAY1              !1ST DAY
        T ALOG
OVER    DECB                !INCREMENT
        TM INC              !DAY OVER FLOW COUNTER
        TL CLR1
DAY1    LDI #9              !START FIRST DAY STORAGE IN RAM #9
        EX 0
ALOG    TL DALOG
        ORG 5C0
*38.0--------------------
DALOG   TM LOG
        LB L15              !CLEAR ANALOG COUNTER
        TM ZERO
MOVE    TM SETUP
        TM RAMF
        LB L15
        LD 0
        XAK                 !BM# IN X
        LBL #9F
        LD 0
        LBUA                !BU # FROOM DAY COOUNT
        LBMX
        TM RAMI             !STORE A ROW
        LB L15
        LD 0
        ADI #1
        T REPT
        TM ZERO             !CLEAR ANALOG COUNT
```

```
*39.0--------------------
CLP1    LDI #0              CLEAR RAM #1 EXCEPT
CLR4    XAX                 !FOR THRESHOLD STORED AT INITIALIZATION
        LBL #0C             !BL: =C
        LDI #1
        LBUA                !BU :=1
        LBMX                !BM =0 THRU F
        TM ZROW
        XAX
        TL CLR3
REPT    EX 0
        T MOVE
*41.0--------------------
KLINK   LBL #40
        IOL #13
        EX 0
        TM TSB4             !IS DATA LINK 'START PULSE PRESENT
        T *+2
        T LINK
        TL K15
LINK    LBL #6E
        TM TSB1
        T SSS
        TM TSB2
        T K1K
        TL NINK
K1K     LB L32
        TL LIRT
SSS     TM ZERO
        TM STB1
        LDI #2
        IOL #1D
        LBL #1A
        TM ZERO
        T K1K
***DATA SNAP SHOT SUBROUTINE**
        ORG 600             ********************
DSHOT   LBL #63             !MOVE RPM FOR 600 COMPARE
        LD 2
        EXD 2
        T *-2
        LBL #43
        LDI #F
        TM SHT4
        LBL #0F
        LDI #0
        EXD 0
        LDI #6              !LOAD 600 FOR RPM COMPARE
        EXD 0
        LDI #0
        EX 0
        SC
        LBL #0F
        TM DESUB
        T TSHOT             !YES >600 RPM
        LBL #8A             !CLEAR 600 TIMER
        TM ZERO
NVALI   LBL #8E
        TM RSB2             !RESET FVAL
ML      TL DIGTL            !BACK TO MAIN LINE
TSHOT   LBL #8A             !TEST 600 RPM TIMER
        TM TV=3
        T VALID
        LBL #45
        TM TSB2             !!CHECK FOR 1 MINUTE
        T NVALI
        TM RSB2             !RESET FMIN
        LBL #8A
        LD 0
        ADI #1              !ADD 1MINUTE TO 16 MINUTE TIMER
```

```
               EX 0
               T NVALI
VALID          LBL #8E           !ENGINE WWAS OVER 600RPM
               TM STB2           !FOR 16 MIN JET EVAL
               LBL #43
               LDI #F
               TM SHT4           !SHIFT DATA FOR 1200RPM CHECK
               LBL #F
               LDI #0
               EXD 0
               LDI #2
               EXD 0
               LDI #1
               EX 0
               SC
               TL CONS
               ORG 640   *************************
CONS1          TM DESUB                !TESTING FOR 1200 RPM
               T *+3             !YES GREATER THAN 1200 RPM
MLN            TL DIGTL                !BACK TO MAIN LINE
               LBL #53           GET READY FOR MPH CHECK
               LD 1
               EXD 1
               T *-2
               LBL #43
               LDI #F
               TM SHT4
               LBL #8B
               TM TSB1           !CHECK FOR DS1
               T 2MPX
               TM TSB2           !CHECK FOR DS2
               T 40MP
               TM TSB4           !CHECK FOR DS3
               T 2MPX
40MP           LBL #0F
               LDI #0            !LOAD 40 FOR MPH COMPARE
               EXD 0
               LDI #4
               EXD 0
               LDI #0
               EX 0
               SC
               LBL #0F
               TM DECUB
               T *+2             !YES
               T CSR             !NOT GREATER THAN 40MPH
               LBL #26           !CHECK FOR FDST
               TM TSB2
               T MLN             !NO
               TM RSB2           !RESET FDST
               LBL #89
               TM DINC
               SKBI #6           !INC 1 HR TIMER
               T MLN             !NOOT =1 HR
               LBL #8B           CHECK FOR DS2
               TM TSB2
               T *+3
               TL C40
               TM STB2           !SET DS2
               INCB
               TM STB3           !SET DS>40
               INCB
               LDI #B            != DS LOAD
               EX 0
               TL DSLOG
CSR            TL CC1HR
2MPX           TL 20MP
               ORG 680   *************************
```

```
C40     INCB
        TM TSB3         !CHECK DS>40
        T ++2           !YES
        T MLZN
        DECB
        TM TSB8         !CHECK FOR DS4
        T ++2
        T MLZN          !YES
        TM STB8         !SET DS4
        LBL #8D
        LDI #3          != DS LOAD
DSLG    TL DSLOG
20MP    LBL #0F         !SET UP FOR >20MPH CHECK
        LDI #0
        EXD 0
        LDI #2
        EXD 0
        LDI #0
        EX 0
        SC
        LBL #0F
        TM DESUB                !CHECK >20MPH
        T CFDST
CS1HR   LBL #89         !CLEAR 1 HR TIMER
        TM ZERO
        DECB
        TM ZERO
        DECB
        TM ZERO
MLZN    TL DIGTL                !RETURN TO MAIN LINE
CFDST   LBL #26
        TM TSB2
        T MLZN
        TM RSB2         !RESET FDST
        LBL #89
        TM DINC         !INC 1 HR TIMER
        SKBI #6
        T MLZN          !1HR IS NOT UP
        LBL #8B         !CHECK FOR DS1
        TM TSB1
        T SDS1                  !NOT THERE
        INCB
        TM TSB4         !CHECK FOR DS>20
        T ++2
        T MLZN
        DECB
        TM TSB4         !CHECK FOR DS3
        T ++2
        T MLZN
        TL SDS3
SDS1    TL SD1
        ORG 6C0         ◆◆◆◆◆◆◆◆◆◆◆◆◆◆◆◆◆◆◆◆◆◆◆◆
SD1     TM STB1         !SET DS1
        INCB
        TM STB4         !SET DS>20
        INCB
        LDI #F          != DS LOAD
        EX 0
        T DSLOG
SDS3    TM STB4         !SET DS3
        LBL #8D
        LDI #7          != DS LOAD
        EX 0
DSLOG   LBL #9F         STORE DATE OF DATA SNAP SHOT
        LD 0
        LBL #B1
        EX 0
        TM LOG          !MOVE TRIP DATA
        LBL #73         !MOVE MFG TO ROW 0,RAM 0
        TM RAMF
        LBL #15
        TM LF           !=EM
        TM SETUP
        TM RAMC         !MOVE MFG TO RAM 1 ,ROW F
```

```
              LBL  #15
              TM   ZERO
    DSLG1     TM   SETUP          !MOVE DATA FROM RAM 1 TO RAM 0
              TM   RAMF
              LBL  #3D
              TM   TV=3
              T    *+5
              LD   0
              LBL  #03           !SHIFTS DATA TO PROPER DC LOCATION
              TM   SHFTV
              LD   L15
              LD   0
              XAX                !=BM
              LBL  #3D
              LDI  #3            !DATA CHAFF SHOT DATA TO BE STORED IN RAM NO 3
              LBUA
              LBMX
              XABL
              TM   RAMS
              LB   L15
              LD   0
              ADI  #1
              T    *+3
              TL   CS1HR         !GOO CLEAR  DS1HR FINISHED
              EX   0
              T    DSLG1
    CONS      LBL  #0F           !USED ON PAGE 640
              TL   CONS1
              ORG  700
    KIG       LB   L3D
              TM   TSB3          !CHECK FOR DATA LINK EXTRACT
              T    KIG1
              LB   L26
              TM   TSB1          !CHECK FOR 1 HR
              T    KIG1
              TM   RSB1
              LB   L3C
              TM   INC
              TM   TV=4
              T    LCLR1
    KIG1      LBL  #6E
              TM   ZERO
              LBL  #30
              TL   KIGN1
    LCLR1     INCB
              TM   RSB3          !RESET F2MIN
    LCLR      LBL  #AF
              TM   ZROW
              LBL  #BF
              TM   ZROW
              LBL  #CF
              TM   ZERO
              DECB
              SMBI #A
              T    *-3
              LB   L15
              TM   ZERO
              LBL  #8F
              TM   ZROW
              LBL  #EF
              TM   ZROW
              LBL  #9F
              TM   ZROW
              LBL  #1F
              LDI  #1
              EX   0
              TL   CLR
***FINISHED WITH DATA CLEAR ROUTINE
    CING1     LBL  #8E           !USED IN ANALOG ROUTINE
              TM   TSB2
              T    OFE
              TL   CING2
    OFE       LBL  #40
              TM   ZERO
              TL   LRVD
```

```
            ORG 730
FINSH   LB    L3C
        LDI  #8
        EX
        LDI  #F
        LBL  #23        OUT PUT 'F'
        EX 0
        LD 0
        DECB
        T  -3
FIN1    TM OUT+
        LB   L3C
        LD 0
        ADI  #1
        T  ++2
        T  ++3
        EX
        T FIN1
        LDI  #1
        IOL  #1D        OUTPUT END OF DATA
        LDI  #0
        IOL  #1D
        LB   L3D
        TM STB3         !SET F2MIN
        TL CINTL
NLINK   LB   L3D
        TM RSB3         !RESET F2MIN
        TM LOG
        LBL  #2F
        TM ZROW
NEX     TML RSD
        LBL  #2D
        LDI  #1         LOAD AN D FOR 1ST ROW TO BE OUTPUTTED
        EX
        LBL  #2E
        LDI  #3
        EX 0
        LB   L3D        SET VIDL
        TM STB1
        TL NEXT
CINTL   LBL  #2F
        LDI  #4
        EXD
        LDI  #3
        EXD
        LDI  #C
        EXD
        LDI  #0
        EX
        TL DIGTL
        ORG 7C0
NINK    TM ZERO         !PUTING 0123456789AB
        LBL  #EB
        LABL
        EXD
        T  -2
        TL NLINK
NEXT    TML RFLD
        LB   L3C
        LDI  #C         LOAD C FOR INC COUNT
        EX
```

```
K2      LBL  *2E
        TM IN2
        SKBI *C
        T *+2
        T K1
        SKBI *B
        T *+2
        T K1
AD4     LB L3C
        LD 0
        ADI *1              !INC BL 4 TIMES
        T *+2
        T T4
        EX
        T K2
K1      LB L3D              !SET FNEBU
        TM STB4
        T AD4
T4      TM OUT4
        LB L3D
        TM TSB4             !CHECK FOR NEW BU
        T NEXT
        TM TSB1             !VIDL
        T CIC
        TM RSB1             !RESET VIDL
        TM RSB4             !RESET FNEBU
        LBL *2C
        LDI *8              !START RAM DUMP AT 8
        EX
        T NEXT
CIC     TM RSB4
        LBL *2C
        TM TV=0             !CHECK IF BU=0
        T RM1
        TM TV=2
        T RM0
        TM TV=1
        T *+2
        T NEXT
        fL FINSH
RM0     LDI *0
RM1     LDI *1
        EX
        T NEXT
        END
```

What is claimed is:

1. A device monitoring and recording system comprising:

(a) sensing means for sensing device operating parameters and generating data signals corresponding thereto;

(b) computing means for receiving and processing said data signals;

(c) memory storage means for storing said processed data signals from said computing means;

(d) power supply means for providing power to said device, said computing means and said memory storage means, said power supply means comprising:

(i) means for sensing a power fault condition of said power supply means and for generating a fault status signal in response thereto;

(ii) means for feeding said fault status signal to said computing means, said computing means including means for initiating a data protect routine in response to said fault status signal for storing data being processed by said computing means, said computing means further initiating said data protect routine in response to at least one selected data signal corresponding to other than a fault condition of said power supply means, said computing means generating a shut-down command signal after completion of said data protect routine;

(iii) means for receiving said shut-down command signal from said computing means;

(iv) means for disconnecting said power supply means from said device and said computing means in response to said shut-down command;

(v) means independent of said computing means for disconnecting said power supply means from said device and said computing means; and (vi) means for delaying operation of said independent connecting means for a time period substantially greater than that normally required for the computing means to issue said shut-down command in response to said fault status signal.

2. A device monitoring and recording apparatus as recited in claim 1 wherein said device is a vehicle having a battery and said power supply means further comprises said vehicle battery.

3. A device monitoring and recording apparatus as recited in claim 2 wherein said memory storage means comprises dynamic random access memory means and said disconnecting means of said power supply means comprises means for disconnecting power to said dynamic random access memory means, said system further comprising another battery, independent of said vehicle battery, for providing power to said dynamic random access memory means when said power supply means is disconnected from said dynamic random access memory means, whereby said dynamic random access memory means functions as a non-volatile memory.

4. A device monitoring and recording apparatus as recited in claim 1 wherein said device is a vehicle having an ignition and said system further comprises means for turning off said vehicle ignition and said sensing means generates a data signal corresponding to said ignition-off condition and said at least one selected data signal comprises said ignition-off data signal.

5. A device monitoring and recording system comprising:
(a) sensing means for sensing device operating parameters and generating data signals corresponding thereto;
(b) computing means for receiving and processing said data signal;
(c) memory storage means for storing said processed data signals from said computing means;
(d) power supply means for providing power to said device, said computing means and said memory storage means;
(e) said computing means comprising:
   (i) means for executing a data protect routine in response to at least one of: (1) said data signals corresponding to a shut-down condition of said device, and (2) a power-fault signal corresponding to a power fault of said power supply means; and
(f) said power supply means comprising:
   (i) means for receiving said shut-down command from said computing means;
   (ii) means for disconnecting said power supply means from said device and said computing means in response to said shut-down command
   (iii) means independent of said computing means for disconnecting said power supply means from said device and said computing means; and
   (iv) means for delaying operation of said independent disconnecting means for a time period substantially greater than that normally required for the computing means to issue said shut-down command in response to said fault status signal.

6. A device monitoring and recording apparatus as recited in claim 5 wherein said device is a vehicle having a battery and said power supply means further comprises said vehicle battery.

7. A method of protecting data being processed by a computing means having a central processing unit (CPU) and a memory storage means, said CPU operable to sense vehicle operating power therefrom, said method comprising the steps of:
(a) sensing at least one vehicle parameter indicative of an engine shut-down condition;
(b) sensing a power fault condition of said vehicle battery;
(c) executing a data protect routine in said CPU in response to one of said at least one sensed shut-down condition and said power fault condition for storing data being processed by said CPU into said memory storage means;
(d) disconnecting said vehicle battery from said CPU after completion of said data protect routine, said CPU initiating said disconnecting step
(e) sensing a predetermined time interval substantially longer than the time normally required for said CPU to execute said data protect routine; and
(f) upon failure of said CPU to initiate said disconnecting step, disconnecting said vehicle battery from said CPU independently of said CPU.

* * * * *